United States Patent
Mayrand

(10) Patent No.: US 11,108,670 B2
(45) Date of Patent: *Aug. 31, 2021

(54) STREAMING NETWORK ADAPTED TO CONTENT SELECTION

(71) Applicant: VANTRIX CORPORATION, Montreal (CA)

(72) Inventor: Jean Mayrand, Chambly (CA)

(73) Assignee: VANTRIX CORPORATION, Montreal (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/699,375

(22) Filed: Nov. 29, 2019

(65) Prior Publication Data

US 2020/0099605 A1    Mar. 26, 2020

Related U.S. Application Data

(63) Continuation-in-part of application No. 15/340,193, filed on Nov. 1, 2016, now Pat. No. 10,506,006, and
(Continued)

(51) Int. Cl.
*H04L 12/26* (2006.01)
*H04L 29/06* (2006.01)

(52) U.S. Cl.
CPC ........ *H04L 43/0894* (2013.01); *H04L 43/028* (2013.01); *H04L 43/087* (2013.01); *H04L 65/601* (2013.01); *H04L 65/607* (2013.01)

(58) Field of Classification Search
CPC . H04L 43/0894; H04L 65/607; H04L 43/087; H04L 43/028; H04L 65/601; H04L 65/80; H04L 65/4069; H04L 65/605
See application file for complete search history.

(56) References Cited

U.S. PATENT DOCUMENTS 6,219,089 B1    4/2001    Driscoll, Jr. et al.
6,466,254 B1   10/2002    Furlan
(Continued)

FOREIGN PATENT DOCUMENTS

CN    101778104    7/2010
WO    2004004320   1/2004
WO    2014191990  12/2014

OTHER PUBLICATIONS

Sankaranarayanan K., Davis J.W. (2011) PTZ Camera Modeling and Panoramic View Generation via Focal Plane Mapping. In: Kimmel R., Klette R., Sugimoto A. (eds) Computer Vision—ACCV 2010. ACCV 2010. Lecture Notes in computer Science, vol. 6493. Springer, Berlin, Heidelberg.
(Continued)

*Primary Examiner* — Michael A Keller
*Assistant Examiner* — Chhian (Amy) Ling
(74) *Attorney, Agent, or Firm* — IP-Mex Inc.; Victoria Donnelly

(57) ABSTRACT

A universal streaming server providing client-defined content at a permissible flow rate is disclosed. The server performs adaptive content filtering of panoramic multimedia signals based on clients' commands and regulates signal flow rate between the server and each of multiple client devices based on respective content specifications and performance measurements. The server sends a derivative of a panoramic signal capturing a panoramic view to a client device, receives content selection parameters, based on the derivative, from the client device, extracts a partial-coverage signal from the full-coverage signal according to the content selection parameters, and transmits the partial-coverage signal to the client device. The performance measurements include measurements pertinent to a client's receiver and measurement pertinent to a network path to the client's
(Continued)

receiver. The server may employ multiple content filters and multiple encoders to serve a large number of clients concurrently.

24 Claims, 46 Drawing Sheets

Related U.S. Application Data a continuation-in-part of application No. 15/259,962, filed on Sep. 8, 2016, now Pat. No. 10,419,770.

(60) Provisional application No. 62/249,599, filed on Nov. 2, 2015, provisional application No. 62/216,326, filed on Sep. 9, 2015.

(56) References Cited

U.S. PATENT DOCUMENTS

| | | | |
|---|---|---|---|
| 6,844,990 | B2 | 1/2005 | Artonne et al. |
| 7,463,280 | B2 | 12/2008 | Steuart, III |
| 7,872,665 | B2 | 1/2011 | Grover |
| 7,975,063 | B2 | 7/2011 | Lefebvre |
| 7,975,283 | B2 | 7/2011 | Bedingfield, Sr. |
| 8,264,524 | B1 | 9/2012 | Davey |
| 8,493,436 | B2 | 7/2013 | Lyon et al. |
| 8,645,932 | B2 | 2/2014 | Wright et al. |
| 8,767,014 | B2 | 7/2014 | Vaught |
| 9,002,312 | B1 | 4/2015 | Sink et al. |
| 9,002,313 | B2 | 4/2015 | Sink et al. |
| 9,298,986 | B2 | 3/2016 | Ferlatte et al. |
| 9,392,212 | B1 | 7/2016 | Ross |
| 9,900,626 | B2 | 2/2018 | Jayaram |
| 9,918,136 | B2 | 3/2018 | Cole |
| 10,176,683 | B2 | 1/2019 | Meganathan |
| 10,277,813 | B1 | 4/2019 | Thomas |
| 10,390,064 | B2 | 8/2019 | Dury |
| 10,402,938 | B1 | 9/2019 | Newman |
| 10,536,671 | B1 | 1/2020 | Crookham et al. |
| 10,601,889 | B1 | 3/2020 | Doron |
| 10,630,971 | B2 | 4/2020 | Gupta et al. |
| 10,645,290 | B2 | 5/2020 | Besley et al. |
| 10,652,452 | B2 | 5/2020 | Gong et al. |
| 2005/0104878 | A1 | 5/2005 | Kaye |
| 2005/0104879 | A1 | 5/2005 | Kaye |
| 2005/0146521 | A1 | 7/2005 | Kaye |
| 2005/0231505 | A1 | 10/2005 | Kaye |
| 2006/0187305 | A1 | 8/2006 | Trivedi |
| 2008/0024594 | A1 | 1/2008 | Ritchey |
| 2010/0149073 | A1 | 6/2010 | Chaum |
| 2010/0157018 | A1 | 6/2010 | Lampotang |
| 2010/0217673 | A1 | 8/2010 | Vandewalle |
| 2011/0238856 | A1 | 9/2011 | Lefebvre |
| 2012/0117584 | A1 | 5/2012 | Gordon |
| 2012/0120194 | A1 | 5/2012 | Newton |
| 2013/0013803 | A1 | 1/2013 | Bichot et al. |
| 2013/0044181 | A1 | 2/2013 | Baker |
| 2013/0141523 | A1 | 6/2013 | Banta et al. |
| 2013/0212521 | A1 | 8/2013 | Fedoseyeva |
| 2013/0227160 | A1 | 8/2013 | Labonte et al. |
| 2013/0272374 | A1 | 10/2013 | Eswaran |
| 2013/0278715 | A1 | 10/2013 | Nutsch et al. |
| 2013/0279751 | A1 | 10/2013 | Bruna et al. |
| 2014/0320592 | A1 | 10/2014 | Amadio et al. |
| 2014/0376609 | A1 | 12/2014 | Barkley et al. |
| 2015/0085061 | A1 | 3/2015 | Sun et al. |
| 2015/0116359 | A1 | 4/2015 | Kajita et al. |
| 2015/0116451 | A1 | 4/2015 | Xu et al. |
| 2015/0156096 | A1 | 6/2015 | Roh |
| 2015/0212576 | A1 | 7/2015 | Ambrus |
| 2015/0229492 | A1 | 8/2015 | Karaoguz |
| 2015/0244944 | A1 | 8/2015 | Tokutake |
| 2015/0249813 | A1 | 9/2015 | Cole |
| 2015/0334383 | A1 | 11/2015 | Newton |
| 2015/0346812 | A1 | 12/2015 | Cole |
| 2015/0350628 | A1 | 12/2015 | Sanders |
| 2016/0027215 | A1 | 1/2016 | Burns et al. |
| 2016/0105649 | A1 | 4/2016 | Pettegrew |
| 2016/0150212 | A1 | 5/2016 | Moura |
| 2016/0151026 | A1 | 6/2016 | Shibasaki |
| 2016/0189334 | A1 | 6/2016 | Mason |
| 2016/0191798 | A1 | 6/2016 | Yoo |
| 2016/0219262 | A1 | 7/2016 | Cole |
| 2016/0277772 | A1 | 9/2016 | Campbell |
| 2016/0286138 | A1 | 9/2016 | Kim |
| 2016/0353089 | A1 | 12/2016 | Gallup et al. |
| 2016/0353146 | A1 | 12/2016 | Weaver |
| 2016/0360180 | A1 | 12/2016 | Cole |
| 2016/0373734 | A1 | 12/2016 | Cole |
| 2016/0373791 | A1* | 12/2016 | White ............... G06Q 30/06 |
| 2016/0379606 | A1 | 12/2016 | Kollin |
| 2016/0381110 | A1 | 12/2016 | Barnett et al. |
| 2017/0001111 | A1 | 1/2017 | Willette |
| 2017/0001112 | A1 | 1/2017 | Gilmore |
| 2017/0001122 | A1 | 1/2017 | Leung |
| 2017/0003740 | A1 | 1/2017 | Verfaillie |
| 2017/0003784 | A1 | 1/2017 | Garg |
| 2017/0006074 | A1 | 1/2017 | Oates, III |
| 2017/0006322 | A1 | 1/2017 | Dury |
| 2017/0038942 | A1 | 2/2017 | Rosenfeld |
| 2017/0041544 | A1 | 2/2017 | Kobayashi |
| 2017/0041570 | A1 | 2/2017 | Takahashi et al. |
| 2017/0092008 | A1 | 3/2017 | Djorgovski |
| 2017/0105053 | A1 | 4/2017 | Todd |
| 2017/0139578 | A1 | 5/2017 | Dickerson |
| 2017/0213469 | A1 | 7/2017 | Elchik |
| 2017/0238055 | A1 | 8/2017 | Chang |
| 2017/0263046 | A1 | 9/2017 | Patney |
| 2017/0308116 | A1 | 10/2017 | Rondinelli |
| 2017/0316608 | A1 | 11/2017 | Khalid |
| 2017/0318325 | A1 | 11/2017 | Ortiz |
| 2017/0339416 | A1 | 11/2017 | Hendry |
| 2017/0344843 | A1 | 11/2017 | Wang |
| 2017/0365102 | A1 | 12/2017 | Huston |
| 2017/0366812 | A1 | 12/2017 | Abbas |
| 2017/0374411 | A1 | 12/2017 | Lederer |
| 2018/0007352 | A1 | 1/2018 | Chang |
| 2018/0014140 | A1 | 1/2018 | Milevski |
| 2018/0227487 | A1 | 8/2018 | Heo |
| 2018/0357245 | A1 | 12/2018 | Garg |
| 2018/0367835 | A1 | 12/2018 | Hamidi-Rad |
| 2019/0297363 | A1 | 9/2019 | Chirokov |
| 2020/0177849 | A1 | 6/2020 | Shimada et al. |
| 2020/0336524 | A1* | 10/2020 | Tinsman ............... H04L 67/104 |

OTHER PUBLICATIONS

Lisanti, G., Masi, I., Pernici, F et al. Continuous localization and mapping of a pan-tilt-zoom camera for wide area tracking. Machine Vision and Applications 27, 1071-1085 (2016).

* cited by examiner

| Device type/ Stream category | Viewing preference pattern | | | | | |
|---|---|---|---|---|---|---|
| | V0 | V1 | V2 | V3 | V4 | V5 |
| D0 | | | | | | Stream-2 |
| D1 | | Stream-3 | Stream-5 | Stream-0 | | |
| D2 | | | | | | |
| D3 | | | | | | |
| D4 | | | | | | |
| D5 | | | Stream-1 | | | |
| D6 | | | | | | |
| D7 | Stream-4 | | | | | |

Multimedia source-specific streaming-control table

Video-source-specific viewing-preference statistics

| Device type/ Stream category | Viewing preference pattern | | | | | |
|---|---|---|---|---|---|---|
| | V0 | V1 | V2 | V3 | V4 | V5 |
| D0 | 0 | 0 | 0 | 92 | 9 | 18 |
| D1 | 5 | 51 | 12 | 64 | 26 | 0 |
| D2 | 0 | 11 | 0 | 0 | 0 | 92 |
| D3 | 9 | 14 | 0 | 86 | 112 | 0 |
| D4 | 18 | 0 | 17 | 0 | 50 | 0 |
| D5 | 16 | 5 | 89 | 0 | 0 | 0 |
| D6 | 0 | 70 | 22 | 0 | 0 | 0 |
| D7 | 29 | 8 | 0 | 16 | 19 | 0 |

STREAMING NETWORK ADAPTED TO CONTENT SELECTION

CROSS-REFERENCE TO RELATED APPLICATIONS

The present application is a continuation-in-part of U.S. patent application Ser. No. 15/340,193, entitled "Method and system for flow-rate regulation in a content-controlled streaming network", filed on Nov. 1, 2016 and issued as U.S. Pat. No. 10,506,006 on Dec. 10, 2019, which claims the benefit of U.S. Provisional Application 62/249,599, entitled "Method and system for flow-rate regulation in a content-controlled streaming Network", filed Nov. 2, 2015, and which is a continuation-in-part of U.S. application Ser. No. 15/259,962, entitled "Method and system for panoramic multimedia streaming", filed on Sep. 8, 2016 and issued as U.S. Pat. No. 10,419,770 on Sep. 17, 2019, claiming the benefit of U.S. Provisional Application 62/216,326 filed Sep. 9, 2015; the entire content of above noted applications is incorporated herein by reference.

FIELD OF THE INVENTION

The present invention relates to streaming of multimedia signals containing panoramic video signals where a receiving automaton, such as a human or an artificial-intelligence monitor, may select content of multimedia signals transmitted from a universal streaming server. In particular, the invention is directed to methods and apparatus for viewer control of video-signal content and for adapting the flow rate of a multimedia signal transmitted from a universal streaming server according to content selection, receiver condition, and network-path condition.

BACKGROUND

Conventionally, streaming servers have been used to perform multimedia signal adaptation and distribution to individual client devices. With panoramic multimedia-signals, a high-capacity path need be established between the multimedia source and the streaming server, paths of adaptive capacities need be established between the streaming server and multiple client devices, and the streaming server need be equipped with powerful processing facilities. A streaming server may transmit multimedia data to multiple client devices. The server may perform transcoding functions to adapt data according to characteristics of client devices as well as to conditions of network paths from the server to the client devices. The multimedia data may represent video signals, audio signals, static images, and text.

Streaming multimedia data containing panoramic video signals require relatively higher capacity transport resources and more intensive processing. A panoramic video signal from a video source employing a panoramic camera occupies a relatively high bandwidth of a transmission medium. Sending the panoramic video signal directly from the video source to a client device requires a broadband path from the video source to the client's device and high-speed processing capability at the client device. Additionally, the video signal may require adaptation to suit differing characteristics of individual client devices.

In a panoramic-multimedia streaming system, it is desirable to provide clients with the capability to adaptively select view regions of panoramic scenes during a streaming session. It is, therefore, an object of the present invention to provide a flexible streaming server with the capability of client-specific signal-content filtering as well as signal processing to adapt signals to different types of client devices and to varying capacities of network paths to client devices. It is another object of the present invention to provide a method and a system for regulating data flow rate in a network hosting a streaming server. The system relies on a flexible streaming server with adaptive processing capability and adaptive network connectivity where the capacity of network paths to and from multimedia data sources, including panoramic video sources, and client devices may vary temporally and spatially.

SUMMARY

A streaming system employs a universal streaming server to provide client-defined content at a permissible flow rate. The server performs adaptive content filtering based on clients' commands and flow-rate regulation based on client's content specification and performance measurements. The streaming system serves client devices of different types which connect to the server through communication paths of different capacities.

The server comprises at least one content filter configured to extract a partial-coverage signal from a full-content signal received from a signal source according to specified content-definition parameters. A controller comprising a processor and a memory device determines a preferred encoding rate of the partial-coverage signal based on performance measurements acquired from a client device. The server may employ multiple content filters for concurrent generation of partial-coverage signals directed to client devices.

In accordance with an aspect, the invention provides a method of signal streaming under flow-rate regulation. The method comprises acquiring at a server comprising at least one hardware processor a full-coverage video signal, generating a derivative of the full-coverage video signal compatible with an available capacity of a network path to a client device; sending the derivative to the client device, and receiving at a controller of the server content selection parameters from the client device defining preferred partial coverage of the full-coverage video signal. A content filter of the server extracts a partial-coverage signal from the full-coverage signal according to the content selection parameters.

The server transmits the partial-coverage signal to the client device. Upon receiving performance measurements pertinent to the partial-coverage signal, the controller determines an updated permissible flow rate of the partial-coverage signal based on the performance measurements. An encoder encodes the partial-coverage signal according to the updated permissible flow rate.

According to an embodiment, the encoder transcodes the partial-coverage signal to generate a transcoded signal compatible with characteristics of the client device and compresses the transcoded signal.

The controller may instruct the encoder to encode the partial-coverage signal under the constraint of a current permissible flow rate. Alternatively, the controller may communicate with a network controller to acquire a downstream network path compatible with the updated permissible flow rate between the server to the client device.

The derivative of the pure video signal may be generated as a frame-sampled video signal of a constant flow rate not exceeding a predefined nominal flow rate. Alternatively, the derivative may be generated as a compressed video signal, within the predefined nominal flow rate, derived from the pure video signal. The derivative of the pure video signal may also be generated as a succession of compressed content-filtered video signals occupying successive time windows, and derived from the pure video signal.

The performance measurements pertain to conditions at a receiver of the client device and conditions of a downstream network path from the server to the client device. The controller determines primary metrics based on performance measurements pertinent to the conditions of the receiver. Where at least one primary metric is above a respective acceptance interval, the controller judicially reduces a current permissible flow rate based on the primary metrics. Otherwise, where none of the primary metrics is above a respective acceptance interval, the controller determines secondary metrics based on performance measurements pertinent to the downstream network path. Where at least one secondary metric is above a respective acceptance interval, the controller judicially reduces the current flow rate of the signal based on values of the secondary metrics.

Where each primary metric is below a respective acceptance interval and each secondary metric is below a respective acceptance interval, the controller judicially increases the current permissible flow rate based on the primary and secondary metrics.

In accordance with another aspect, the invention provides a streaming server providing client-defined content at an appropriate flow rate. The streaming server comprises a memory device storing processor-readable instructions causing at least one hardware processor to perform the function of providing partial coverage under flow-rate control. The server is configured to acquire a full-coverage signal capturing a panoramic view, generate a derivative of the full-coverage video signal compatible with an available capacity of a network path to a client device; send the derivative to the client device, receive content selection parameters from the client device, based on the derivative, and extract a partial-coverage signal from the full-coverage signal according to the content selection parameters.

The server transmits the partial-coverage signal to the client device and, subsequently, receives performance measurements from the client device. Based on the performance measurements, the server determines a permissible flow rate of the partial-coverage signal. The partial-coverage signal is encoded according to the permissible flow rate to produce an encoded partial-coverage signal. The encoded partial-coverage signal is then transmitted to the client device;

The encoder may perform signal compression to comply with the permissible flow rate. The encoded partial-coverage signal is formed to be compatible with characteristics of the client device. The server is further configured to communicate with a network controller to acquire a path, from the server to the client device, that is compatible with the permissible flow rate.

The derivative of the full-coverage signal may be generated as one of:
(i) a frame-sampled signal of a constant flow rate not exceeding a nominal flow rate;
(ii) a compressed signal, of a nominal flow rate, derived from the full-coverage signal; or
(iii) a succession of compressed content-filtered signals communicated to the client device during successive time windows, each content-filtered signal being derived from the full-coverage signal to correspond to a respective portion of the panoramic view.

In order to determine a permissible flow rate, the processor-readable instructions cause the at least one hardware processor to:

compute primary metrics based on performance measurements pertinent to conditions at a receiver of the client device;
compute secondary metrics based on performance measurements pertinent to a network path from the streaming server to the receiver; and
reduce a current permissible flow rate under at least one of two conditions:
 at least one primary metric is outside a respective acceptance interval; and
 at least one secondary metric is outside a respective acceptance interval.

Subject to a determination that each primary metric is within a respective acceptance interval and each secondary metric is within a respective acceptance interval, the processor-readable instructions cause the at least one processor to increase the current permissible flow rate based on the primary and secondary metrics.

In accordance with a further aspect, the invention provides a streaming server comprising at least one hardware processor for executing processor-readable instructions organized into a glance module, a content filter, a flow controller, an encoder, and a master controller The glance module is configured to generate a derivative of a full-coverage signal capturing a panoramic view. The content filter is configured to extract a partial-coverage signal from the full-coverage signal according to content selection parameters. The flow controller is configured to determine a permissible flow rate based on performance measurements. The encoder is configured to encode a signal according to permissible flow rate.

The master controller configured to:
acquire a full-coverage signal through a network interface;
direct the full-coverage network to the glance module;
send the derivative of the full-coverage signal generated at the glance module to a client device through the network interface;
receive content selection parameters from the client device based on the derivative;
direct the full-coverage signal and the content selection parameters to the content filter to generate a respective partial-coverage signal;
transmit the respective partial-coverage signal to the client device;
receive from the client device performance measurements;
direct the performance measurements to the flow controller for determining the permissible flow rate;
direct the permissible-flow rate to the encoder to produce an encoded partial-coverage signal; and
transmit the encoded partial-coverage signal to the client device.

In some implementations, the encoder is further configured to transcode the partial coverage signal to generate a transcoded signal compatible with characteristics of the client device and compress the transcoded signal according to the permissible flow rate.

The glance module is configured to generate the derivative in one of the forms a frame-sampled signal of a constant flow rate not exceeding a prescribed nominal flow rate, a compressed signal, of a nominal flow rate, derived from the full-coverage signal, and a succession of compressed content-filtered signals occupying successive time windows.

The performance measurements pertain to conditions at client device and conditions of a network path from the streaming server to the receiver.

The preferred implementation of the sought flexible streaming server is a cloud-embedded server. Cloud computing enables dynamically accessing resources which may be reserved and released as the need arises. The resources include processing units, memory devices, and network links.

BRIEF DESCRIPTION OF THE DRAWINGS

Embodiments of the present invention will be further described with reference to the accompanying exemplary drawings, in which:

FIG. 32 illustrates a streaming-control table maintained at the universal streaming server for a specific video-source, in accordance with an embodiment of the present invention;

FIG. 34 illustrates a table recording a count of viewing-preference patterns for each type of client devices, in accordance with an embodiment of the present invention;

TERMINOLOGY

Figure 1:
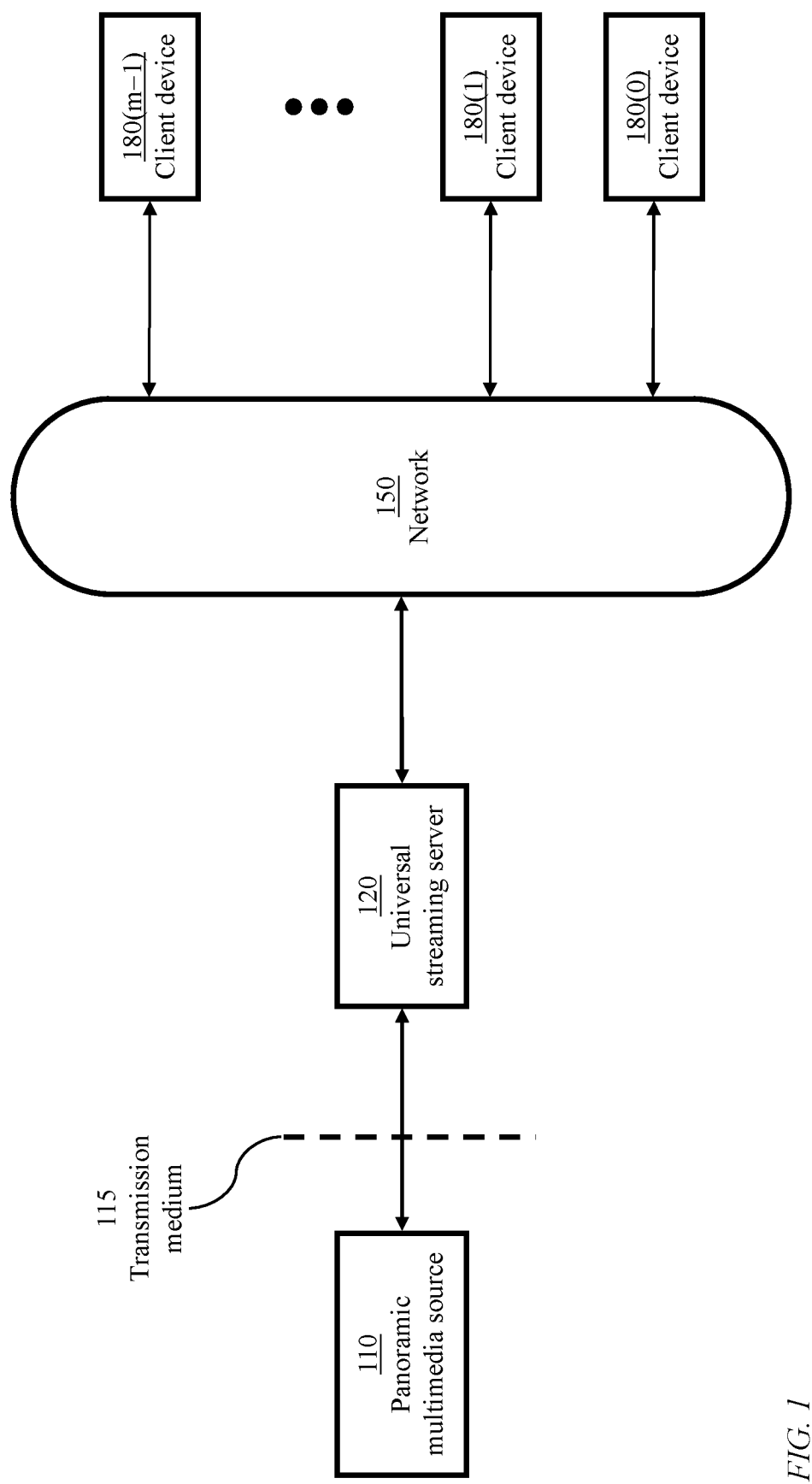
FIG. 1 illustrates a system for panoramic multimedia streaming comprising a panoramic multimedia source and a universal streaming server, in accordance with an embodiment of the present invention.

Signal: A data stream occupying a time window is herein referenced as a "signal". The duration of the time window may vary from a few microseconds to several hours. Throughout the description, the term "signal" refers to a baseband signal. The term "transmitting a signal" over a network refers to a process of a signal modulating a carrier, such as an optical carrier, and transmitting the modulated carrier. The term "receiving a signal" from a network refers to a process of receiving and demodulating a modulated carrier to recover a modulating base band signal.

Panoramic video signal: A video signal of an attainable coverage approximating full coverage is referenced as a panoramic video signal. The coverage of a panoramic video signal may exceed $2\pi$ steradians.

Panoramic multimedia signal: A composite signal comprising audio signals, image signals, text signals, and a panoramic video signal is herein called a panoramic multimedia signal.

Universal streaming server: A streaming server distributing panoramic multimedia signals with client-controlled content selection and flow-rate adaptation to receiver and network conditions is referenced as a "universal streaming server". A universal streaming server may be referenced as a "server" for brevity. The server comprises at least one hardware processor and at least one memory device holding software instructions which cause the at least one processor to perform the functions of acquiring panoramic multimedia signals and generating client-specific content-filtered multimedia signals under flow control.

Full-content signal: A multimedia signal may contain multiple components of different types, such as an encoded audio signal, an encoded video signal, a text, a still image, etc. Any component may be structured to contain multiple separable parts. For example, a panoramic video component of a panoramic signal may be divided into sub-components each covering a respective subtending solid angle of less than $4\pi$ steradians.

Partial-content signal: The term refers to a signal derived from a full-content signal where at least one separable part of any component is filtered out and possibly other components are filtered out.

Coverage of a video signal: The coverage (or spatial coverage) of a video signal is defined herein as the solid angle subtended by a space visible to a camera that produces the video signal.

Full-coverage video signal: A video signal of coverage of $4\pi$ steradians is referenced as a full-coverage video signal. A full-coverage video signal may be a component of a full-content signal.

Signal filtering: The term signal filtering refers to conventional operations performed at a signal receiver to eliminate or reduce signal degradation caused by noise and delay jitter; a signal-filtering process does not alter the content of the signal.

Content filtering: The term refers to a process of modifying the information of a signal (following a process of signal filtering) to retain only specific information; content-filtering of a full-coverage (attainable coverage) video signal yields a partial-coverage video signal corresponding to a reduced (focused) view region.

Full-coverage camera (or $4\pi$ camera): A camera producing a full-coverage video signal is herein referenced as a full-coverage camera or a $4\pi$ camera.

Attainable-coverage video signal: A full-coverage video signal is produced by an ideal camera. The actual coverage of a video signal produced by a camera is referenced as the attainable coverage.

Partial-coverage video signal: A video signal of coverage less than the attainable coverage is referenced as a partial-coverage video signal. A partial-coverage video signal may be a component of a partial-content signal.

Partial-coverage multimedia signal: A composite signal comprising audio signals, image signals, text signals, and a partial-coverage video signal is herein called a partial-coverage multimedia signal.

Source: A panoramic multimedia source comprises a full-coverage camera as well as de-warping and decompression modules; the term "source" is used herein to refer to a panoramic multimedia source.

Raw video signal: The signal produced by a camera is referenced as a "raw video signal".

Corrected video signal: A de-warped raw video signal is referenced as a "corrected video signal".

Source video signal: A video signal received at a panoramic multimedia server from a panoramic multimedia source is referenced as a "source video signal"; a source video signal may be a raw video signal, corrected video signal, compressed video signal, or a compact video signal.

Source multimedia signal: A multimedia signal received at a panoramic multimedia server from a panoramic multimedia source is referenced as a "source multimedia signal"; a source multimedia signal may contain a source video signal in addition to signals of other forms such as an audio signal or a text signal.

Processor: The term "processor" used herein refers to at least one hardware (physical) processing device which is coupled to at least one memory device storing software instructions which cause the at least one hardware processing device to perform operations specified in the software instructions.

Compression module: The term refers to a well known device comprising a processor and a memory device storing software instructions which cause the processor to encode an initial video signal to produce a compressed video signal of a reduced bit rate in comparison with the bit rate resulting from direct encoding of the initial video signal.

Decompression module: The term refers to a well known device comprising a processor and a memory device storing software instructions which cause the processor to decompress a compressed video signal to produce a replica of an initial video signal from which the compressed video signal was generated.

Source compression module: A compression module coupled to a video-signal source to generate a compressed video signal from a raw video signal, or from a de-warped video signal generated from the raw video signal, is a source compression module. Compression module 340 (FIGS. 3, 4, 7, and 8) is a source compression module.

Server compression module: A compression module coupled to a server to generate a compressed video signal from a source video signal video signal is herein referenced as a "server compression module". Compression modules 1160 (FIG. 11), 1340, 1360 (FIG. 13), and 2030 (FIG. 20) are server compression modules.

Server decompression module: A decompression module coupled to a server to generate a replica of a raw video signal or a replica of a de-warped video signal generated from the raw video signal, is herein referenced as a "server decompression module". Decompression module 350 (FIGS. 3, 4, 7, and 8) is a server decompression module.

Client decompression module: A decompression module coupled to a client device to generate a replica of a pure video signal, or a content-filtered video signal, generated at a server, is herein referenced as a "client decompression module". Compression module 2270 (FIG. 22) is a client decompression module.

Compressed video signal: A compressed raw video signal is referenced as a "compressed video signal".

Compact video signal: A compressed corrected signal is referenced as a "compact video signal".

Rectified video signal: Processes of de-warping a raw video signal followed by compression, then decompression or processes of compressing a raw video signal followed by decompression and de-warping yield a rectified video signal.

Pure video signal: A corrected video signal or a rectified video signal is referenced herein as a pure video signal. A pure video signal corresponds to a respective scene captured at source.

Signal sample: The term refers to a video signal of full coverage (attainable coverage) derived from a pure video signal, or from a transcoded video signal derived from the pure video signal. The flow rate (bit rate) of a signal sample would be substantially lower than the flow rate of the video signal from which the signal sample is derived. A signal sample is sent to a client device to enable a viewer at the client device to select and identify a preferred view region.

Encoder: An encoder may be an analogue to digital converter or a digital-to-digital transcoder. An encoder produces an encoded signal represented as a stream of bits.

Encoding rate: The number of bits per unit time measured over a relatively short period of time is considered an "instantaneous" encoding rate during the measurement period. Rapid natural variation of the encoding rate may take place due to the nature of the encoded signal. A controller may force encoding-rate variation in response to time-varying conditions of a communication path through a network shared by numerous (uncoordinated) users. Forced encoding-rate variations are typically slower than spontaneous variations of the encoding rate.

Flow rate: Without data loss, the flow rate of a signal along a path to destination equals the encoding rate of the signal at a server. Because of the natural fluctuations of the encoding rate, a parametric representation of the encoding rate may be specified by a user or determined at a controller. The parametric representation may be based on conjectured statistical distribution of naturally varying encoding rates.

Metric: A metric is a single measure of a specific property or characteristic derived from sufficient performance measurements using, for example, regression analysis.

Acceptance interval: A metric is considered to reflect a favourable condition if the value of the metric is bounded between a lower bound and an upper bound defining an "acceptance interval". An acceptance interval is inclusive, i.e., it includes the values of the lower bound and the upper bound in addition to the values in between.

Metric index: A metric may be defined to be in one of three states: a state of "−1" if the value of the metric is below the lower bound of a respective acceptance interval, a state of "1" if the value is above a higher bound of the acceptance interval, and a state "0" otherwise, i.e., if the value is within the acceptance interval including the lower and higher bounds. A metric index is the state of the metric.

Transmitter: The term refers to the conventional device which modulates a carrier wave (an optical carrier or a microwave carrier) with a baseband signal to produce a modulated carrier.

Receiver: The term refers to the conventional device which demodulates a modulated carrier to extract the transmitted baseband signal.

Processor: The term refers to a hardware device (a physical processing device) Gb/s, Mb/s: Gigabits/second ($10^9$ bits/second), Megabits/second ($10^6$ bits/second)

The server of the present invention receives and disseminates panoramic multimedia signals. A panoramic multimedia signal contains a panoramic video signal in addition to signals of other forms, such as an audio signal and text. The description and the claimed subject mater focus on novel features relevant to the video-signal component. However, it is understood that the server delivers to client devices edited panoramic video signals together with signals of other types.

REFERENCE NUMERALS

100: System for streaming panoramic multimedia signals
110: Panoramic multimedia source
115: Transmission medium
120: Universal streaming server (referenced as a "server" for brevity)
150: Network
180: Client device
200: Streaming system comprising multiple sources and multiple servers
310: Panoramic 4π camera
312: Raw signal
320: De-warping module at server
322: Corrected signal
324: Rectified signal
330: De-warping module at source
340: Compression module
342: Compressed signal
343: Compact signal
350: Decompression module
352: Decompressed signal
420: Pure video signal
460: Signal-editing module
480: High-capacity path
490: Lower-capacity path
500: First communication path
520: Source transmitter
528: Modulated carrier signal to server
540: Server receiver
542: Baseband signal (warped)
560: Interfaces to client-devices
585: Modulated carrier signals to clients
600: Second communication path
628: Modulated carrier signal to server
642: Baseband signal (de-warped)
685: Modulated carrier signals to clients
700: Third communication path
720: Source transmitter
728: Modulated carrier signal to server
740: Server receiver
742: Baseband signal (warped, compressed)
785: Modulated carrier signals to clients
800: Fourth communication path
828: Modulated carrier signal to server
842: Baseband signal (de-warped, compressed)
885: Modulated carrier signals to clients
900: Source video signal (312, 322, 342, or 343)
905: Control data from panoramic multimedia source
925: Control data to panoramic multimedia source
935: Upstream control signals from client devices
940: Edited multimedia signals to client devices
945: Downstream control signals to client devices
1000: Components of a server
1005: All data from/to sources and client devices
1008: At least one dual link to network
1010: Server-network interface
1022: Source control-data module
1024: Source signal-processing module
1026: Client control-data module
1060: Client-specific adaptation module
1061: Client control bus
1090: Combiner of edited multimedia signals
1120: Content-filtering module; also called "content filter" for brevity
1122: Content-filtered video signal
1132: Content-filtered transcoded video signal
1140: Transcoding module
1142: Transcoded content-filtered video signal
1152: Transcoded video signal
1160: Server compression module
1220: Mean bit rate
1225: Effective bit rate
1230: Specified peak bit rate
1300: Selective-viewing options
1320: Frame-sampling module
1322: Full-coverage frame-sampled signal
1340: Spatial-temporal server compression module
1342: Full-coverage compressed signal
1360: Spatial-temporal server compression module
1362: Succession of pre-selected content-filtered signals
1364: Succession of partial-coverage signals
1402: Message from client to server requesting server
1404: Message from client to server defining a selected view region
1440: Compressed content-filtered video signal from server to client
1520: Mean bit rate of compressed video signal
1525: Effective bit rate of compressed video signal
1600: Basic components of signal-editing module
1610: Content-filtering stage
1612: Selected content
1630: Signal-processing unit
1650: Conditioned multimedia signals to a set of client devices
1710: Server-network interface
1720: Content identifier
1725: Decompression module and/or de-warping module
1840: Transcoding module
1842: Signal adapted to a client device
1860: Flow-rate adaptation modules
1861: Buffer for holding a data block
1862: Memory device storing processor-executable instruction for flow-rate adaptation
1900: Exemplary implementation of a signal-editing module
1922: Buffer for holding a data block of a content-filtered signal
1923: memory device storing processor executable instructions which cause a processor to modify the frame rate and/or resolution
2000: Processes of video signal editing for a target client device
2012: Identifier of a preferred view region
2014: Traffic-performance measurements
2016: Nominal frame rate and frame resolution
2030: Server compression module
2040: Module for determining a permissible flow rate as well as a frame rate and frame resolution, compatible with a target client device
2050: Transmitter
2052: Video signal together with accompanying multimedia signals (such as audio signals and/or text) and control signals
2060: Network path
2110: Process of determining requisite flow rate at the display device of the target client device 2120: process of determining a permissible flow rate (reference 2122) between the server and the target client device
2122: Permissible flow rate
2130: Process of determining requisite compression ratio
2140: Process of determining whether a compression ratio is acceptable
2150: Module for determining a revised frame rate and or resolution
2152: Revised frame rate and/or a revised resolution
2210: Memory device storing client-device characterizing data
2220: Memory device storing software instructions for interacting with specific servers
2230: Client transmitter
2240: Client receiver
2242: Interface module
2250: Processor
2260: Memory device holding data blocks of incoming multimedia data
2270: Client decompression module
2280: Memory for holding blocks of display data
2290: Display device
2314: Dual control path between a source 110 and a server 120
2412: Network path
2512: dual control path carrying control signals 905 from the source 110 to the server 120 and control signals 925 from the server 120 to the source 110
2525: multimedia payload signal path from a server 120 to a client device 180
2526: Dual control path between a server 120 and a client device
2545: Automaton associated with a client device
2610: At least one hardware processor
2620: A set of modules devised to process a received panoramic video signal 900
2621: Signal-filtering module
2640: Client-device related modules
2641: Client profile database
2642: Client-device characterization module
2643: Module for signal adaptation to client device
2651: Server-source interface
2652: Source characterization module
2660: Client-specific modules
2661: Server-client interface
2662: Module for signal adaptation to client environment
2663: Module for signal adaptation to client viewing preference
2725: Learning module
2820: Decompression modules and de-warping modules
2830: Module employing at least one respective hardware processor for signal adaptation to client-device type
2925: Memory device storing predefined partial-coverage definitions
2940: Module for signal adaptation to client's device
3010: Process of acquiring a panoramic multimedia signal from a selected panoramic multimedia source
3012: Process of filtering a source video signal to offset degradation caused by noise and delay jitter
3014: Process of decompression of a source video signal if the signal has been compressed at source
3018: Process of video signal de-warping if the signal has not been de-warped at source
3020: Process of receiving a service request from a client
3022: Process of adapting a pure video signal to characteristics of a client's device
3026: Process of compressing a video signal adapted to characteristics of a client device
3028: Process of signal transmission to a client device
3030: A control signal from the client specifying a preferred view region
3032: Process of ascertaining viewing preference
3034: Process of content filtering
3000: Method of acquisition of a panoramic multimedia signal and adapting the acquired multimedia signal to individual clients
3100: A variation of method 3000
3200: Streaming-control table
3300: Process of adaptation of a video-signal for a specific client device
3310: Process of receiving from a client device a request for service at client-interface module
3312: Process of identifying type of client device
3314: Process of determining prior identification of client device
3316: Process of identifying an existing stream category corresponding to a client device type
3320: Process of creating a new stream category for a new device type
3322: Process of adapting a pure video signal to device type
3324: Process of recording new stream category
3326: Process of selecting an existing stream or creating a new stream
3330: Process of signal transmission to a specific client device
3400: Table indicating a count of viewing options for each type of client devices
3500: Processes of flow-rate control based on signal-content changes and performance metrics
3510: Process of receiving performance measurements
3512: Process of computing performance metrics based on the performance measurements
3514: Process of determining whether a current performance is acceptable
3520: Process of receiving definition of a new content
3522: Process of filtering content of a pure video signal according to received definition of the new content
3524: Process of determining flow-rate requirement corresponding to the new content
3540: process of determining whether to enforce a current permissible flow rate in signal encoding or to acquire a new (higher) permissible flow rate from a network controller
3542: Process of enforcing a current flow rate
3544: Process of communicating with a network controller to acquire an enhanced permissible flow rate
3550: Process of signal encoding under constraint of a permissible flow rate (current or enhanced)
3600: Flow-control system of a universal streaming server
3610: Flow controller
3612: content-definition parameters (content selection parameters)
3616: performance measurements
3625: Server-network interface
3630: Processor of a flow controller
3635: Module for determining a preferred flow rate (Module 3635 may implement processes 3500)
3638: Partial-content signal (content-filtered signal)
3640: Encoder of partial-content signal 3638
3660: Compressed signal transmitted to the client device
3700: Combined processes of content filtering and signal flow-rate adaptation 3710: Process of receiving control data from client devices in the form of content-definition parameters and performance measurements.
3720: Process of examining content-definition parameters received from a client device to determine whether content-change is due
3730: Process of determining a preferred flow rate
3740: Process of determining whether a flow-rate change is needed
3750: Process of communicating requisite flow rate to an encoder
3760: Process of communicating content-definition parameters to content filter
3770: An imposed artificial delay to ensure that received client's control data correspond to the changed signal content
3822: Processor dedicated to a content filter
3824: Software instructions causing processor 3822 to extract a partial-content signal from a full-content signal
3826: Buffer holding blocks of full-content signals
3828: Buffer holding blocks of partial-content signals
3860: Updated content signal
3900: initial processes performed at a server to start a streaming session
3910: Process of receiving a compressed full-content signal from a signal source
3915: Process of decompressing the full-content signal to recover the original signal generated at source
3920: Process of receiving a connection request from a client device
3925: Process of determining whether connection request specifies content-definition parameters
3930: Process of specifying default content-definition parameters
3940: Process of extracting a partial-content signal based on default content-definition parameters or specified content-definition parameters
3950: Process of determining whether a flow rate for the extracted signal is specified in the connection request
3955: Process of providing a default flow rate to an encoder
3960: Process of signal encoding at a specified flow rate
3970: Transmitting an encoded signal to a target client device
4000: A method of adaptive modification of content and flow rate of an encoded signal
4010: Process of receiving content preference from an automaton associated with a client device
4020: Process of determining whether content-change is requested
4030: Process of extracting a partial-content signal from the full-content signal
4040: Process of signal encoding at a nominal encoding rate
4050: Process of determining encoding rate based on performance data
4060: Process of encoding content-specific signal at a preferred encoding rate
4070: Transmitting encoded content-specific flow-rate-controlled signal to a target client device
4100: Criteria of determining a preferred encoding rate of a signal
4110: Maintaining a current permissible flow rate
4120: Process of determining a permissible flow-rate based on primary metrics
4130: Process of determining a permissible flow-rate based on secondary metrics
4140: Process of determining a permissible flow-rate based on primary metrics and secondary metrics
4210: Process of determining primary metrics based on performance data relevant to a client's receiver
4220: Process of determining whether any primary metric is above a respective acceptance interval
4225: Process of determining a reduced permissible flow rate based on the primary metrics
4230: Process of determining a secondary metrics based on performance data relevant to conditions of a network path from the server to a client's device
4240: Process of determining whether any secondary metric is above a respective acceptance interval
4245: Process of determining a reduced permissible flow rate based on the secondary metrics
4250: Process of determining whether each primary metric is below its predefined acceptance interval and each secondary metric is below its predefined acceptance interval
4255: State of maintaining a current encoding rate
4260: Process of determining a new encoding rate based on the primary and secondary metrics
4280: Process of communicating requisite encoding rate to a respective encoder
4310: Process of receiving a full-content signal at a server
4320: Process of creating a register for holding parameters of already extracted partial-content signals
4330: Process of receiving parameters defining partial-content of the full-content signal from a specific client
4340: Process of examining the register to ascertain presence, or otherwise, of a previously extracted partial-content signal
4350: Process of selecting either process 4360 or 4370
4360: Process of providing access to a matching partial-content signal
4370: Process of extracting a new partial-content signal according to new content-definition parameters
4380: Process of adding new content-definition parameters to the register for future use
4390: Process of directing a partial-content signal an encoder
4420: Buffer holding data blocks generated by a signal-editing module 460
4450: Multiplexer
4460: Multiple content-filtered streams
4500: Configuration of a streaming server
4510: Network interface
4520: Master controller
4530: Glance module
4540: Bank of content filters
4550: Flow controller
4560: Encoder
4570: Set of hardware processors
4640: A router-switch connecting to at least one server and/or other router-switches
4641: An input port of a router-switch 4640
4642: An output port of a router-switch 4640

DETAILED DESCRIPTION

A conventional streaming server performs multimedia signal adaptation and distribution to individual client devices. With panoramic multimedia-signals, a high-capacity path need be established between the multimedia source and the streaming server, and paths of adaptive capacities need be established between the streaming server and multiple client devices.

The streaming server may acquire performance metrics of a connection between the streaming server and a client device and adjust the flow rate allocated to the connection according to the performance metrics. If the connection is allocated a guaranteed constant flow rate, for example through a dedicated link or reserved capacity of a network path, the performance metrics would depend on the value of the constant flow rate and the characteristics of the client device. If the connection is allocated a nominal flow rate, for example through shared links of a network, the performance metrics would depend on the value of the nominal flow rate, the fluctuation of the intensity of network data traffic from other data sources, and the characteristics of the client device.

The streaming server may also be configured to process a signal received from a panoramic multimedia source to derive signals of partial content (partial coverage). The streaming server of the present invention may receive a signal from a source containing a full coverage panoramic video signal covering a solid angle of $4\pi$ steradians and derive a signal of partial coverage. With such capability, a person viewing a display of the video signal may select, using an input device, a specific partial coverage according to the person's viewing preference. The information content of the preferred video signal depends largely on the selected coverage. Thus, the performance metrics would depend on the value of the nominal flow rate, the fluctuation of the intensity of network data traffic from other data sources, the characteristics of the client device, and the selected information content.

Instead of specifying a nominal flow rate, a viewer may specify a fidelity level and information content. The multimedia server may translate the fidelity level into a requisite flow rate.

A streaming server providing both content selection and flow-rate adaptation to receiver and network conditions is herein referenced as a universal streaming server.

FIG. 1 illustrates a streaming system 100 comprising a panoramic multimedia source 110 coupled to a universal streaming server 120 through a transmission medium 115. Transmission medium 115 may be a dedicated medium, such as a fiber-optic link or a wireless link, or may be a switched path through a shared telecommunication network. The panoramic multimedia server may communicate with a plurality of client devices 180, individually identified as 180(0) to 180(m), m>1, through a network 150. The panoramic multimedia source 110 comprises a full-coverage camera and may comprise a de-warping module and/or a compression module. A full-coverage camera, herein also called a $4\pi$ camera, produces a full-coverage video signal. A multimedia signal, herein referenced as a "source multimedia signal", transmitted from the panoramic multimedia source 110 to universal streaming server 120 may contain a video signal in addition to signals of other forms such as an audio signal or a text signal.

Figure 2:
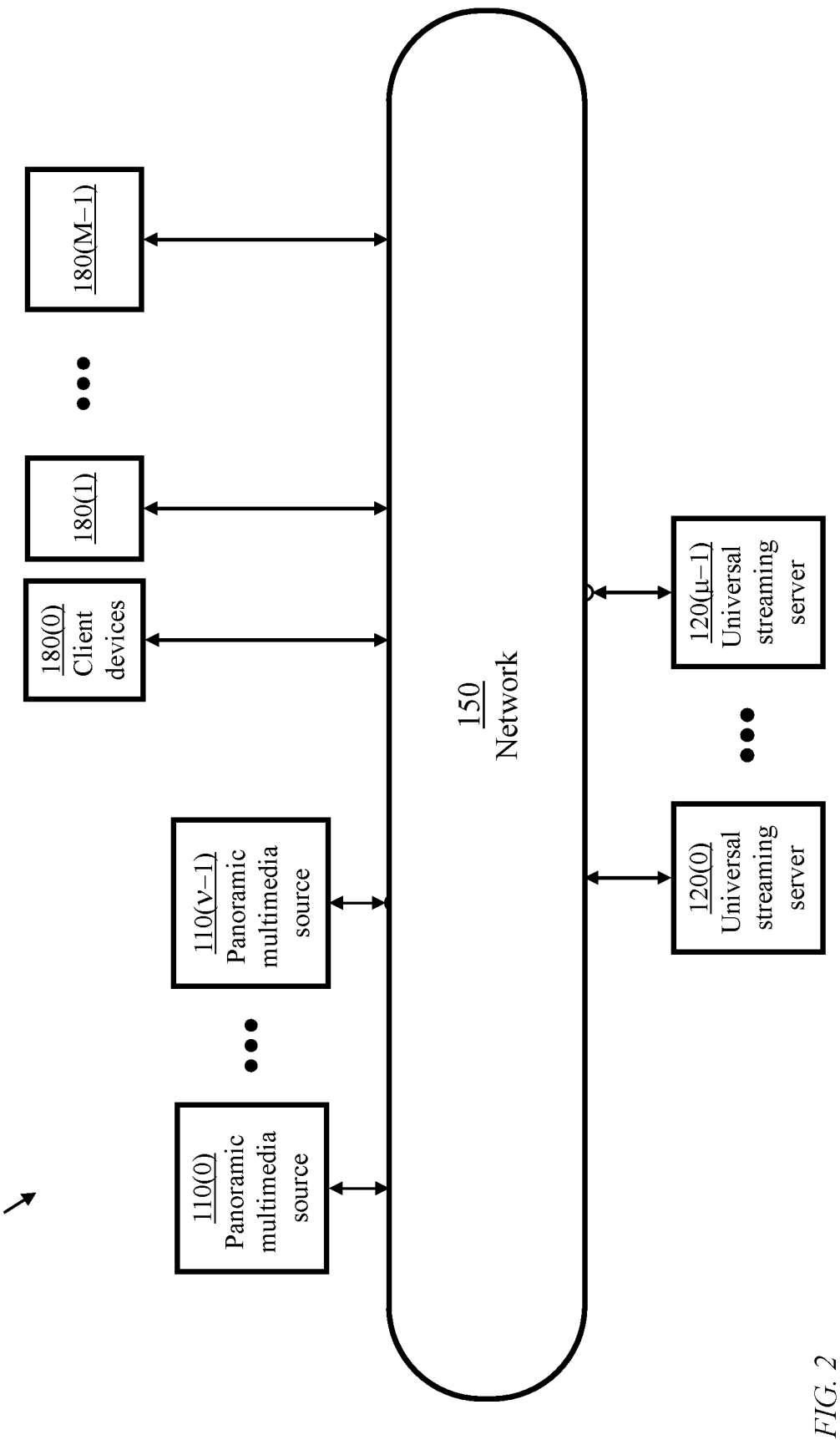
FIG. 2 illustrates a system for panoramic multimedia streaming comprising multiple panoramic multimedia sources and multiple universal streaming servers, in accordance with an embodiment of the present invention.

FIG. 2 illustrates a streaming system 200 comprising a number $\nu$, $\nu \geq 1$, of panoramic multimedia sources 110, individually identified as 110(0) to 110($\nu$−1), and a number $\mu$ of universal streaming servers, $\mu \geq 1$, individually identified as 120(0) to 120($\mu$−1) which may concurrently serve a number M, M>1, of client devices of a plurality of client devices 180. The universal streaming servers 120 may communicate with the panoramic multimedia sources 110 and the client devices through network 150. Alternatively, the universal streaming servers 120 may communicate with the panoramic multimedia sources 110 through one shared network (not illustrated) but communicate with the client devices 180 through another network (not illustrated).

A multimedia panoramic source 110 preferably employs a full-coverage panoramic camera, herein referenced as a $4\pi$ camera, providing view coverage of up to $4\pi$ steradians. An output signal of a $4\pi$ camera is herein referenced as a $4\pi$ video signal. A display of a $4\pi$ video signal of a captured scene on a flat screen may differ significantly from the actual scene due to inherent warping. To eliminate or significantly reduce the display distortion, an artificial offset distortion may be applied to the camera-produced signal so that the display closely resembles a captured scene. Numerous processes, called "de-warping", for correcting the distorted video signal are known in the art.

The de-warping process may be implemented at source, i.e., directly applied to a camera's output signal, or implemented at the universal streaming server 120.

The video signal at a source 110 may be sent directly to a universal streaming server 120 over a high-capacity communication path or compressed at source to produce a compressed signal, occupying a (much) reduced spectral band, which is sent to a universal streaming server 120 over a lower-capacity communication path to be decompressed at the universal streaming server.

Figure 3:
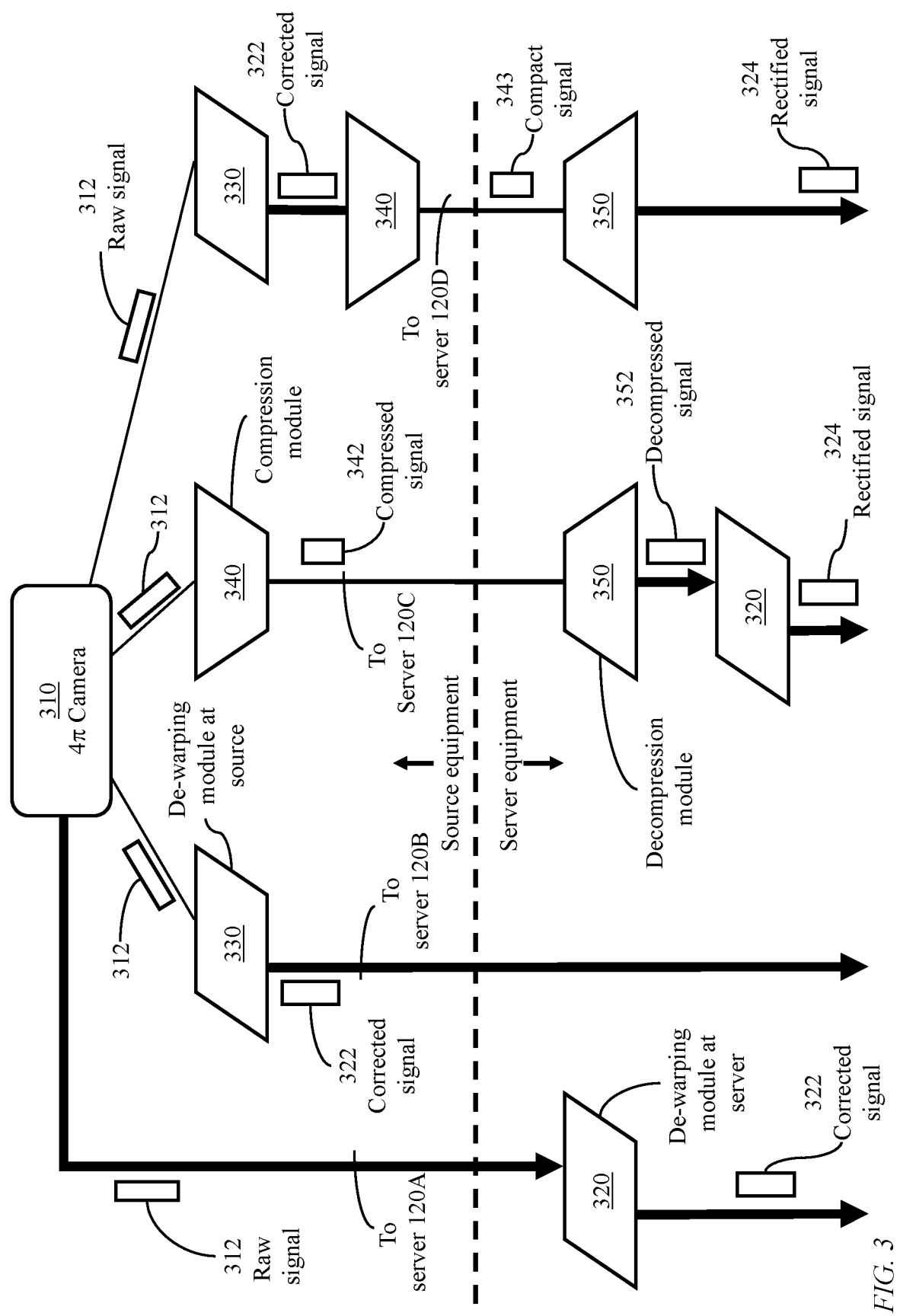
FIG. 3 illustrates communication options between a panoramic multimedia source and a universal streaming server, in accordance with an embodiment of the present invention.

FIG. 3 illustrates four communication options between a multimedia panoramic source 110 and a server 120. The multimedia panoramic source includes a $4\pi$ camera which produces a raw signal 312 and may include a de-warping module 330 and/or a source compression module 340. The raw signal 312 need be de-warped before display or before further processing to condition the signal to specific recipients.

Communication devices coupled to the source are not illustrated in FIG. 3. As illustrated in FIG. 3, a first source comprises the $4\pi$ camera, a second source comprises the $4\pi$ camera and a de-warping module 330, a third source comprises the $4\pi$ camera and a source compression module 340, and a fourth source comprises the $4\pi$ camera, a de-warping module 330, and a source compression module 340.

According to one embodiment, the raw signal 312 may be sent to a server 120A equipped with a de-warping module 320 which produces a corrected signal 322 which is further processed to produce recipient-specific signals. The corrected signal is considered a "pure video signal" which corresponds to the respective scene captured at source.

According to another embodiment, the raw signal 312 may be processed at a de-warping module 330 coupled to the source 110 to produce a corrected signal (pure video signal) 322 which is sent to a server 120B for further processing to produce recipient-specific signals.

According to a further embodiment, the raw signal 312 may be processed at a source compression module 340 coupled to the source 110 to produce a compressed signal 342 which is sent to a server 120C. Server 120C is equipped with a server decompression module 350 which decompresses compressed signal 342 to produce a decompressed signal 352 to be processed at de-warping module 320 to produce a rectified signal 324. The rectified signal is a "pure video signal" as defined above. With a lossless compression process and an ideal decompression process, the decompressed signal 352 would be a replica of raw signal 312. With ideal de-warping, rectified signal 324 would be a faithful representation of the captured scenery.

According to a further embodiment, the raw signal 312 may be processed at a de-warping module 330 coupled to the source 110 to produce a corrected signal 322 which is processed at a source compression module 340 to produce a compact signal 343 to be sent to a server 120D. Server 120D is equipped with a server decompression module 350 which decompresses compact signal 343 to produce a rectified signal 324. With an ideal de-warping module 330, a lossless compression process, and an ideal decompression process, the rectified signal would be a faithful representation of the captured scenery, i.e., a "pure video signal".

Thus, the present invention provides a method of video-signal streaming implemented at a server which comprises multiple physical processors and associated memory devices. The server is devised to acquire a panoramic multimedia signal comprising a video signal from:

(1) a signal source comprising a panoramic camera;
(2) a signal source comprising a panoramic camera and a de-warping module;
(3) a signal source comprising a panoramic camera and a compression module; or
(4) a signal source comprising a panoramic camera, a de-warping module, and a compression module.

The method comprises a process of accessing a panoramic multimedia source to acquire a video signal. If the acquired video signal is uncompressed and has not been de-warped at source, the video signal is de-warped at the server to produce a "pure video signal" which may be displayed on a screen or further processed for distribution to client devices. If the acquired video signal is uncompressed and has been de-warped at source, the video signal constitutes a "pure video signal". If the acquired video signal has been compressed but not de-warped at source, the video signal is decompressed then de-warped at the server to produce a "pure video signal. If the acquired video signal has been de-warped and compressed at source, the video signal is decompressed at the server to produce a "pure video signal".

Figure 4:
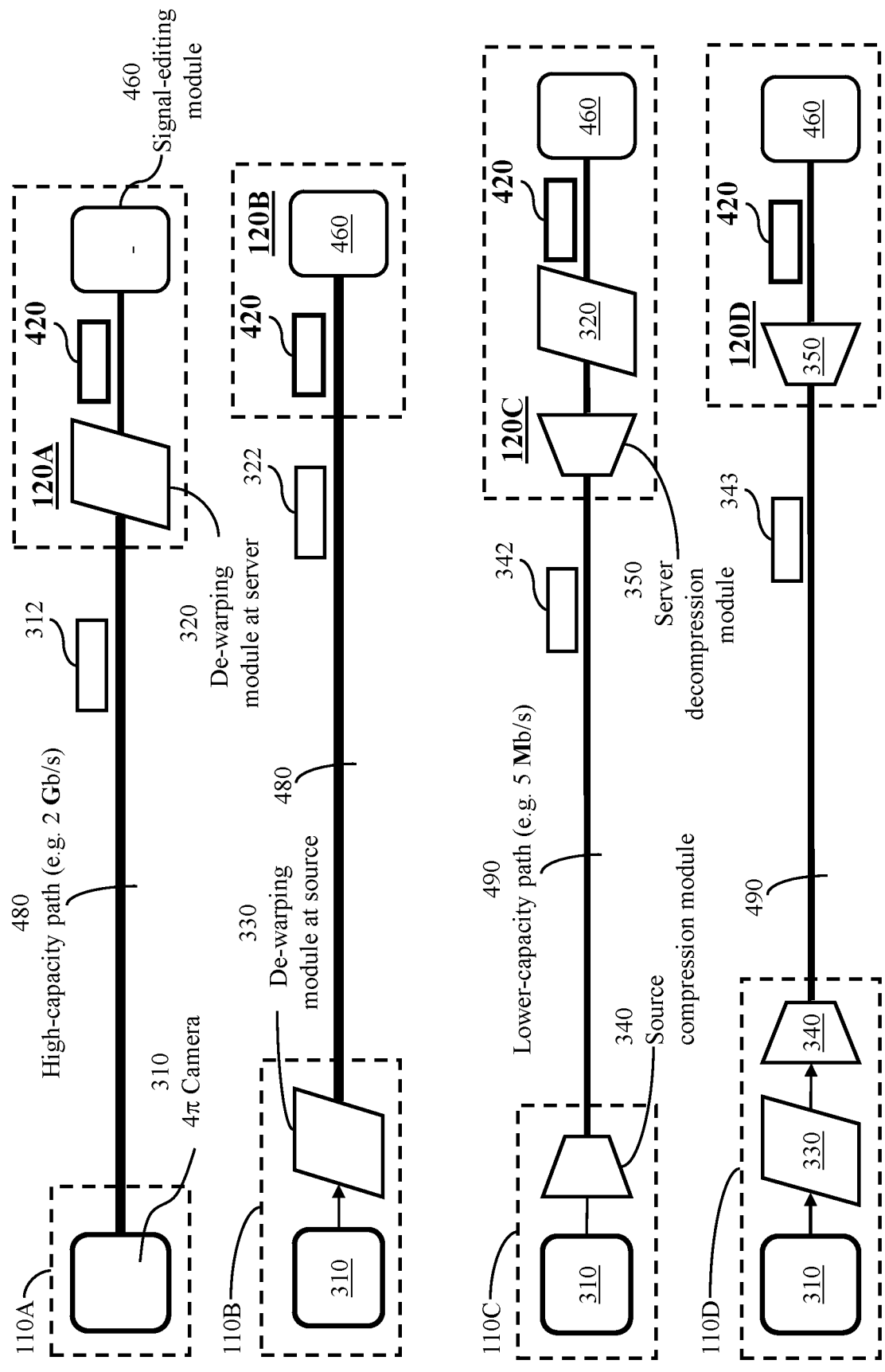
FIG. 4 illustrates communication paths corresponding to the communication options of FIG. 3.

FIG. 4 illustrates communication paths corresponding to the communication options of FIG. 3.

According to the first communication option, a panoramic signal produced at a 4π camera 310, of panoramic multimedia source module 110A, is transmitted over a high-capacity path 480 to server 120A which comprises a de-warping module 320 and a signal-editing module 460 which performs both content filtering and signal adaptation to client devices under flow-rate constraints. Server 120A comprises at least one processor (not illustrated in FIG. 4) and memory devices storing processor executable instructions (software instructions) organized as the de-warping module 320 and the signal-editing module 460. The software instructions of de-warping module 320 are executed to cause the at least one processor to use the received signal and known characteristics of the camera to produce a de-warped corrected signal 322 which may be directly presented to a flat display device or further processed in signal-editing module 460. Signal-editing module 460 may perform content filtering processes to produce selective partial-coverage streams, each tailored to a respective recipient. Signal-editing module 460 may also produce full-coverage streams each tailored to a respective recipient.

According to the second communication option, source module 110B comprises a 4π camera 310, a de-warping module 330, and a processor (not illustrated) applying software instructions of de-warping module 330 to the output signal (raw signal 312) of the 4π camera. The resulting de-warped signal is sent over a high-capacity communication path 480 to server 120B which comprises a signal-editing module 460 as in the first implementation option above.

According to the third communication option, source module 110C comprises a 4π camera 310, a source compression module 340, and a processor (not illustrated) applying software instructions of source compression module 340 to the output signal (raw signal 312) of the 4π camera. The resulting compressed signal 342 is sent over a communication path 490, of a lower-capacity compared to communication path 480, to server 120C which comprises a server decompression module 350, a de-warping module 320, and signal-editing module 460. Server 120C comprises at least one processor (not illustrated) which implements software instructions of server decompression module 350 to produce decompressed signal 352. The at least one processor also implements software instructions of the de-warping module 320 to produce a rectified signal 324. Signal-editing module 460 performs content filtering of rectified signal 324 to produce selective partial-coverage streams, each tailored to a respective recipient. Signal-editing module 460 may also produce full-coverage streams each tailored to a respective recipient.

According to the fourth communication option, source module 110D comprises a 4π camera 310, a de-warping module 330, a source compression module 340, and a processor (not illustrated) applying software instructions of the de-warping module 330 to the output signal (raw signal 312) of the 4π camera to produce a corrected signal 322. The processor applies the software instructions of the source compression module 340 to produce a compact signal 343. The compact signal 343 is sent over a lower-capacity communication path 490 to server 120D which comprises a server decompression module 350 and the signal-editing module 460. Server 120D comprises at least one processor (not illustrated) which implements software instructions of server decompression module 350 to reconstruct the corrected signal 322. As in the previous communication options, signal-editing module 460 performs content filtering of rectified signal 324 to produce selective partial-coverage streams, each tailored to a respective recipient. Signal-editing module 460 may also produce full-coverage streams each tailored to a respective recipient.

With the first or second communication option, a corrected video signal 322 is presented to a signal-editing module 460. With the third or fourth communication options, a rectified video signal 324 is presented to a signal-editing module 460. Each of the corrected video signal 322 and the rectified video signal 324 is considered a pure video signal corresponding to a respective scene captured at source.

Figure 5:
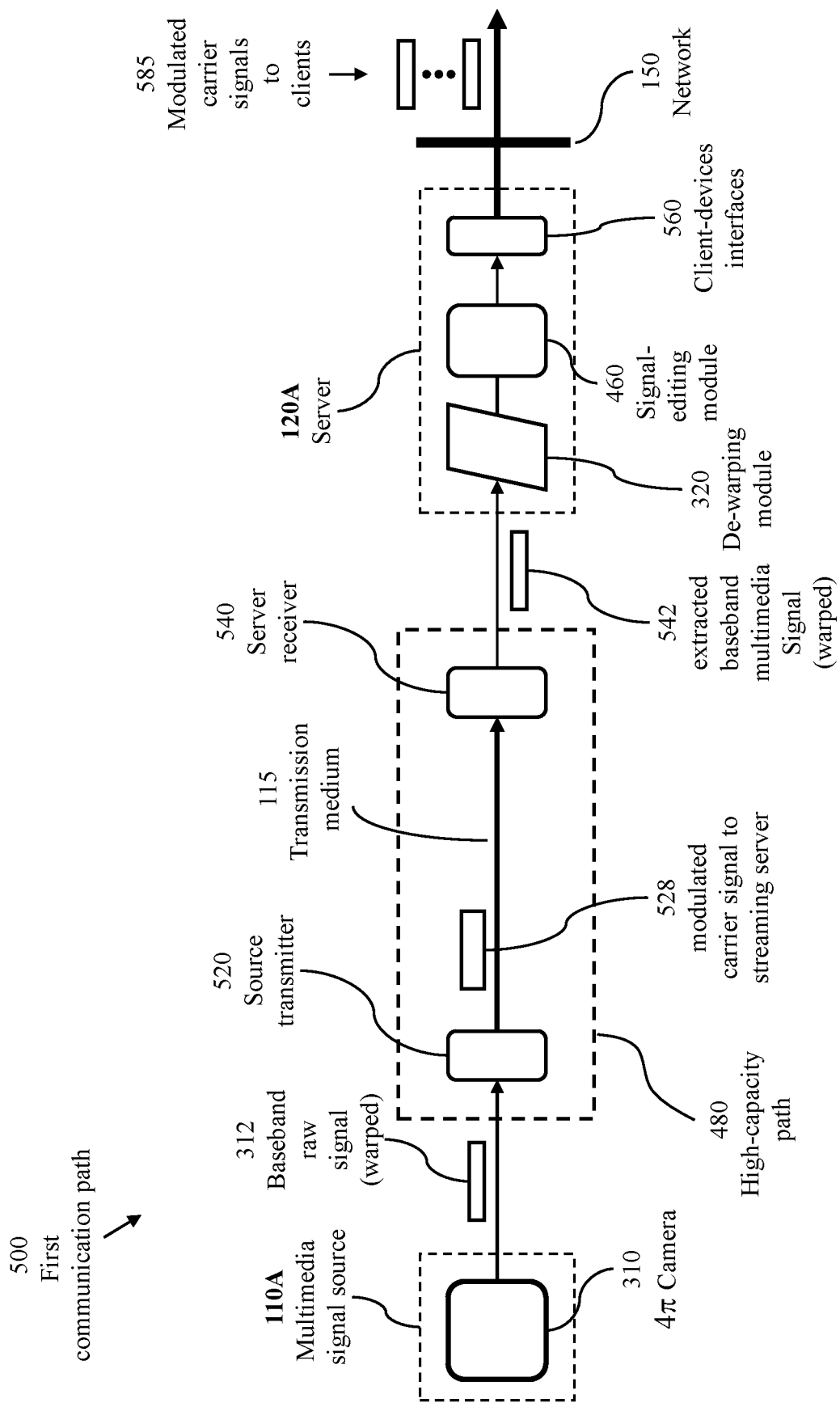
FIG. 5 illustrates components of an end-to-end path corresponding to a first communication option of the communication options of FIG. 3, in accordance with an embodiment of the present invention.

FIG. 5 illustrates components of an end-to-end path 500 corresponding to the first communication option of the communication options of FIG. 3. Source 110A produces (baseband) raw signal 312 which is transmitted over high-capacity path 480 to server 120A. The high-capacity path 480 comprises a source transmitter 520 collocated with source 110A, transmission medium 115, and server receiver 540 collocated with server 120A. Receiver 540 demodulates modulated carrier signal 528 received through transmission medium 115 to acquire a replica 542 of the raw signal 312. Server 120A comprises a memory device storing software instructions constituting de-warping module 320 and a memory device storing software instructions constituting signal-editing module 460. Server 120A also comprises client-devices interfaces 560 which include server transmitters. Output signals 585 of server 120A are communicated through network 150 to respective client devices 180.

Figure 6:
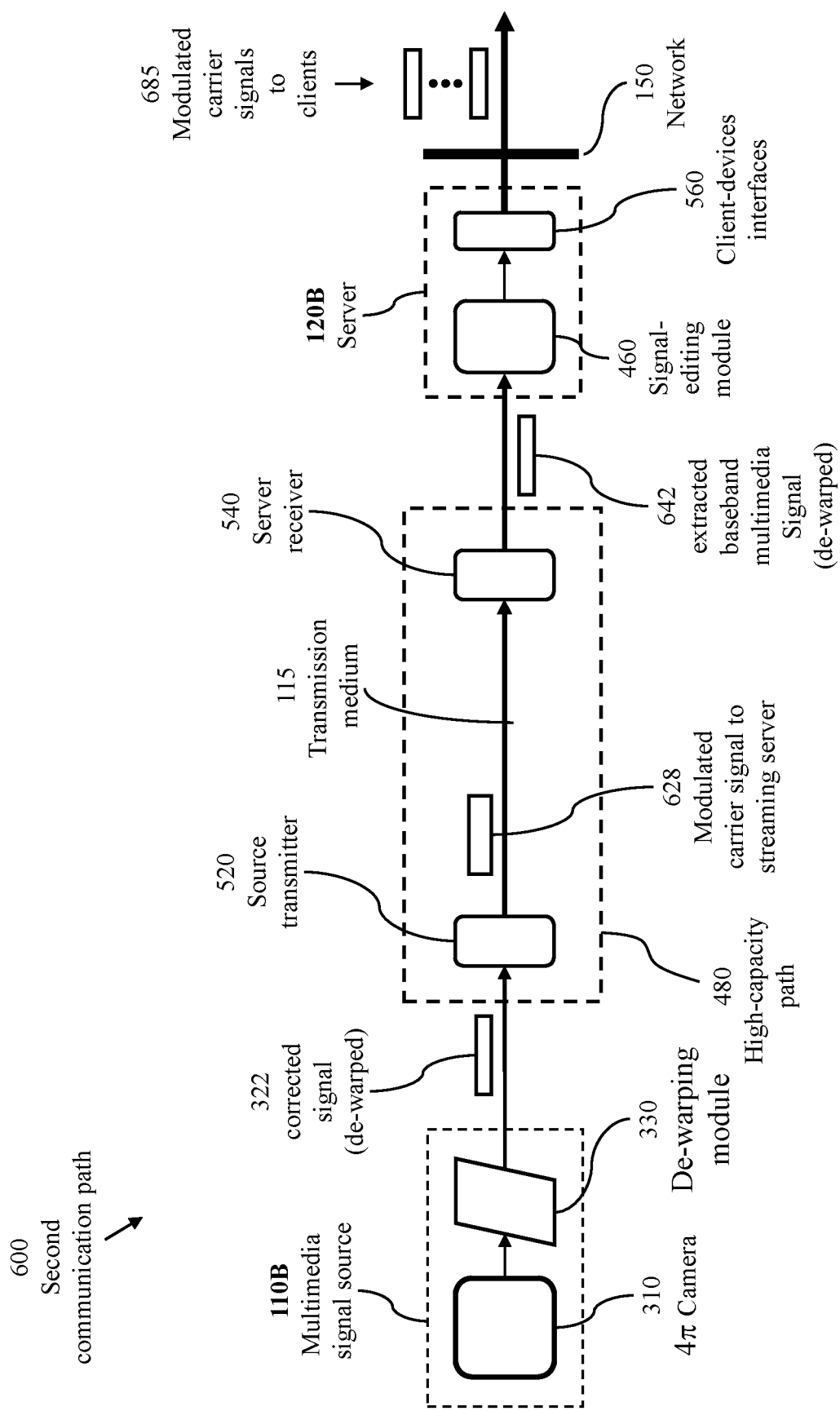
FIG. 6 illustrates components of an end-to-end path corresponding to a second communication option of the communication options of FIG. 3, in accordance with an embodiment of the present invention.

FIG. 6 illustrates components of an end-to-end path 600 corresponding to the second communication option of the communication options of FIG. 3. Source 110B comprises 4π camera 310 and a memory device storing software instructions constituting de-warping module 330 which cause a processor (not illustrated) to produce corrected signal 322. Corrected signal 322 is transmitted over high-capacity path 480 to server 120B. The high-capacity path 480 comprises a source transmitter 520 collocated with source 110B, transmission medium 115, and server receiver 540 collocated with server 120B. Receiver 540 demodulates modulated carrier signal 628 received through transmission medium 115 to acquire a replica 642 of the corrected signal 322. Server 120B comprises a memory device storing software instructions constituting signal-editing module 460. Server 120B also comprises client-devices interfaces 560 which include server transmitters. Output signals 685 of server 120B are communicated through network 150 to respective client devices 180.

Figure 7:
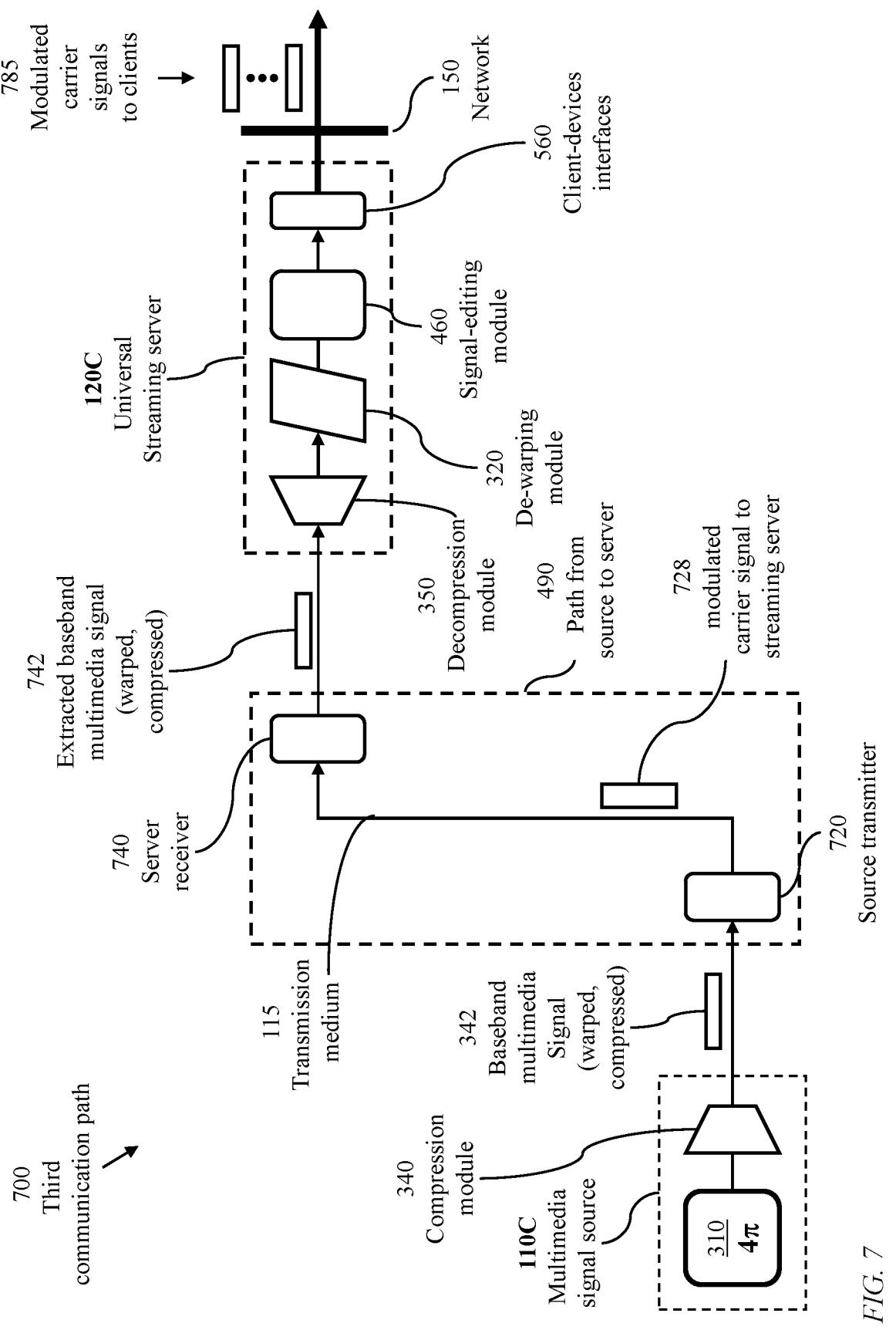
FIG. 7 illustrates components of an end-to-end path corresponding to a third communication option of the communication options of FIG. 3, in accordance with an embodiment of the present invention.

FIG. 7 illustrates components of an end-to-end path 700 corresponding to the third communication option of the communication options of FIG. 3. Source 110C comprises 4π camera 310, which produces (baseband) raw signal 312, and a memory device storing software instructions constituting source compression module 340. Source compression module 340 compresses raw signal 312 into compressed signal 342 which is transmitted over path 490 to server 120C. Path 490 comprises a source transmitter 720 collocated with source 110C, transmission medium 115, and server receiver 740 collocated with server 120C. Receiver 740 demodulates modulated carrier signal 728 received through transmission medium 115 to acquire a replica 742 of compressed signal 342. Server 120C comprises a memory device storing software instructions constituting server decompression module 350, a memory device storing software instructions constituting de-warping module 320, and a memory device storing software instructions constituting signal-editing module 460. Server 120C also comprises client-devices interfaces 560 which include server transmitters. Output signals 785 of server 120C are communicated through network 150 to respective client devices 180.

Figure 8:
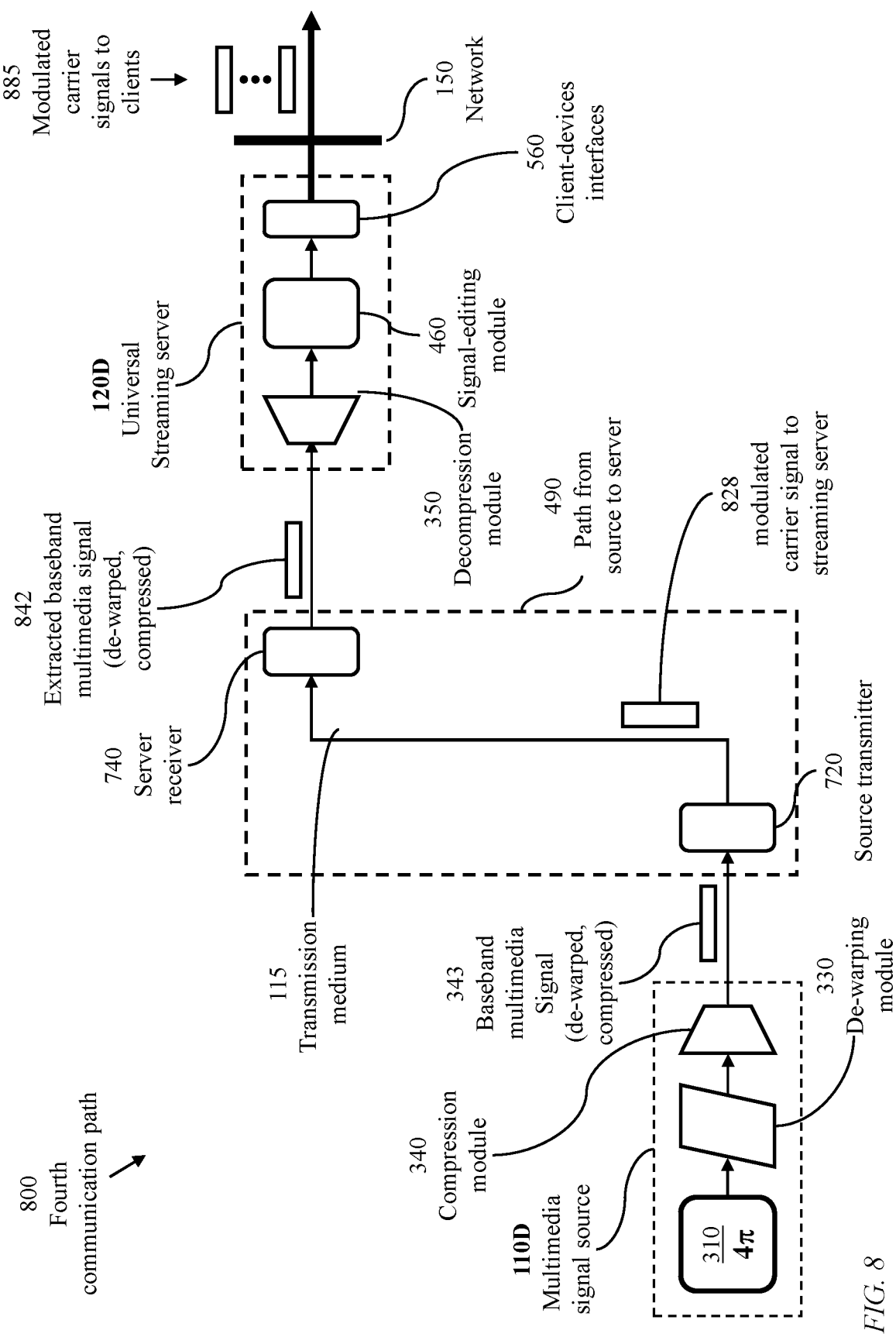
FIG. 8 illustrates components of an end-to-end path corresponding to a fourth communication option of the communication options of FIG. 3, in accordance with an embodiment of the present invention.

FIG. 8 illustrates components of an end-to-end path 800 corresponding to the fourth communication option of the communication options of FIG. 3. Source 110D comprises 4π camera 310, a memory device storing software instructions constituting de-warping module 330 which cause a processor (not illustrated) to produce corrected signal 322, and a memory device storing software instructions constituting source compression module 340 which cause a processor (not illustrated) to produce compact signal 343. Compact signal 343 is transmitted over path 490 to server 120D. Path 490 comprises a source transmitter 720 collocated with source 110D, transmission medium 115, and server receiver 740 collocated with server 120C. Receiver 740 demodulates modulated carrier signal 828 received through transmission medium 115 to acquire a replica 842 of compact signal 343. Server 120D comprises a memory device storing software instructions constituting server decompression module 350, and a memory device storing software instructions constituting signal-editing module 460. Server 120D also comprises client-devices interfaces 560 which include server transmitters. Output signals 885 of server 120D are communicated through network 150 to respective client devices 180.

Figure 9:
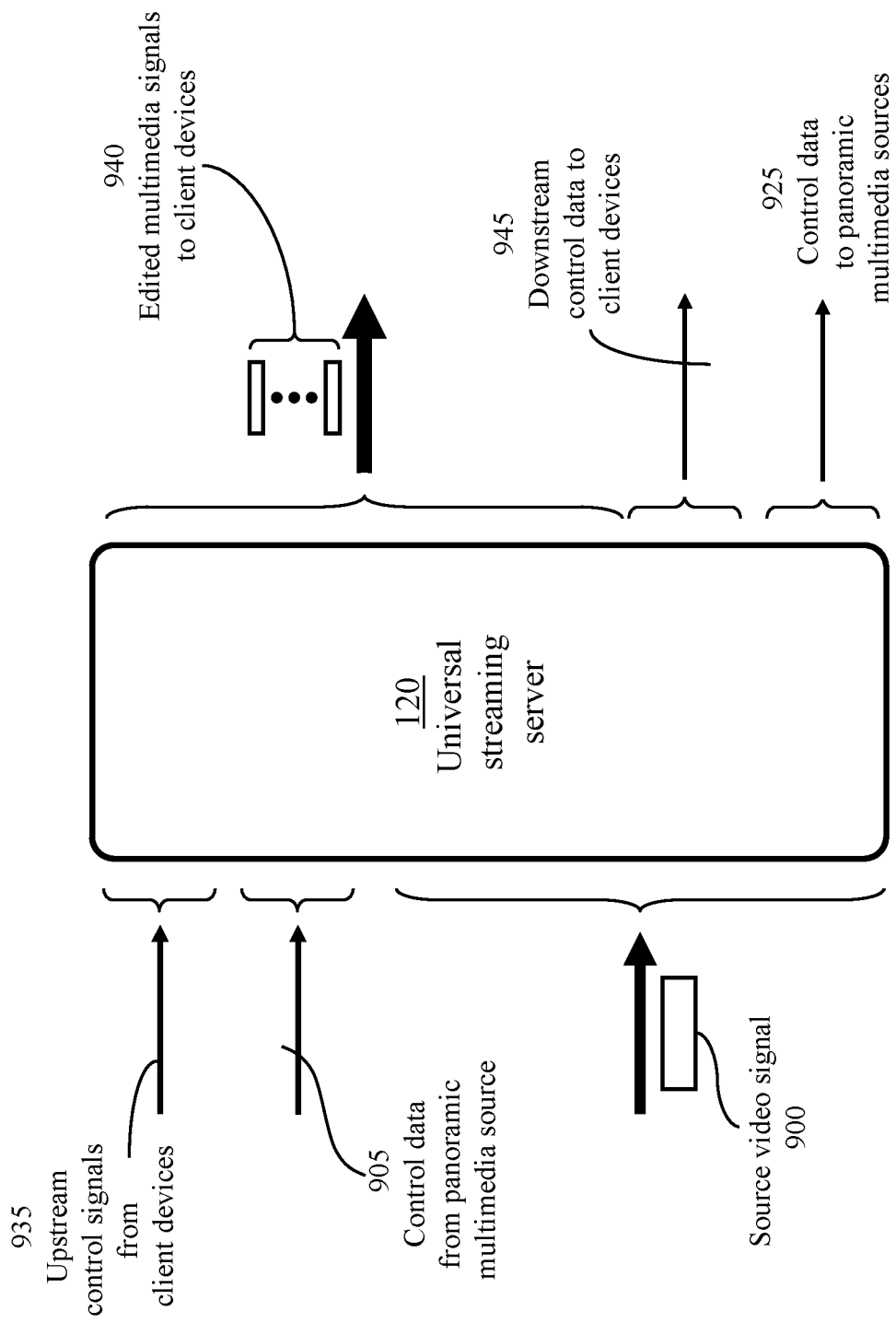
FIG. 9 illustrates multimedia signals and control signals at input and output of a universal streaming server, in accordance with an embodiment of the present invention.

FIG. 9 illustrates multimedia signals and control signals at input and output of a universal streaming server 120. The server 120 receives from a source 110 a multimedia signal including a video signal 900 which may be a raw signal 312, a corrected signal 322, a compressed signal 342, or a compact signal 343. A video signal received at a server from a source 110 is herein referenced as a "source video signal".

The server 120 may receive multimedia signals from different panoramic multimedia sources 110 as illustrated in FIG. 2. The server may, therefore receive a raw video signal 312 from a first source 110, a corrected video signal 322 from a second source 110, a compressed signal 342 from a third source, and/or a compact signal 343 from a fourth source. Preferably, then, the server may be equipped with a de-warping module 320 and a server decompression module 350 to be able to engage with sources 110 of different types and produce a pure video signal 420 which may be a corrected video signal 322 or a rectified video signal 324.

The server 120 receives upstream control signals 935 from client devices 180 and control signals 905 from sources 110. The server transmits downstream control signals 945 to client devices and may transmit control signals 925 to the source 110. Regardless of the source type, the kernel of the server, which is signal-editing module 460, processes the pure video signal 420 based on control signals 935 and 905.

The upstream control signals 935 may include clients' characterizing data and clients' requests. The downstream control signals 945 may include responses to clients' requests. The downstream control signals 945 may also include software modules to be installed at client devices 180 to enable each subtending client device to communicate preferred viewing regions to the server. Control signals 905 may include data relevant to source characteristics and operations already performed at source, such as de-warping and/or data compression. Control signals 925 may include information characterizing the server.

The signal-editing module 460 of the server 120 produces edited multimedia signals 940, each edited multimedia signal being individually conditioned to: viewing preference of a respective client; capability of a respective client's device; and condition of a network path from the server to the respective client's device. The server 120 transmits to client devices the edited multimedia signals 940.

Figure 10:
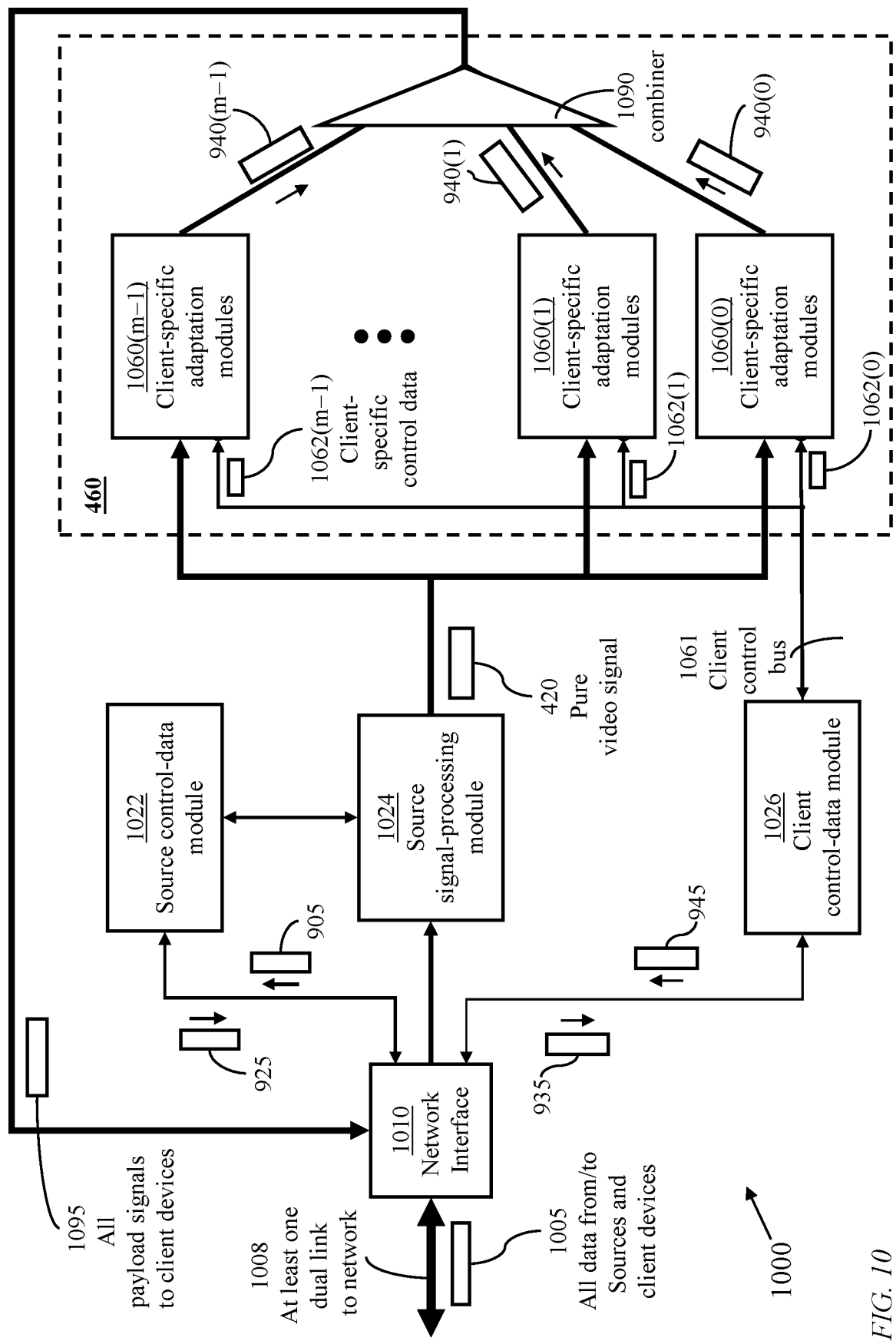
FIG. 10 illustrates components of an exemplary universal streaming server employing client-specific adaptation modules, in accordance with an embodiment of the present invention.

FIG. 10 illustrates components 1000 of an exemplary server 120. The server comprises at least one processor (not illustrated) and multiple memory devices storing processor executable instructions organized into a number of modules including a server-network interface 1010, a source control-data module 1022, a source signal-processing module 1024, a client control-data module 1026, and a set of client-specific adaptation modules 1060. The server-network interface 1010 is coupled to at least one dual link 1008 to at least one network which carries all signals 1005 originating from, or destined to, signal sources and client devices. The server-network interface 1010 comprises a server receiver 540 (FIG. 5 and FIG. 6) or 740 (FIG. 7 and FIG. 8) which demodulates a modulated carrier (optical carrier or wireless microwave carrier) to detect the baseband source video signal 900 (raw signal 312, corrected signal 322, compressed signal 342, or compact signal 343) sent from a source 110 (110A, 110B, 110C, or 110D). A dual link of the at least one dual link 1008 carries: control data to and from at least one source 110 and a plurality of client devices; source multimedia signals; and edited multimedia signals directed to the plurality of client devices.

The source video-signal-processing module 1024 may be equipped with a de-warping module 320 and/or a server decompression module 350 to produce a pure video signal 420 which may be a corrected video signal 322 or a rectified video signal 324.

Server-network interface 1010 directs source video signals 900 to source video-signal-processing module 1024 and control signals 905 to source-control data processing module 1022. Source video-signal-processing module 1024 performs processes of:

(1) video-signal de-warping (module 320, FIG. 5);
(2) video-signal decompression (module 350) and de-warping (module 320, FIG. 7); or
(3) video-signal decompression (module 350, FIG. 8).

Modules 1022 and 1024 are communicatively coupled as indicated in FIG. 10. Outputs of module 1022 may influence processes of module 1024. Module 1024 may generate control data 925 directed to a source 110 to be communicated through module 1022 and server-network interface 1010.

Module 1024 directs pure video signals 420 to a number m, m>1, of client-specific adaptation modules 1060, individually identified as 1060(0) to 1060(m−1). Client-specific adaptation modules 1060 preferably employ independent hardware processors. Each client-specific adaptation module 1060 comprises a memory device storing instructions which cause a respective processor to perform requisite transcoding functions.

The signals received from client devices comprises upstream control signal 935. The data directed to client devices comprises control signals 945 and edited multimedia signals 940. Upstream control signals 935 are extracted at server-network interface 1010 and directed to clients' control-data module 1026. The client-specific adaptation modules 1060 access upstream control data 935 through a client control bus 1061, where client-specific control signals are held in buffers 1062, or through other means known in the art. Downstream control data generated at the client-specific adaptation modules 1060 are distributed to respective client devices 180 through client control bus 1061, client control-data module 1026, server-network interface 1010, and the at least one dual link 1008. The edited client-specific multimedia signals 940 are combined (combiner 1090) and the aggregate stream 1095 is distributed to respective client devices 180 through server-network interface 1010, the at least one dual link 1008, and at least one network.

Figure 11:
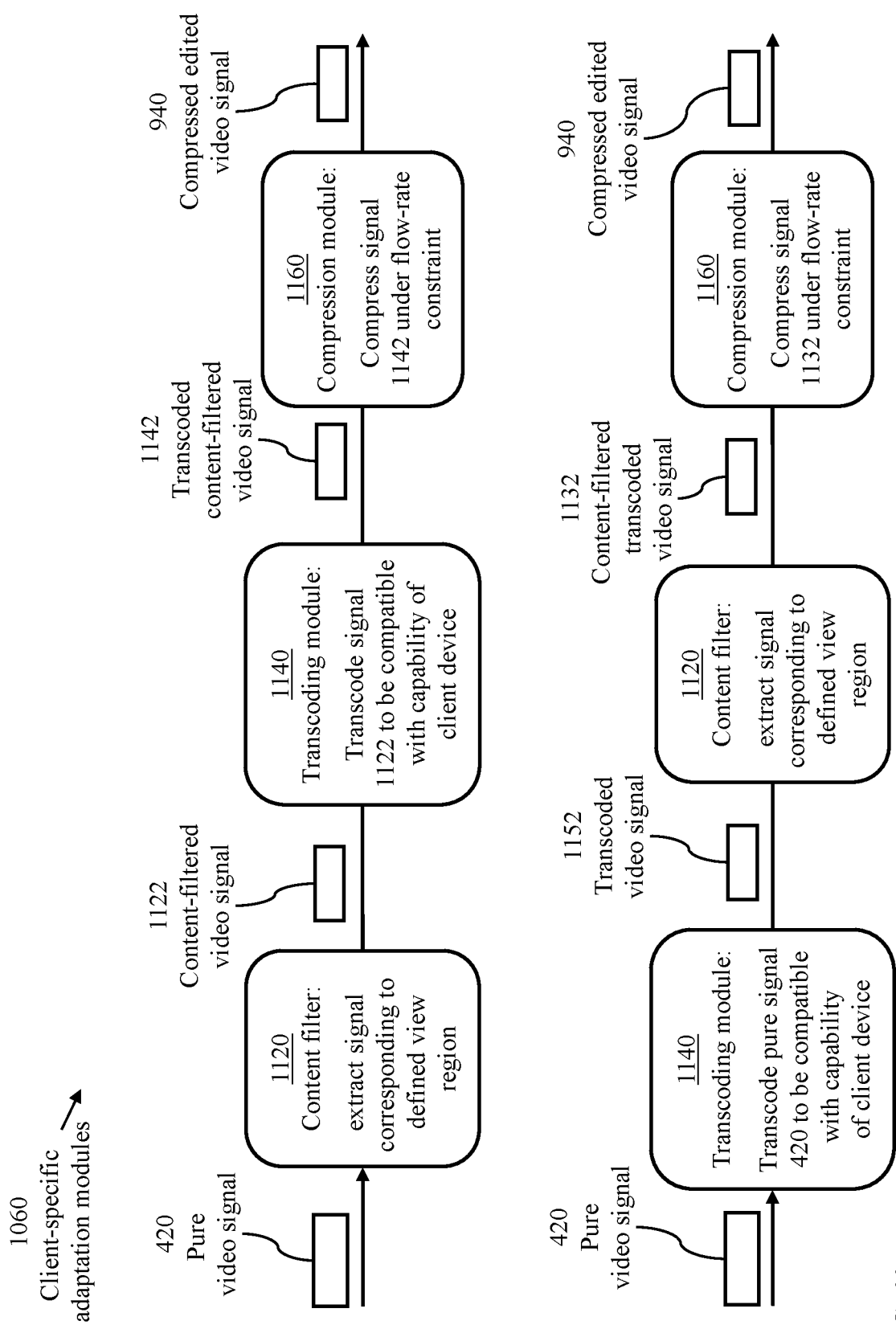
FIG. 11 details a client-specific adaptation module of the exemplary universal streaming server of FIG. 10, in accordance with an embodiment of the present invention.

FIG. 11 details a client-specific adaptation module 1060. The module comprises at least one memory device storing processor-executable instructions which, when executed, cause at least one processor to perform processes of content filtering of a video signal to extract a signal corresponding to a selected view region and transcoding the content-filtered video signal to be compatible with the capability of a target client device 180. The video signal may be compressed under the constraint of a permissible flow rate which may be a representative value of a time-varying flow rate.

A client-specific adaptation module 1060 comprises a content-filtering module (content filter) 1120, a transcoding module 1140 for signal adaptation to client-device capability, and a server compression module 1160 for producing a video signal having a flow rate within a permissible flow rate.

In accordance with one embodiment, content filter 1120 processes the pure video signal 420 to extract signal portions which correspond to a specified view region yielding a content-filtered signal 1122. The mean flow rate of content-filtered signal 1122 would be lower than the mean flow rate of pure video signal 420. If content-filtered signal 1122 is compatible with the capability of a target client device and has a flow rate satisfying a respective permissible value, the signal may be transmitted to the target client device. Otherwise, transcoding module 1140 is applied to transcode content-filtered signal 1122 to be compatible with characteristics of the target client device such as an upper bound of a frame rate and a frame resolution upper bound. If the resulting transcoded content-filtered signal 1142 has a flow rate not exceeding the permissible value, signal 1142 may be transmitted to the target client device. Otherwise, server compression module 1160 may be applied to compress signal 1142 according to the permissible flow rate yielding signal 940 which is a compressed, transcoded, and content-filtered signal.

In accordance with another embodiment, transcoding module 1140 may be applied to transcode pure video signal 420 to yield a transcoded signal 1152 compatible with the capability of the target client device. Content filter 1120 processes signal 1152 to extract signal portions which correspond to a specified view region yielding a content-filtered transcoded signal 1132. The mean flow rate of content-filtered transcoded signal 1132 would be lower than the mean flow rate of pure video signal 420. If signal 1132 has a flow rate satisfying a permissible value, the signal may be transmitted to the target client device. Otherwise, server compression module 1160 may be applied to compress signal 1132 according to the permissible flow rate yielding signal 940 which is now a compressed, transcoded, and content-filtered signal.

An uncompressed or decompressed video signal which is de-warped at the source or at the server is a pure video signal. To provide service to a specific client device, the pure video signal is transcoded to produce a transcoded signal compatible with the client device. The pure video signal corresponds to an attainable coverage of a solid angle of up to $4\pi$ Steradians and is likely to have a large flow rate (bit rate), of multi Gb/s for example, which may exceed the available capacity of a path from the server to the client device. The transcoded signal may also have a flow rate that exceeds the capacity of the path. Thus, the transcoded signal may be compressed to yield a flow rate not exceeding the capacity of the path.

The compressed transcoded signal is transmitted to the client device to be decompressed and displayed at the client device. A viewer at the client device may then identify a preferred view region and send descriptors of the preferred view region to the server. The signal may then be content-filtered to retain only portions of the signal that correspond to the preferred view region. The content-filtered signal may be compressed then transmitted to the client device.

When the server accesses the panoramic multimedia source 110, the panoramic multimedia source provides a multimedia signal comprising the video signal as well control data including indications of any signal processing applied to the video signal, such as de-warping and compression. The acquired video signal is a panoramic video signal which may be produced by a single camera or produced by combining video signals from multiple cameras.

To enable a user of the client device to communicate identifiers of a preferred view region, the server sends to the client device a software module devised for this purpose. The server may be partially or entirely installed within a shared cloud-computing network where the physical processors and associated memory devices are allocated as the need arises.

Figure 12:
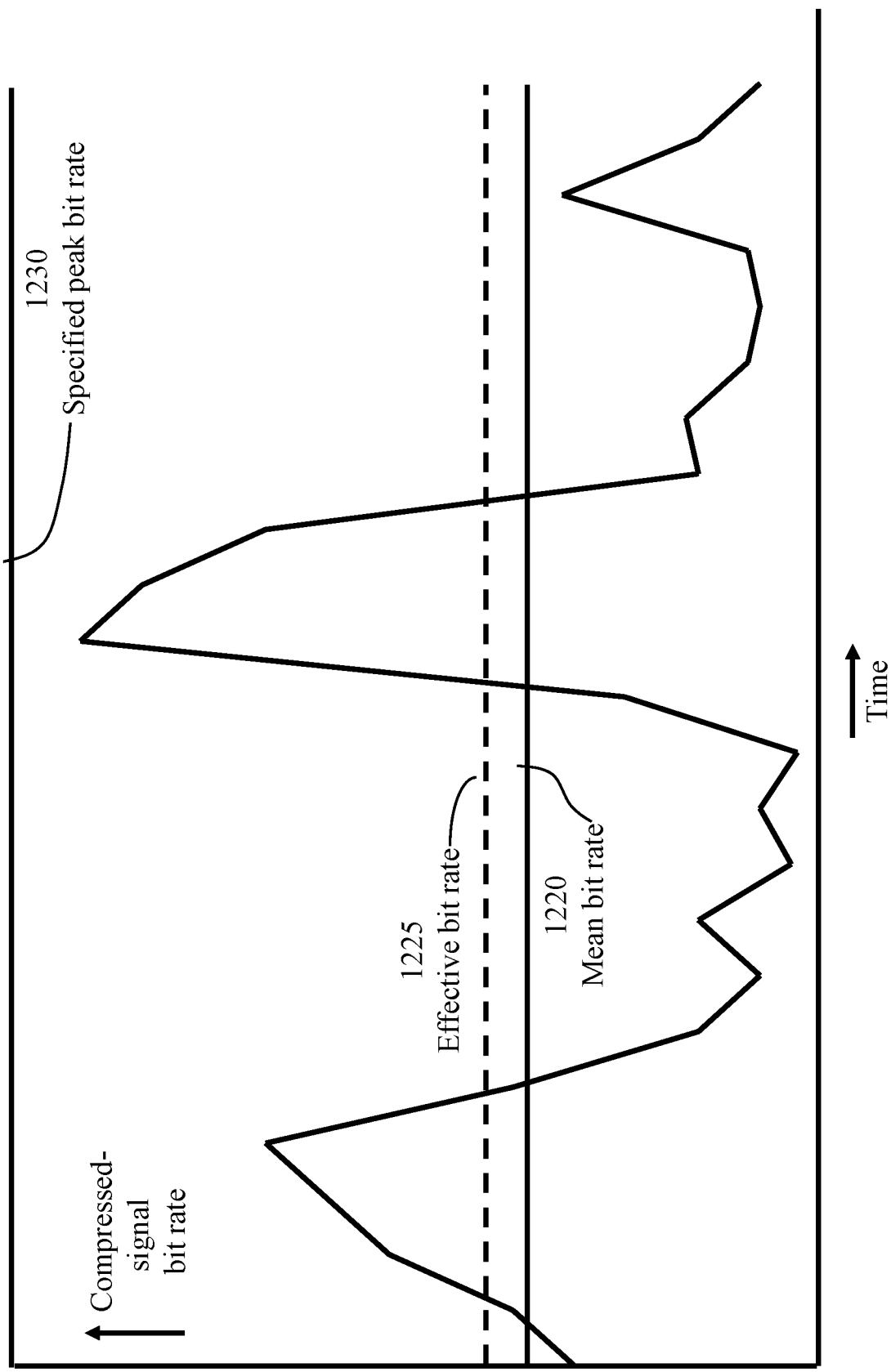
FIG. 12 illustrates temporal variation of flow rate of a compressed video signal.

FIG. 12 illustrates temporal variation of the flow rate (bit rate) of a compressed video signal. As well known in the art, a number of descriptors may be used to characterize a variable-flow-rate signal (also called a variable-bit-rate) such as a mean value 1220 and a peak value 1230 of the flow rate, and a parameter representing signal-burst duration. The descriptors and the capacity of a shared network path designated to transport the variable-bit-rate signal may be used to determine an effective flow rate (effective bit rate) 1225 which need be allocated in a communication path to transport the signal. Server compression module 1160 would be devised to ensure that the effective flow rate (effective bit rate) does not exceed a permissible flow rate of a (purchased) network connection.

In order to enable a client to select a partial-coverage view of a panoramic full-coverage view, the server may initially send a full-coverage video signal capturing the full-coverage view to the client.

According to one embodiment, the full-coverage video signal would be compressed to a level that permits producing a video display of an acceptable quality at the client's device.

According to another embodiment, where the capacity of a path from the server to the client does not permit transferring a properly compressed full-coverage video signal capturing the full-coverage view, a time-limited representation of the full-coverage signal would be generated as described below.

Figure 13:
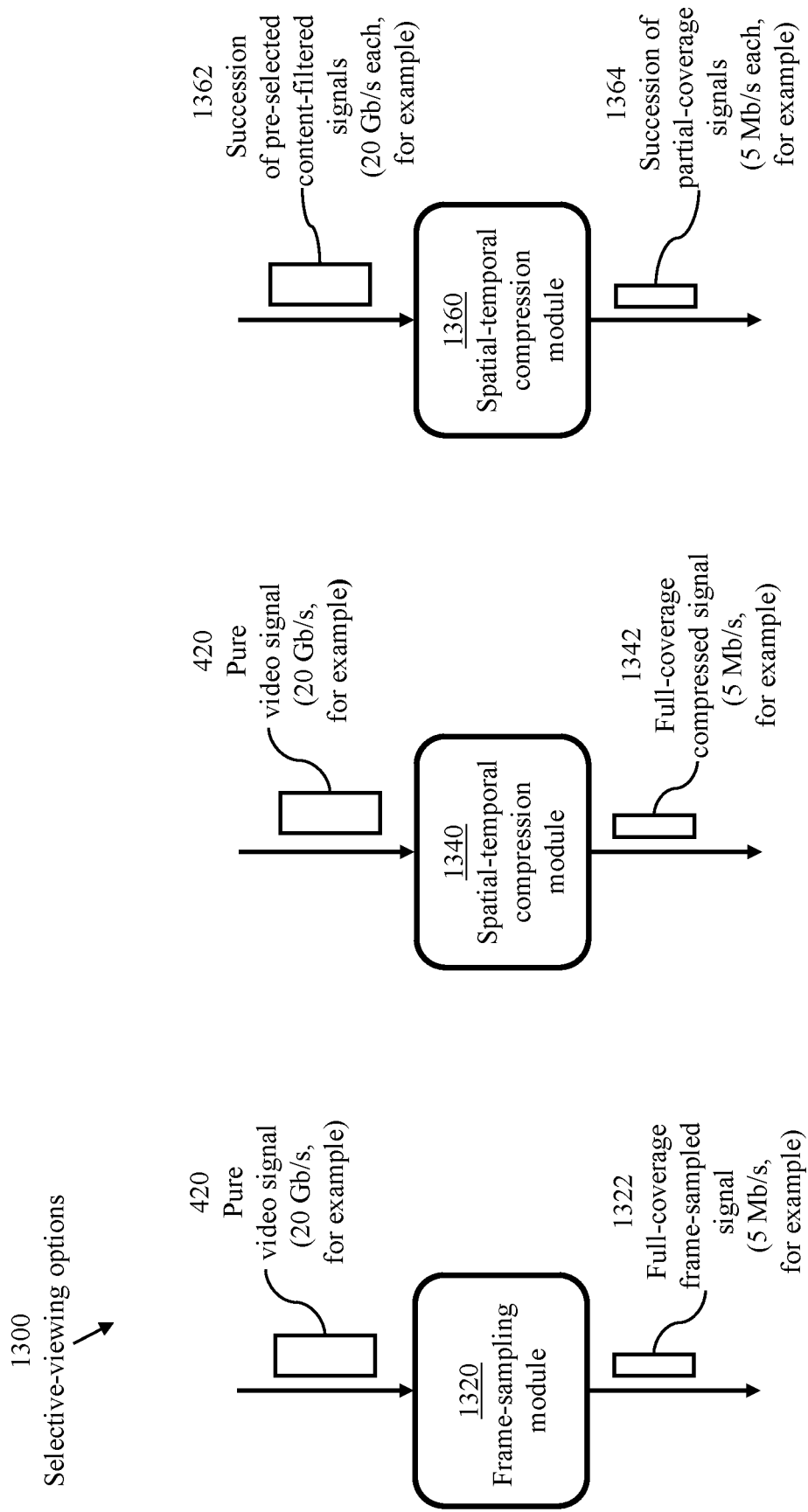
FIG. 13 illustrates modules for generating video signals of reduced flow rates yet suitable for exhibiting panoramic full spatial coverage to enable a client to select a preferred partial-coverage view, in accordance with an embodiment of the present invention.

FIG. 13 illustrates modules 1300 for generating time-limited video signals of reduced flow rates yet suitable for exhibiting panoramic full spatial coverage to enable a client receiving a time-limited video signal to select a preferred partial-coverage view.

Frame-sampling module 1320 comprises processor executable instructions which cause a processor to sample a pure video signal 420, or a transcoded video signal derived from the pure video signal, during distant frame intervals to produce a frame-sampled video signal 1322 corresponding to full spatial-coverage sampled images. Frame-sampled video signal 1322 is not compressed and has a constant flow rate not exceeding a permissible flow rate. The frame-sampled video signal 1322 may be displayed at a client device.

Pure video signal 420 may be a corrected signal 322 or a rectified signal 324 (FIG. 3). The inter-frame sampling period is selected so that the (constant) flow rate of the stream of sampled portions of a pure video signal 420 does not exceed a permissible flow rate. For example, if the data flow rate of a pure video signal 420 is 1 Gb/s and the permissible flow rate is 5 Mb/s, then frame-sampling module 1320 would select one frame out of each set of 200 successive frames. A specific client device 180 receiving the sampled frames would then display each frame repeatedly during a period of 200 frame intervals (5 seconds at a frame rate of 40 frames per second). The server 120 starts to send a respective edited multimedia signal 940 (FIG. 9) and terminates transmitting frame samples after the server receives an indication of a preferred view region from the specific client device.

The server 120 may send view-selection software instructions to each client device to facilitate client's selection of a preferred view region. The software instructions may be sent along the same path carrying downstream control data 945 (FIG. 9).

Thus, server 120 may employ a frame-sampling module comprising processor executable instructions which cause a processor to sample a video signal during distant frame intervals to produce a frame-sampled video signal. The server further comprises a memory device storing software modules for distribution to the plurality of client devices to enable users of the client devices to communicate identifications of preferred viewing regions to the server.

Spatial-temporal server compression module 1340 comprises processor executable instructions which cause a processor to compress pure video signal 420, or a transcoded video signal derived from the pure video signal, to produce a compressed signal 1342 corresponding to full spatial-coverage images. Compressed signal 1342 would have a fluctuating flow rate as illustrated in FIG. 12 and server compression module 1340 ensures that the effective flow rate (effective bit rate) does not exceed a permissible flow rate.

A spatial-temporal compression module 1360, similar to spatial-temporal server compression module 1340, causes a processor to compress preselected content-filtered signals (partial coverage signals) 1362 derived from a pure video signal 420. A succession of compressed content filtered signals 1364, occupying successive time windows, is sent to a target client device. Each of compressed signals 1364 would have a fluctuating flow rate as illustrated in FIG. 12 and compression module 1360 ensures that the effective flow rate (effective bit rate) of each compressed signal 1364 does not exceed a permissible flow rate.

Figure 14:
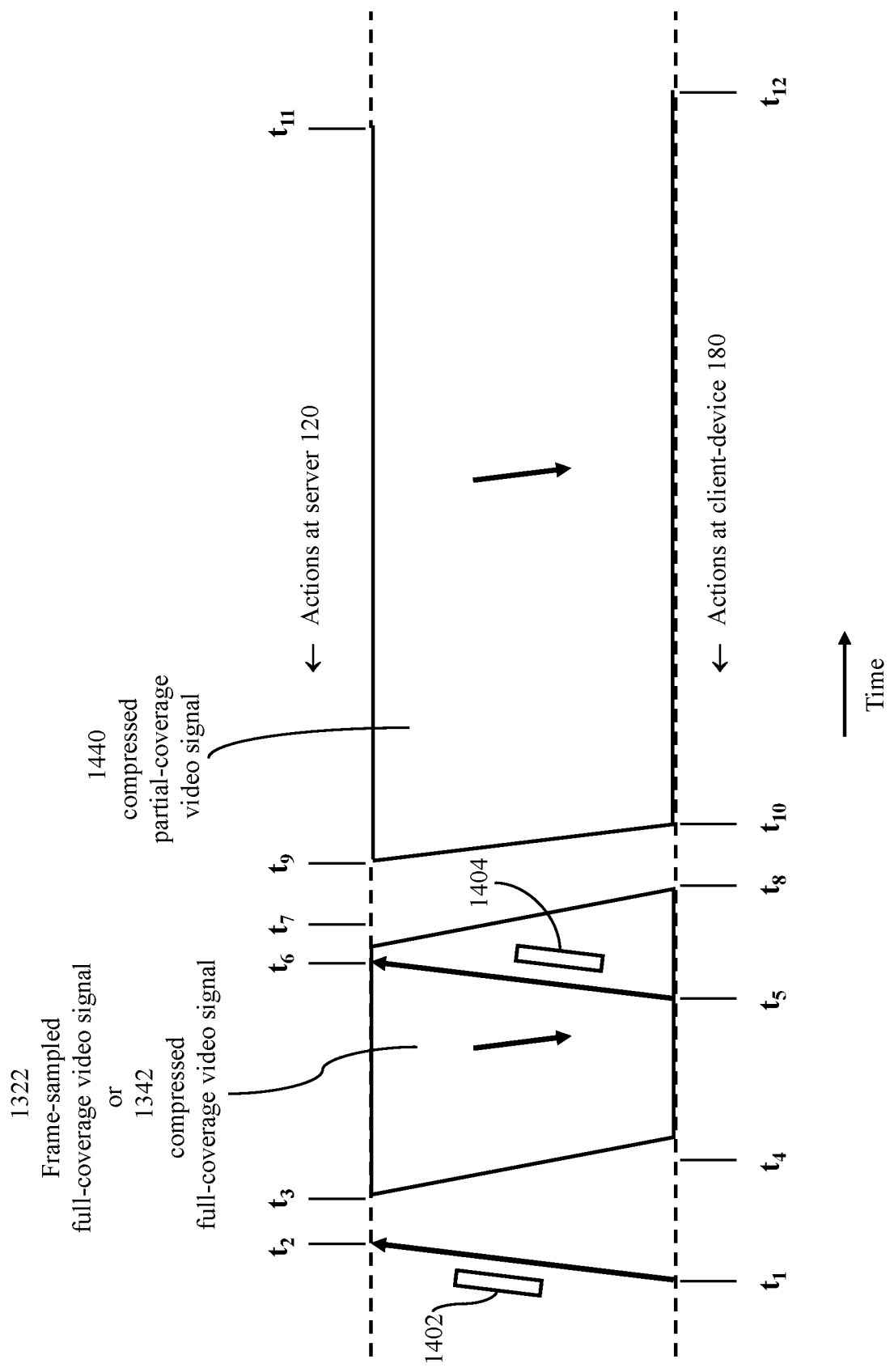
FIG. 14 illustrates a process of requesting and acquiring a content-filtered video signal, in accordance with an embodiment of the present invention.

FIG. 14 illustrates a process of providing a content-filtered video signal to a client device. At an instant of time $t_1$, a user of a specific client device 180 sends a message 1402 to a server 120 requesting viewing of a specific event. The message is received at the server 120 at time $t_2$. Several view-selection methods may be devised to enable a user of the specific client device to communicate identifiers of a preferred view region to the server.

In one view-selection method, the server sends a frame-sampled signal 1322, which corresponds to selected full spatial-coverage panoramic images, at time $t_3$. At time $t_4$, the client device 180 starts to receive frame-sampled signal 1322 which is submitted to a display device after accumulating content of one frame. At time $t_5$, the user of the specific client device sends a message 1404 providing parameters defining a selected view region. Message 1404 is received at the server at time $t_6$. The server 120 formulates a respective content filtered video signal corresponding to the selected view region. The respective content filtered video signal may be compressed to produce a compressed content-filtered signal (partial-spatial-coverage signal) 1440. The server terminates transmission of the frame-sampled signal 1322 at time $t_7$ and starts to send compressed content-filtered signal 1440 to the client device 180 at time $t_9$. Signal 1440 is decompressed and displayed at the client device. The client device receives the last frame of frame-sampled signal 1322 before time $t_8$ and starts to receive compressed signal 1440 at time $t_{10}$. Transmission of compressed signal 1440 ends at time $t_{11}$ and receiving the signal at the client device ends at time $t_{12}$.

In another view-selection method, the server generates a full-coverage video signal 1342 that is client-device compatible and compressed to a permissible flow rate as illustrated in FIG. 13. The server sends the signal 1342 at time $t_3$ and the client device 180 starts to receive the compressed signal at time $t_4$. The compressed signal 1342 is decompressed at the client device and submitted to a display device. The sequence of events after time $t_4$ would be similar to the sequence of events corresponding to the case of frame-sampled video signal 1322.

In a further view-selection method, the server derives from pure video signal 420 several content-filtered video signals 1362 corresponding to preselected view regions as illustrated in FIG. 13. Each of the derived content-filtered video signals would be compatible with the capability of the client device and compressed to a permissible flow rate. A succession of compressed signals 1364 may be sent to the client device and a user of the client device may send a message to the server indicating a preferred one of the preselected view regions.

Thus the present invention provides a method of signal streaming comprising editing content of the video signal to produce a set of content-filtered signals corresponding to a predefined set of view regions. Each content-filtered signal is transcoded to produce a set of transcoded signals compatible with a particular client device. Each of the transcoded signals is compressed to produce a set of compressed signals. The compressed signals are successively transmitted to the client device. Upon receiving from the particular client device an identifier of a specific compressed signal corresponding to a preferred view region, only the specific compressed signal is subsequently transmitted to the client device.

Figure 15:
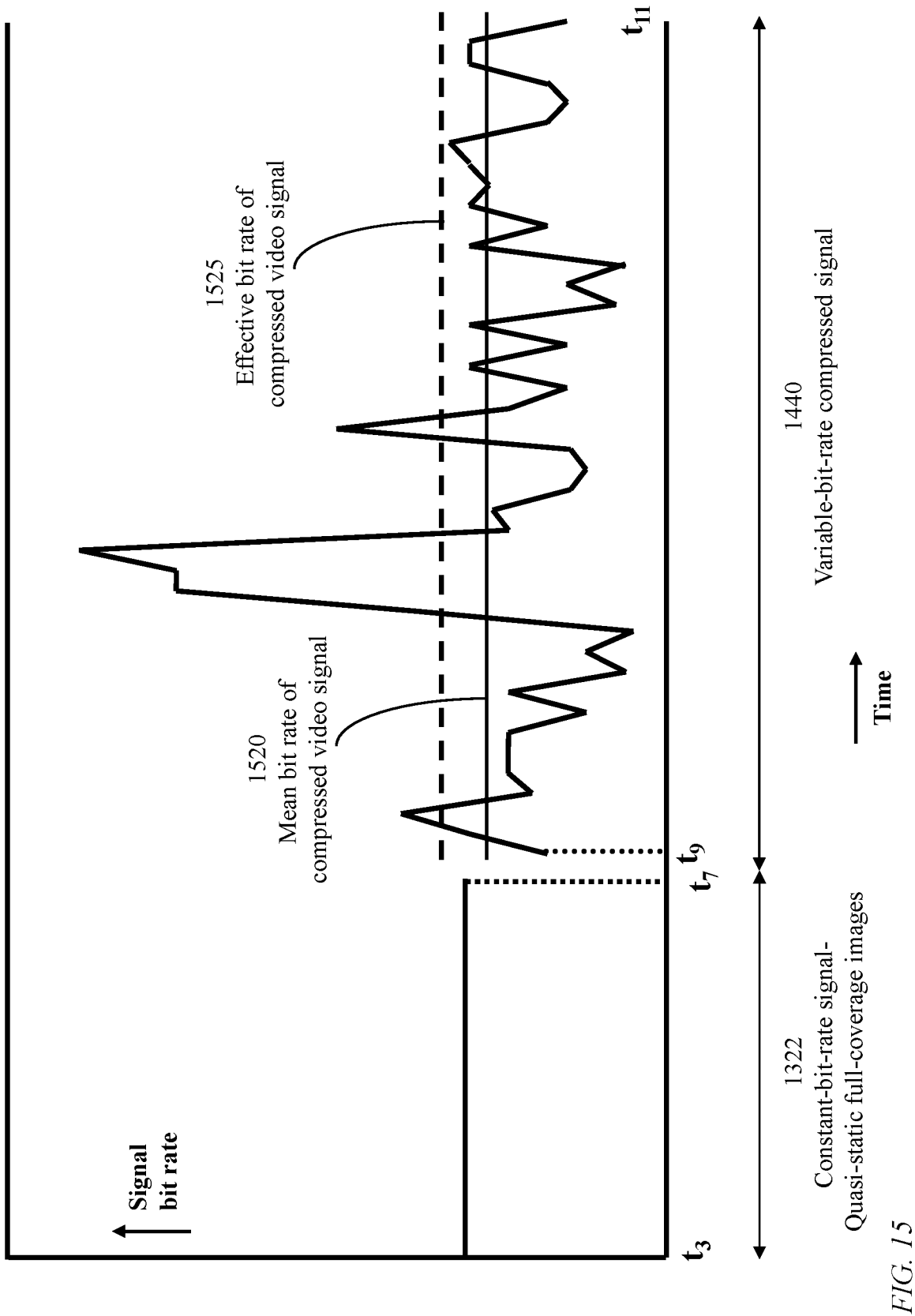
FIG. 15 illustrates temporal flow-rate variation of video signals transmitted from a universal streaming server to a client device, the video signals including a frame-sampled video signal followed by a compressed video signal.

FIG. 15 illustrates temporal bit-rate variation (flow rate variation) of video signals transmitted from a server 120 to a client device 180. The bit rate of frame-sampled signal 1322 is constant and set at a value not exceeding a predefined permissible bit rate. The bit rate of compressed content-filtered signal 1440 is time variable. As well known in the art, a variable bit rate may be characterized by parameters such as a mean bit rate, a peak bit rate, and a mean data-burst length. The parameters, together with the capacity of a respective network path, may be used to determine an "effective bit rate" 1525 which is larger than the mean bit rate 1520. The formulation of the frame-sampled signal 1322 ensures that the resulting constant bit rate does not exceed the predefined permissible bit rate (which may be based on a service-level agreement or network constraints). The compression process at the server 120 is devised to ensure that the effective bit rate of the compressed signal 1440 does not exceed the permissible bit rate.

To provide service to a set client devices of a specific client device, the pure video signal may be transcoded to produce a transcoded signal compatible with the client-device type. The transcoded signal may have a flow rate that exceeds the capacity of some of the paths from the server to the client devices. To provide the client devices with a full-coverage (attainable-coverage) view, a signal sample of a reduced flow rate is generated and multicast to client devices. A signal sample may be a frame-sampled transcoded signal or a compressed transcoded signal. Upon receiving from a particular client device an identifier of a respective preferred view region, the transcoded signal is content-filtered to produce a client-specific signal corresponding to the respective preferred view region. The client-specific signal is compressed and transmitted to the particular client device.

Signal-Editing Module

Figure 16:
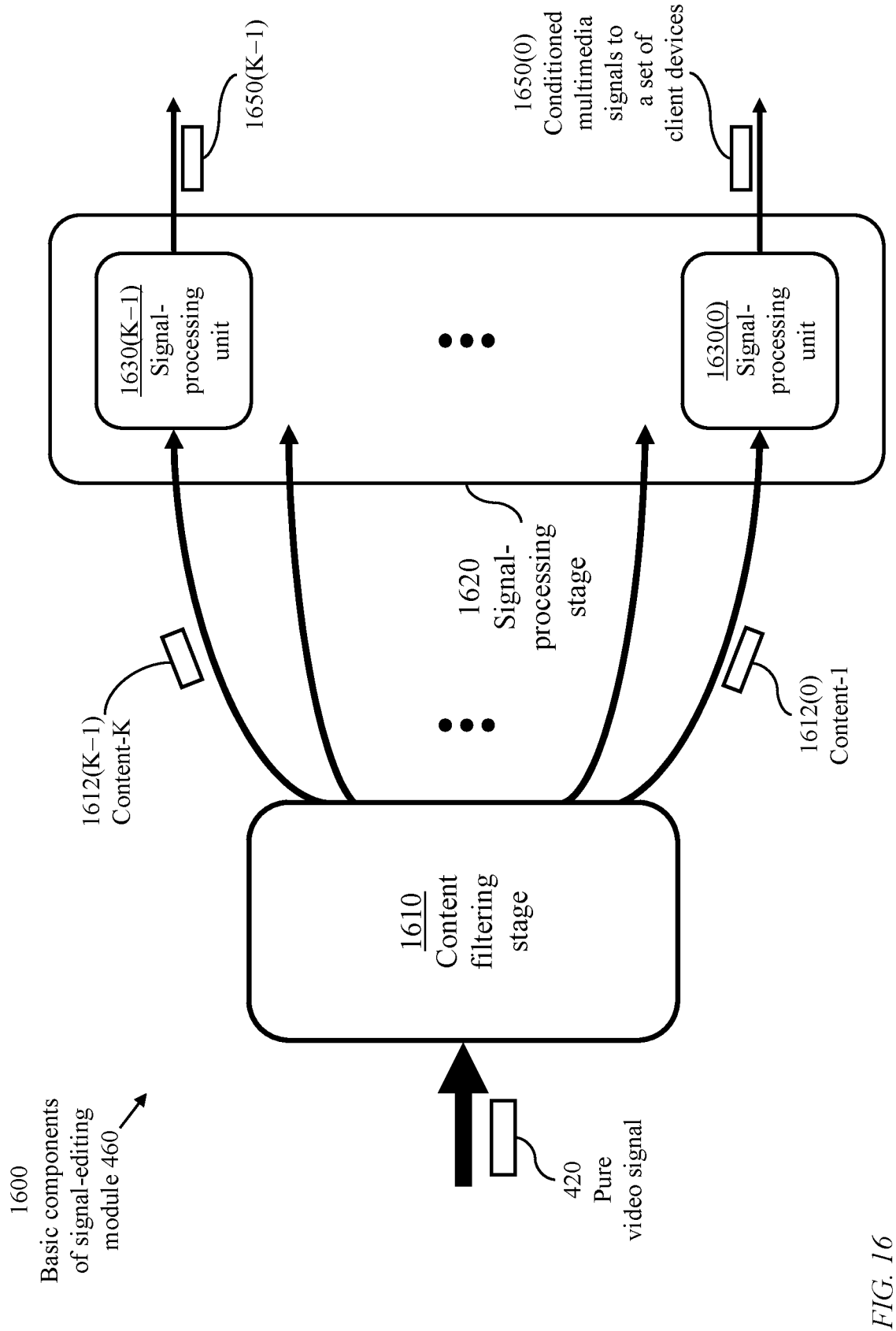
FIG. 16 illustrates the signal-editing module of FIG. 4 structured as a content-filtering stage and a signal-processing stage, in accordance with an embodiment of the present invention.

FIG. 16 illustrates basic components 1600 of signal-editing module 460 (FIG. 4 to FIG. 8) of a server 120. In a first stage 1610, the pure video signal 420 is processed to produce a number K, K≥1, of content-filtered signals 1612. In a second stage 1620, each content-filtered signal 1612 is adapted to a respective client device or a group of client devices 180. Each content-filtered signal is directed to a respective signal-processing unit 1630 to produce a respective conditioned signal 1650 satisfying a number of conditions including upper bounds of frame-rate, resolution, and flow rate (bit rate). A conditioned signal 1650 may be suitable to multicast to a number of client devices. The content-filtered signals 1612 are individually identified as 1612(0) to 1612(K−1). The signal-processing units 1630 are individually identified as 1630(0) to 1630(K−1). The conditioned signals 1650 are individually identified as 1650(0) to 1650(K−1).

Figure 17:
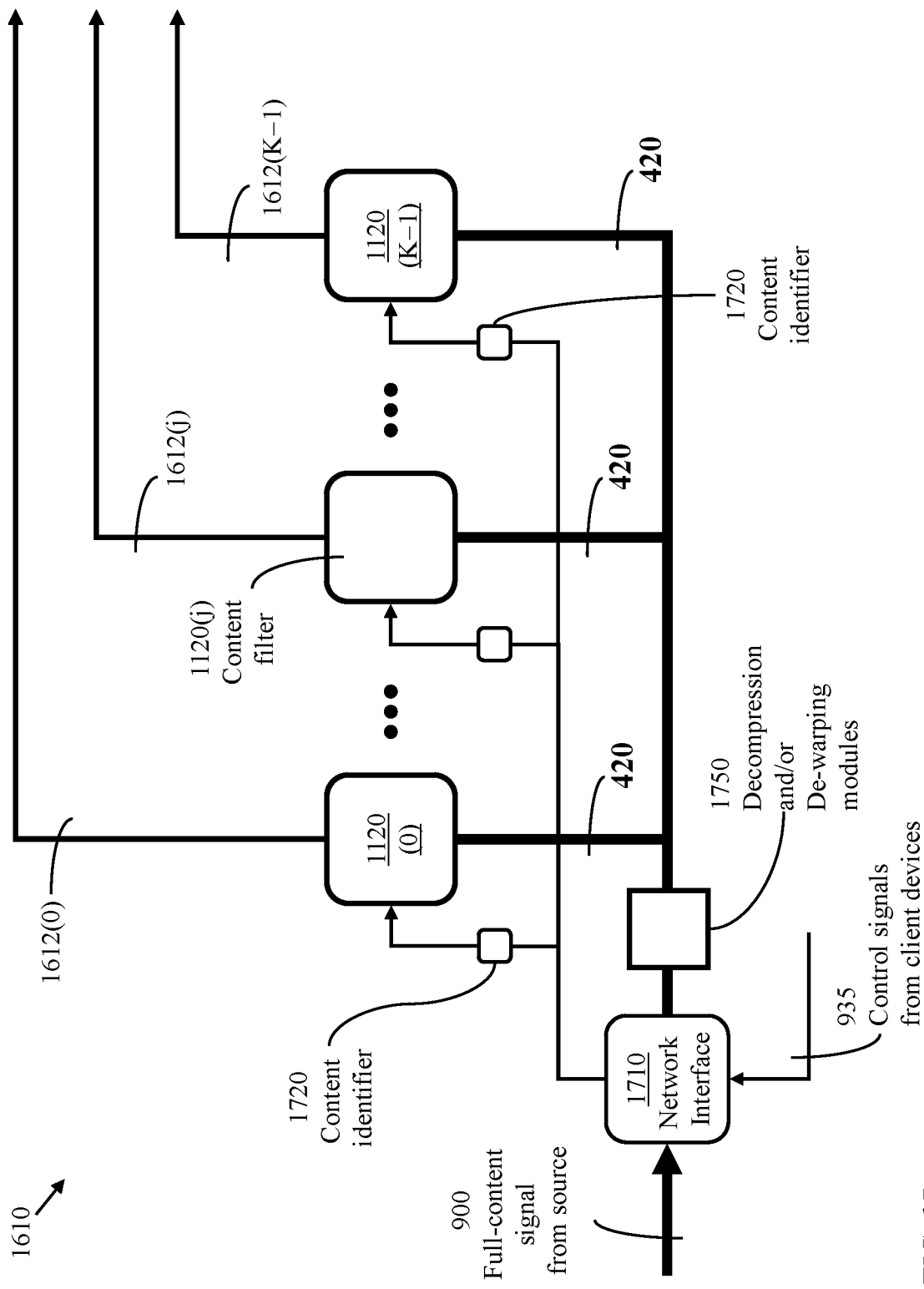
FIG. 17 illustrates the content-filtering stage of FIG. 16 implemented as an array of content filters for concurrent generation of different partial-content signals from a full-content signal, in accordance with an embodiment of the present invention.

FIG. 17 illustrates a content-filtering stage 1610 comprising K content filters 1120, individually identified as 1120(0) to 1120(K−1), for concurrent generation of different partial-content signals from a full-content signal. A full-content signal 900 received through server-network interface 1710 may be decompressed and/or de-warped (modules 1725) to produce a pure video signal 420 which is routed to inputs of all content filters 1120. Parameters identifying requested contents are distributed to control inputs 1720 of the content filters 1120.

Each content filter 1120 is devised to cause a physical processor (not illustrated) to extract portions of pure video signal 420 which corresponds to a specified view region. The pure video signal 420 is submitted to each content filter 1120 which is activated to produce a corresponding content-filtered signal 1612. A particular content-filtered signal 1612 may be multicast to a number of clients that have indicated preference of the view region corresponding to the particular content-filtered signal. However, the client devices may have different characteristics, the capacities of network paths to the client devices may differ, and the permissible flow rates to the client devices may differ due differing network-path capacities and time-varying traffic loads at the client devices. Thus, content-filtered signals 1612 are processed in the second stage 1620 for adaptation to client devices and network-paths.

Figure 18:
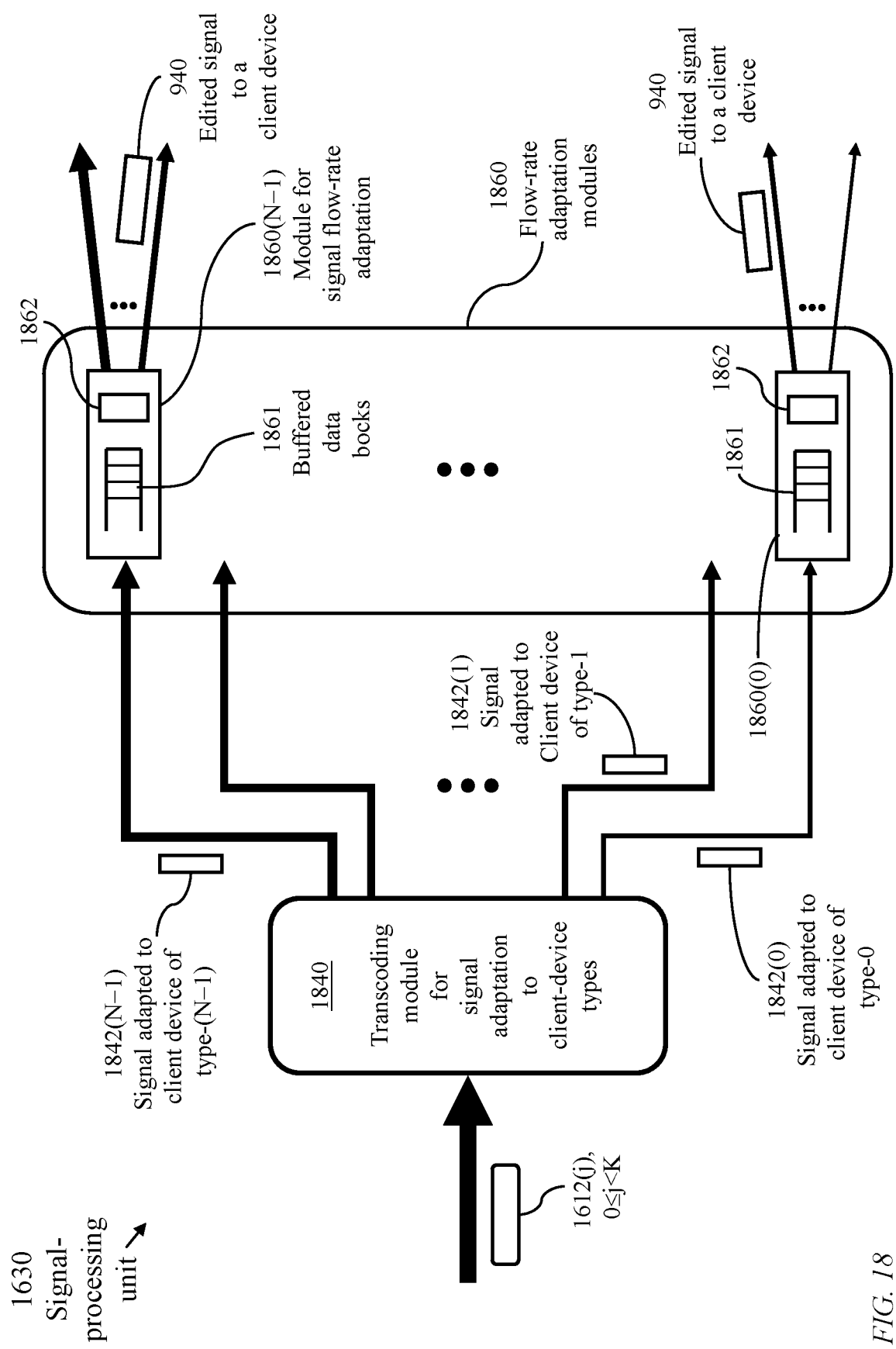
FIG. 18 illustrates a signal-processing unit of the signal-processing stage of FIG. 16.

FIG. 18 illustrates a signal-processing unit 1630, of the second stage 1620 of the signal-editing module 460, comprising a transcoding module 1840 for signal adaptation to client-device types and modules 1860 for signal flow-rate adaptation to conform to permissible flow-rates. A transcoding module 1840 may adapt a video signal to have a frame rate and resolution within the capability of a respective client device. With N types of active client devices, N≥1, a transcoding module 1840 produces N signals 1842, individually identified as 1842(0) to 1842(N−1), each adapted to a respective device type. A module 1860 may further reduce the flow rate of a signal if the flow rate exceeds a permissible value. Each module 1860($j$), 0≤j<N, comprises a buffer 1861 for holding a data block of a respective signal 1842 and a memory device 1862 storing processor-executable instruction for flow-rate adaptation.

Figure 19:
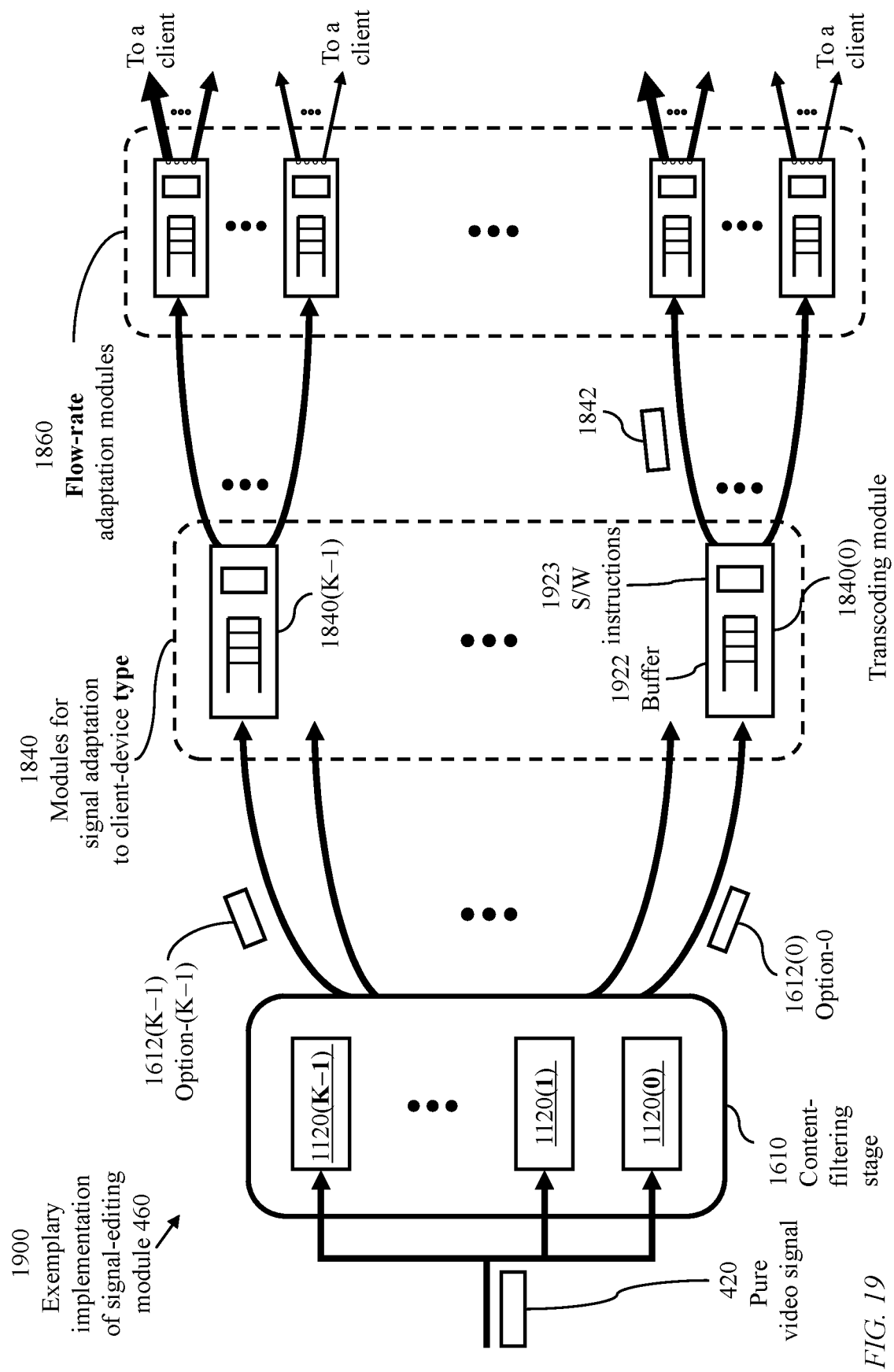
FIG. 19 illustrates the signal-editing module of FIG. 16 including details of the content-filtering stage and signal-processing stage, in accordance with an embodiment of the present invention.

FIG. 19 illustrates a complete structure 1900 of the signal-editing module 460. The content filtering stage 1610 comprises K content filters 1120 as illustrated in FIG. 17. Each content-filtered signal 1612 is submitted to a transcoding module 1840 to adapt the signal to a respective client-device type. A transcoding module 1840 comprises a buffer 1922 for holding a data block of a content-filtered signal 1612 and a memory device 1923 storing processor executable instructions which cause a processor to modify the frame rate and/or resolution to be compatible with the capability of a client-receiver. Each output signals 1842 of a transcoding module 1840 may be further processed at a flow-rate adaptation module 1860.

As illustrated in FIG. 17, K content filters 1120, individually identified as 1120(0) to 1120(K−1), K>1, may be activated simultaneously to extract different content-filtered signals 1612(0) to 1612(K−1) each further processed at a respective signal-processing unit 1630 to produce a signal 1650 suitable for display at a respective client device or a set of client devices. As illustrated in FIG. 18, a content-filtered signal 1612 is transcoded to be compatible with a target client device 180 and further adapted to a flow rate not exceeding a permissible upper bound.

Figure 20:
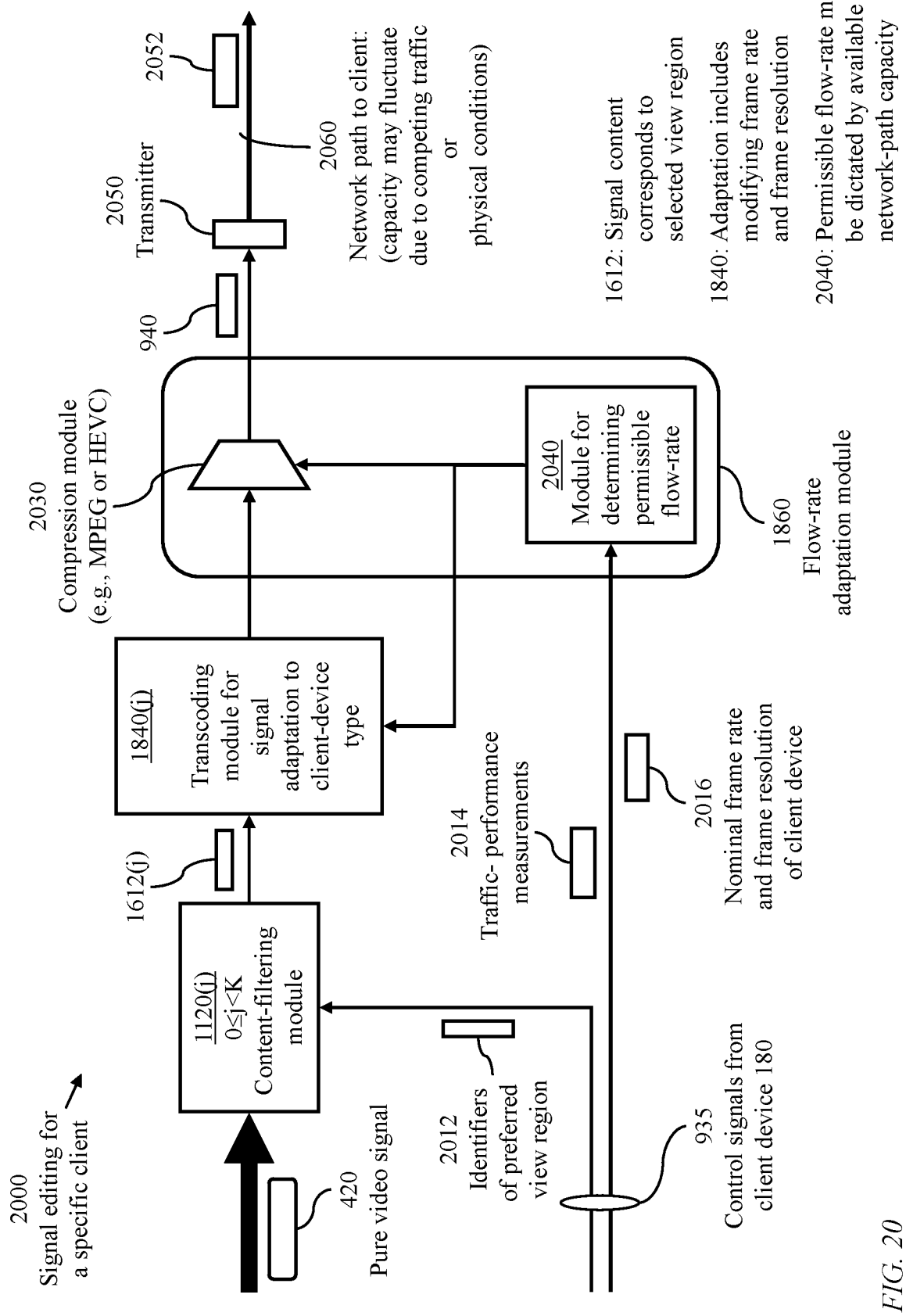
FIG. 20 illustrates processes of video signal editing for a target client device, in accordance with an embodiment of the present invention.

FIG. 20 illustrates processes 2000 of video signal editing for a target client device 180. Control signals 935 may provide traffic-performance measurements 2014, a nominal frame rate and frame resolution 2016, and identifiers 2012 of a preferred view region. A pure video signal 420 is directed to a content filter 1120(j) to extract content of pure video signal 420 that corresponds to a view region j identified by a user of the target client device. Flow-rate computation module 2040 is activated to determine a permissible flow rate Φ as well as a frame rate and frame resolution, compatible with the target client device 180, to be used in transcoding module 1840(j). Transcoding module 1840(j) is activated to adapt the extracted content-filtered signal 1612 (j) to the frame rate and frame resolution determined by flow-rate computation module 2040. Server compression module 2030 produces an edited video signal 940 (FIG. 9) which corresponds to an identified view region and is adapted to the capability of the target client device 180 and the capability of the network path from the server 120 to the target client device 180. Transmitter 2050 sends a signal 2052 to the target client device. Signal 2052 comprises video signal 940 together with accompanying multimedia signals (such as audio signals and/or text) and control signals. Signal 2052 is routed to the target client device along a network path 2060.

Figure 21:
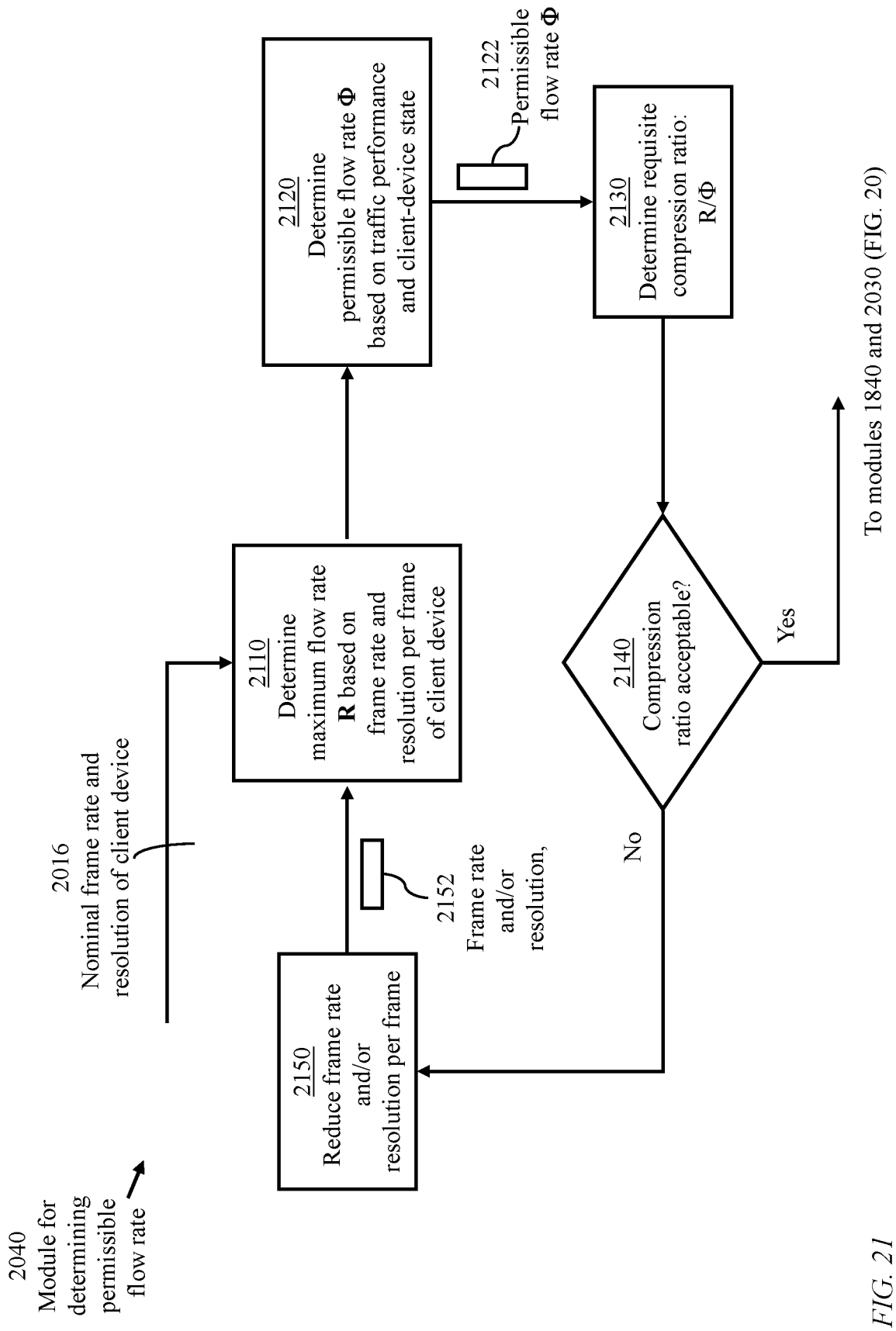
FIG. 21 details a module for determining permissible flow rates.

FIG. 21 details flow-rate computation module 2040. Starting with a nominal frame rate and nominal frame resolution of the target client device 180, which may be stored at the server or included in control signals 935 received from the target client, process 2110 determines the requisite flow rate R at the display device of the target client device 180 as a direct multiplication of the frame rate, the number of pixels per frame, and the number of bits per pixel. Independently, process 2120 determines a permissible flow rate Φ (reference 2122) between the server and the target client device based on measurements of traffic performance along the network path 2060 and the occupancy of a receiving buffer at the client device. The traffic-performance measurements include a data-loss indicator (if any) and delay jitter. The traffic-performance measurements are determined using techniques well known in the art. Determining the permissible flow rate based on measured traffic performance may be based on empirical formulae or based on a parameterized analytical model.

Process 2140 determines whether the compression ratio (determined in process 2130) of the requisite flow rate R at the display device of the target client server to the permissible flow rate Φ along the network path 2060 is suitable for server compression module 2030. If the flow rate R is to be reduced to satisfy a compression-ratio limit, process 2150 may determine a revised frame rate and/or a revised resolution 2152 to be communicated to transcoding module 1840 (FIG. 20). The permissible flow rate Φ may be communicated to server compression module 2030.

Figure 22:
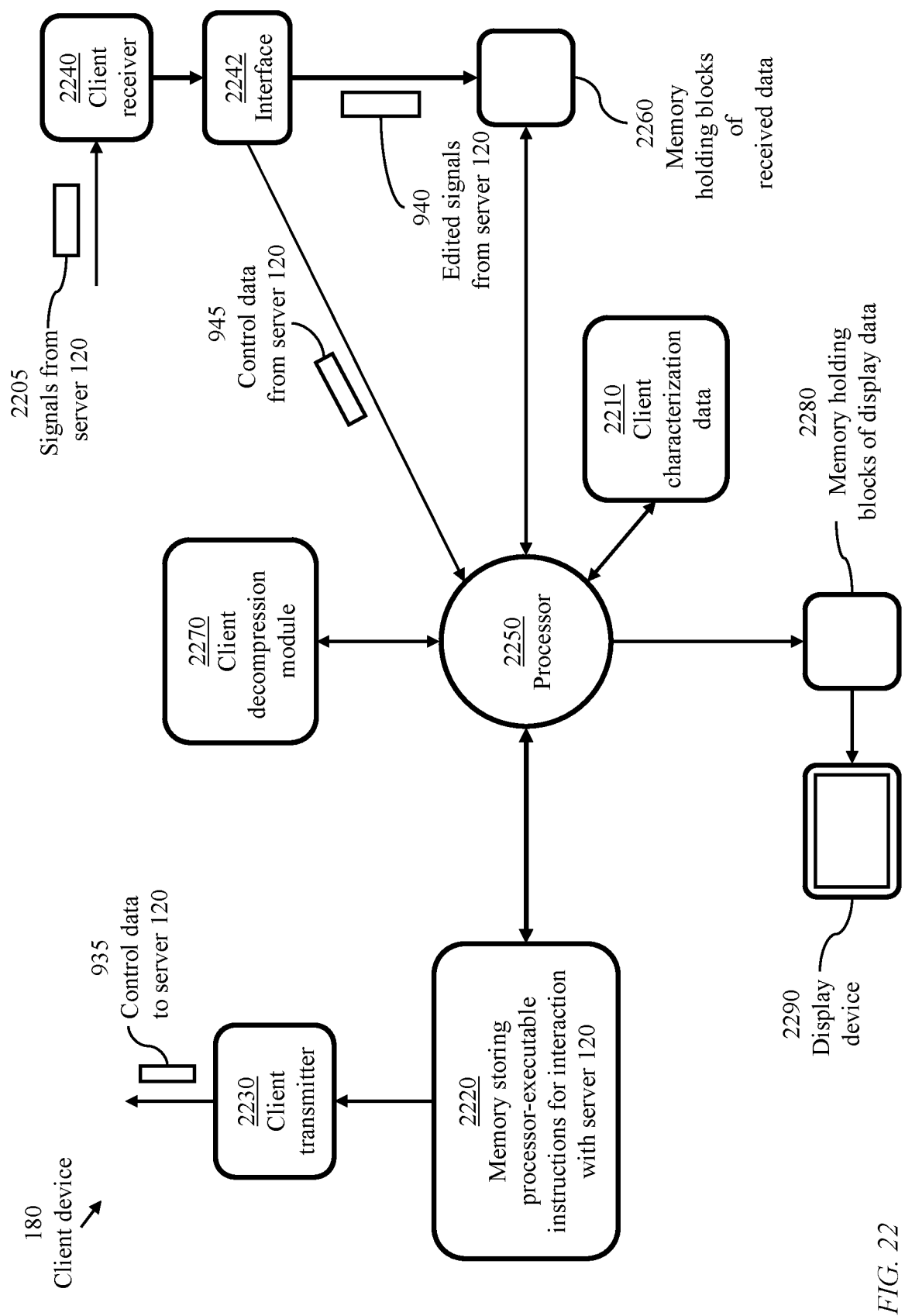
FIG. 22 illustrates components of a client device, in accordance with an embodiment of the present invention.

FIG. 22 illustrates components of a client device 180. A memory device 2210 stores client-device characterizing data, such as upper bounds of a frame rate and frame resolution of a display device. A memory device 2220 stores software instructions for interacting with specific servers 120. The instructions may include software modules to enable a user of a client device to communicate identifications of preferred viewing regions to the server. The software instructions may be installed by a user of a client device or sent from a server 120 together with the downstream control signals 945 (FIG. 9). A client transmitter 2230 transmits all control data from the client device to respective servers 120. A client receiver 2240 receives all signals from server(s) 120 including edited video signal 940 (which may be compressed), other multimedia data (audio signals and text), and control signals 945. An interface 2242 directs control signals 945 to processor 2250 and edited video signal 940, together with accompanying audio signals and text, to a memory device 2260 which buffers data blocks of incoming multimedia data comprising the video signal 940, audio data, and text. If the incoming multimedia data is not compressed, the data may be presented to the display device 2290. Otherwise, client decompression module 2270 decompresses the compressed data block buffered in memory device 2260 to produce display data to be held in memory device 2280 coupled to the display device 2290. Notably, a data block corresponding to one frame of a full-coverage frame-sampled signal 1322 (FIG. 13, FIG. 14) may be displayed numerous times before dequeueing from memory device 2280.

Figure 23:
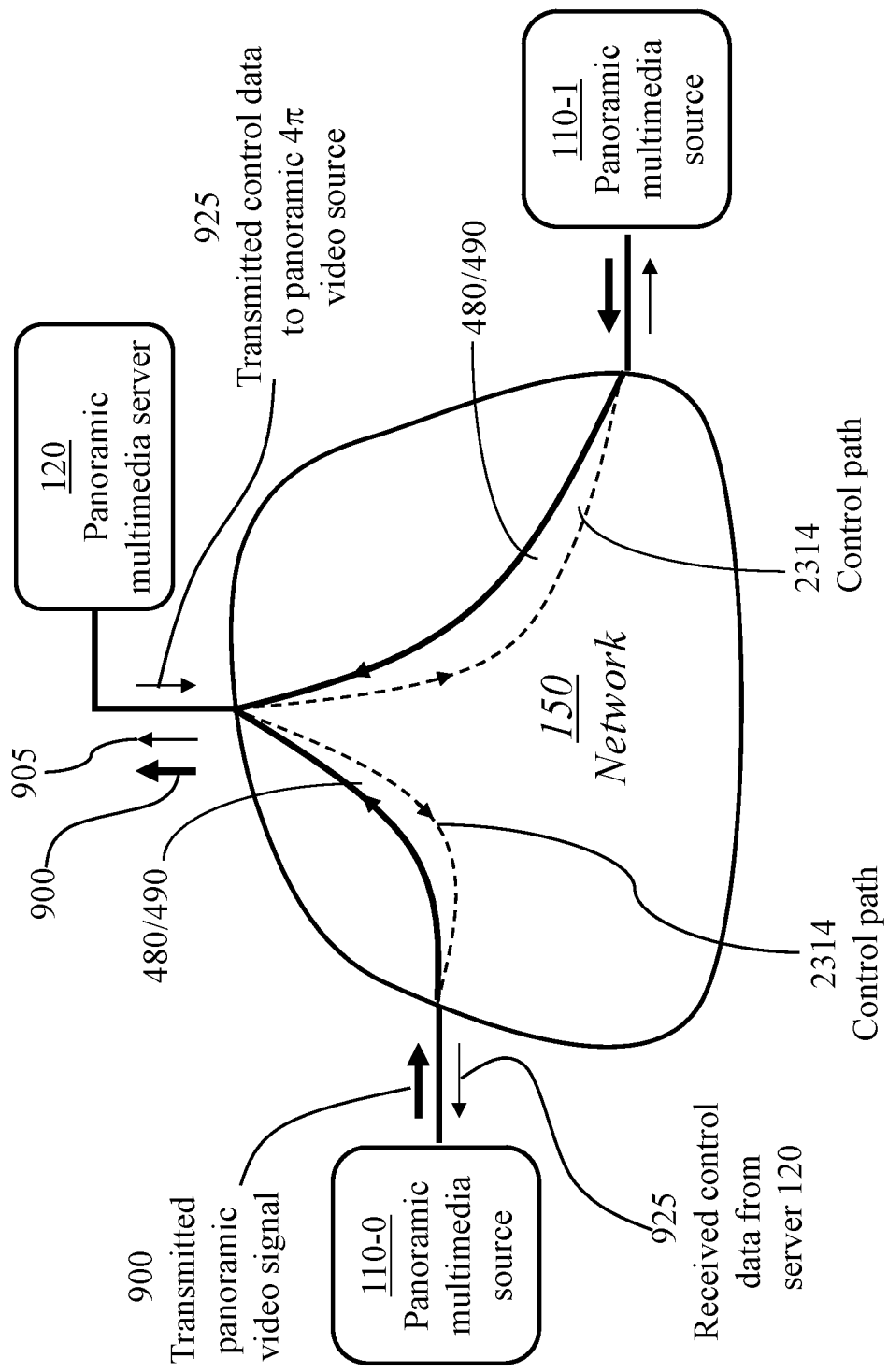
FIG. 23 illustrates communication paths between a universal streaming server and panoramic multimedia sources in accordance with an embodiment of the present invention.

FIG. 23 illustrates communication paths between a universal streaming server 120 and two panoramic multimedia sources 110-0 and 110-1 through network 150. A multimedia source 110 comprises a panoramic camera 310 (e.g., a 4π camera), and may include a de-warping module 330 and/or a source compression module 340 as illustrated in FIGS. 3 to 8. Although only two panoramic multimedia sources 110 are illustrated, it should be understood that the universal streaming server 120 may simultaneously connect to more multimedia sources 110 as illustrated in FIG. 2. In a preferred implementation, the universal streaming server is cloud-embedded so that the network connectivity and processing capacity of the universal streaming server may be selected to suit varying activity levels. A source multimedia signal from a panoramic multimedia source 110 is transmitted to the universal streaming server 120 through a network path 480/490 (FIG. 4) of an appropriate transmission capacity. The source multimedia signal includes a source video signal 900.

With an ideal network path 480/490, the received multimedia signal at the universal streaming server 120 would be a delayed replica of the transmitted video signal. The network path 480/490, however, may traverse a data router at source, a data router at destination, and possibly one or more intermediate data routers. Thus, the received multimedia signal may be subject to noise, delay jitter, and possibly partial signal loss. With signal filtering at the server 120 and flow-rate control, the content of the received multimedia signal would be a close replica of the content of the transmitted multimedia signal.

The source video signal 900 may be a "raw" video signal 312 produced by a panoramic camera, a corrected video signal 322, a compressed video signal 342, or a compact video signal 343 as illustrated in FIG. 3. A corrected video signal 322 is produced from the raw video signal using de-warping module 330. A compressed video signal 342 is produced from the raw signal 312, using source compression module 340 (FIG. 3), according to one of standardized compression methods or a proprietary compression method. A compact video signal 343 is produced from a corrected video signal 322 using a source compression module 340. The raw video signal may be produced by a single panoramic camera or multiple cameras.

The universal streaming server 120 may send control signals 925 (FIG. 9) to the panoramic multimedia source 110 through a network path 2314, which would be of a (much) lower transmission capacity in comparison with the payload path 480/490.

Figure 24:
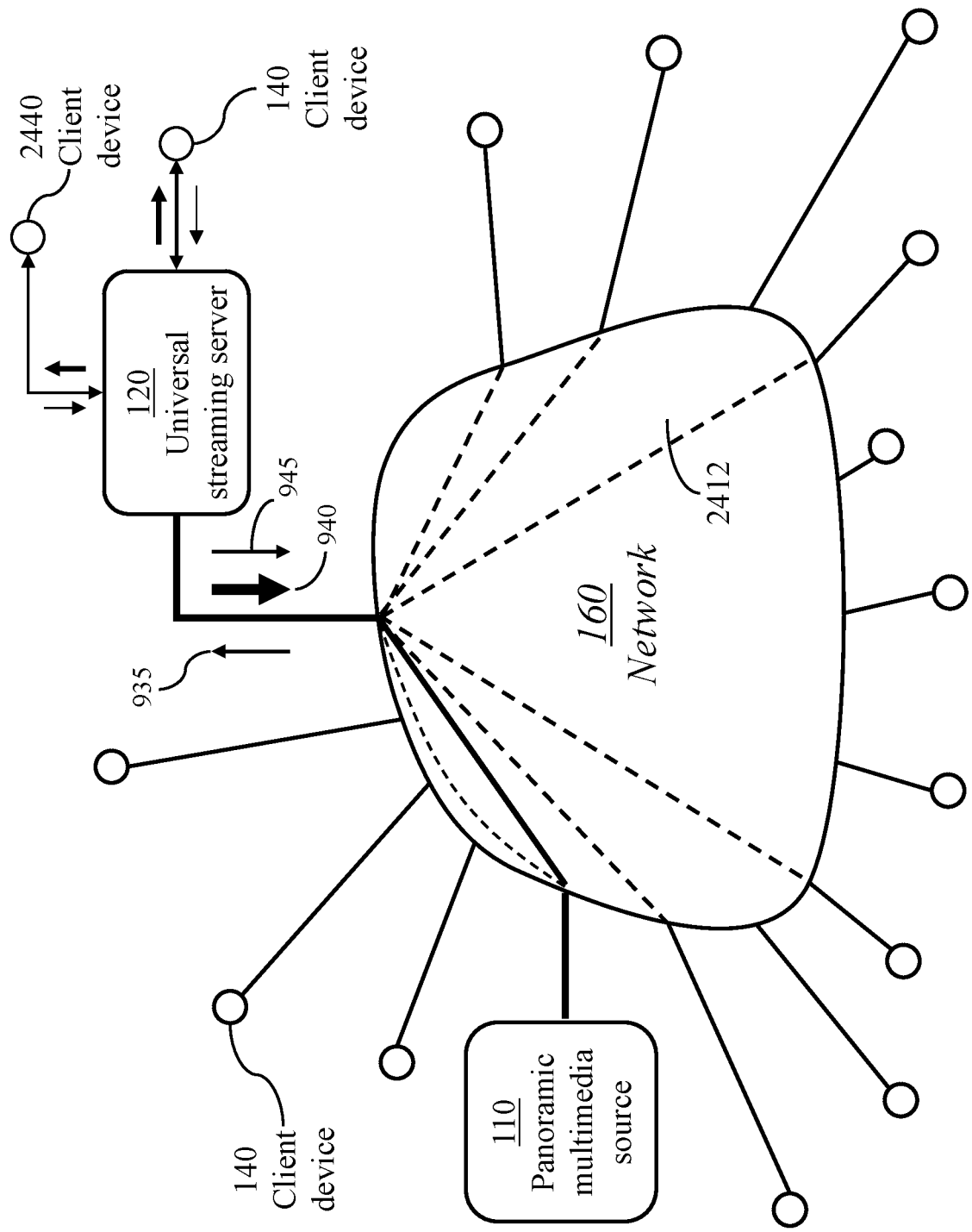
FIG. 24 illustrates communication paths between a universal streaming server and panoramic multimedia sources and communication paths between the universal streaming server and a plurality of heterogeneous client devices of a streaming system, in accordance with an embodiment of the present invention.

FIG. 24 illustrates a network 150 supporting a universal streaming server 120, a signal source 110 providing panoramic multimedia signals, and a plurality of client devices 180. Although only one signal source is illustrated, it should be understood that the universal streaming server 120 may simultaneously connect to multiple signal sources as illustrated in FIG. 2. Communication paths are established between the universal streaming server 120 and a plurality of heterogeneous client devices 180. The universal streaming server 120 sends edited multimedia signals 940 (FIG. 9) to the client devices through network paths 2412. The universal streaming server 120 receives control data 935 from individual client devices 180 through control paths (not illustrated) within network 150. The control data 935 may include requests for service and selection of view regions.

A source multimedia signal from the source 110 is transmitted to the server 120 through a payload network path 480/490 of sufficiently high capacity to support high-flow rate. The multimedia signal includes a source video signal 900 (FIG. 3, 312, 322, 342, or 343). Control signals from the server 120 to the signal source 110 are transmitted over a control path which would be of a much lower capacity in comparison with the payload network path 480/490. A video signal component 900 of the source multimedia signal may be an original uncompressed video signal produced by a panoramic camera or a compressed video signal produced from the original video signal according to one of standardized compression methods or a proprietary compression method. The original video signal may be produced by a single panoramic camera or multiple cameras.

With an ideal network path, the received video signal at the server 120 would be a delayed replica of the transmitted video signal. The network path, however, may traverse a data router at source, a data router at destination, and possibly one or more intermediate data routers. Thus, the received multimedia signal may be subject to noise, delay jitter, and possibly partial signal loss. The universal streaming server 120 receives commands from individual client devices 180. The commands may include requests for service, selection of viewing patterns, etc.

The video signals, individually or collectively referenced as 940, from the universal streaming server to client devices 180 are individually adapted to capabilities of respective client devices 180, available capacities ("bandwidths") of network paths, and clients' preferences. Control data from individual client devices to the universal streaming server are collectively referenced as 935 (FIG. 9). The universal streaming server 120 may be implemented using hardware processing units and memory devices allocated within a shared cloud computing network. Alternatively, selected processes may be implemented in a computing facility outside the cloud.

Figure 25:
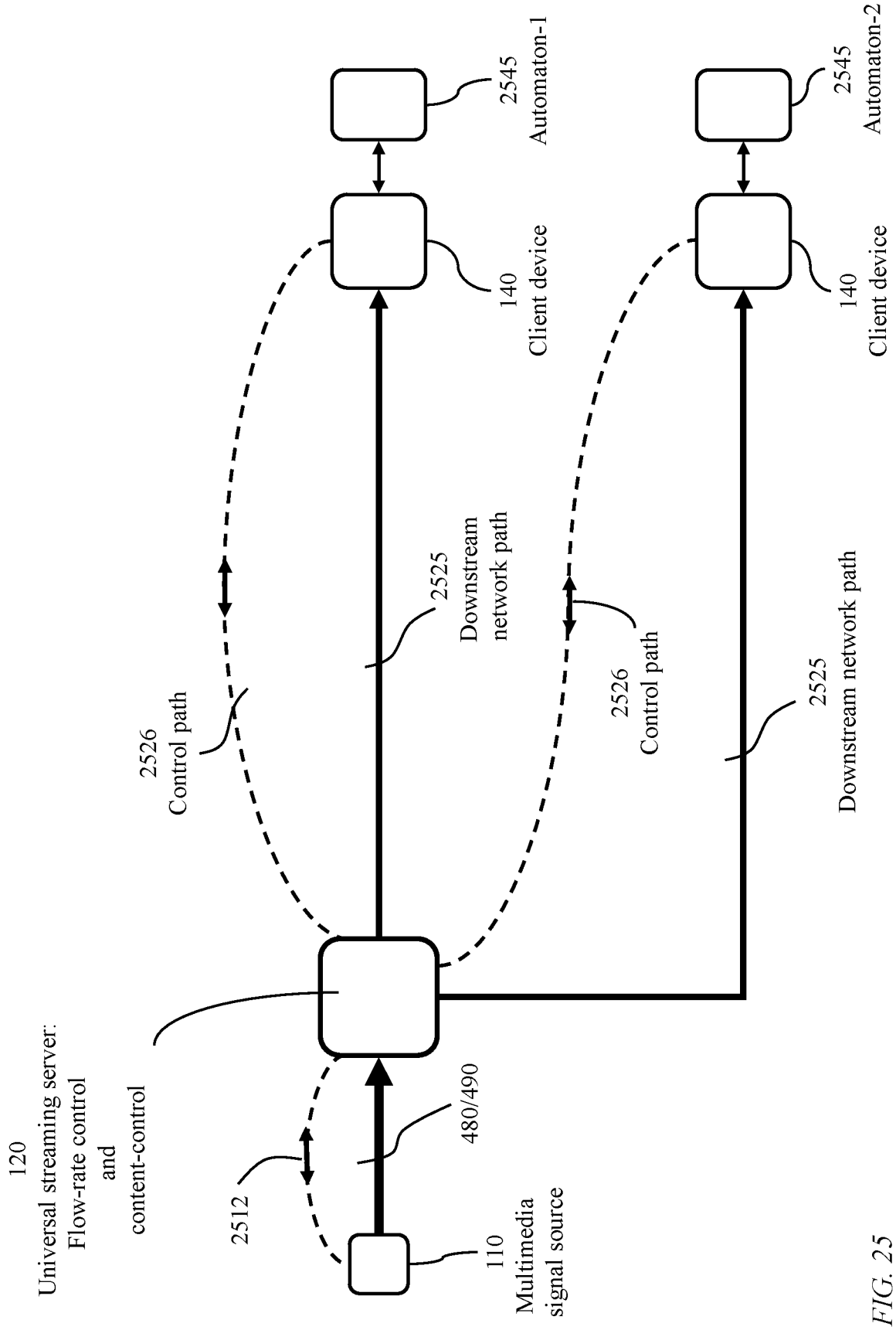
FIG. 25 illustrates communication paths between a universal streaming server and a multimedia signal source and communication paths between the universal streaming server and two client devices where an automaton associated with a client device may send commands to the universal streaming server, in accordance with an embodiment of the present invention.

FIG. 25 illustrates a path 480/490 carrying multimedia signals from a source 110 to a server 120 and a dual control path 2512 carrying control signals 905 from the source 110 to the server 120 and control signals 925 from the server 120 to the source 110. Downstream network path 2525 carries multimedia signals from the server 120 to a client 180. Dual control path 2526 carries downstream control signals to a client device 180 and upstream control signals 935 from the client device 180 to the server 120. An automaton 2545 associated with a client device 180 may send commands to the universal streaming server. The automaton would normally be a human observer. However, in some applications, a monitor with artificial-intelligence capability may be envisaged.

Client-specific multimedia signals 940 adapted from a panoramic multimedia signal 900 generated at the multimedia source 110 may be multicast to the plurality of heterogeneous client devices 180. The multimedia signals 940 are individually adapted to capabilities of respective client devices, available capacities ("bandwidths") of network paths, and clients' preferences.

Figure 26:
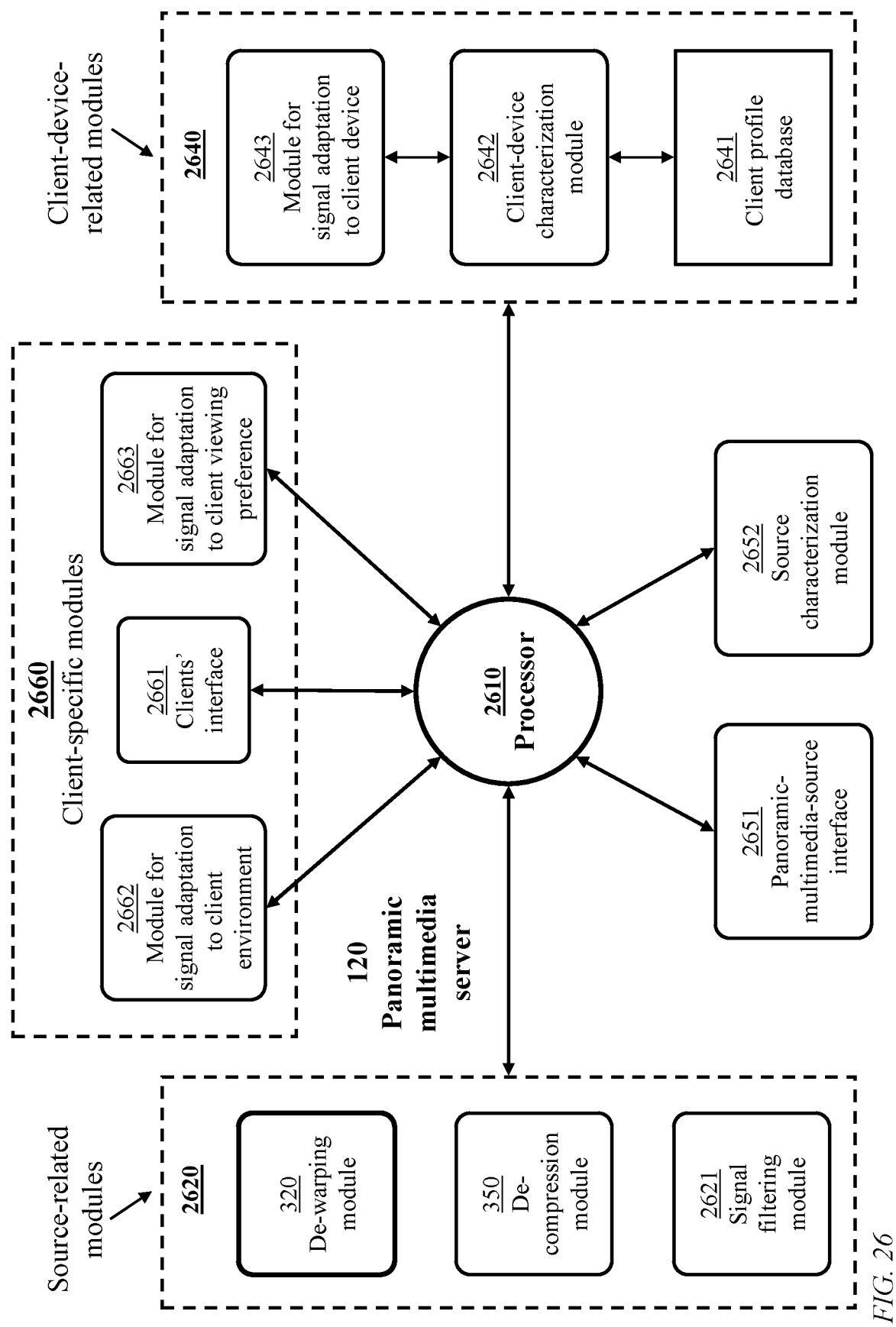
FIG. 26 illustrates a modular structure of the universal streaming server, in accordance with an embodiment of the present invention.

FIG. 26 illustrates a modular structure of the universal streaming server 120 comprising at least one hardware processor 2610. A server-source interface 2651 controls communication with the multimedia source 110. A source-characterization module 2652 characterizes the multimedia source 110 and communicates source-characterization data to a set 2620 of modules devised to process the received panoramic video signal 900. The source-characterization data may be determined from characterization data communicated by a panoramic multimedia source or from stored records. The set 2620 of modules includes a signal filtering module 2621, for offsetting signal degradation due to transmission noise and delay jitter, and may include a server decompression module 350 and a de-warping module 320 (FIG. 3). The signal-filtering module 2621 offsets signal degradation caused by noise and delay jitter. If the "raw" video signal 312 (FIG. 3) has been de-warped at source to produce a "corrected signal" 322 that is further compressed at source, the server decompression module 350 applies appropriate decompression processes to produce a replica of the corrected signal 322. Otherwise, if the raw video signal 312 has been compressed at source without de-warping, the server decompression module 350 applies appropriate decompression processes to produce a replica of the raw signal 312 which is then de-warped using de-warping module 320.

The client-device related modules 2640 include a client-device characterization module 2642 and a module 2643 for signal adaptation to client-device characteristics. The client-device characterization module 2642 may rely on a client-profile database 2641 that stores characteristics of each client-device type of a set of client-device types or extract client-device characteristics from characterization data received via server-client interface 2661. A client's device characteristics may relate to processing capacity, upper bounds of frame rate, frame resolution, and flow rate, etc.

Client-specific modules 2660 include server-client interface 2661, a module 2662 for signal adaptation to a client's environment, and a module 2663 for signal adaptation to a client's viewing preference.

Figure 27:
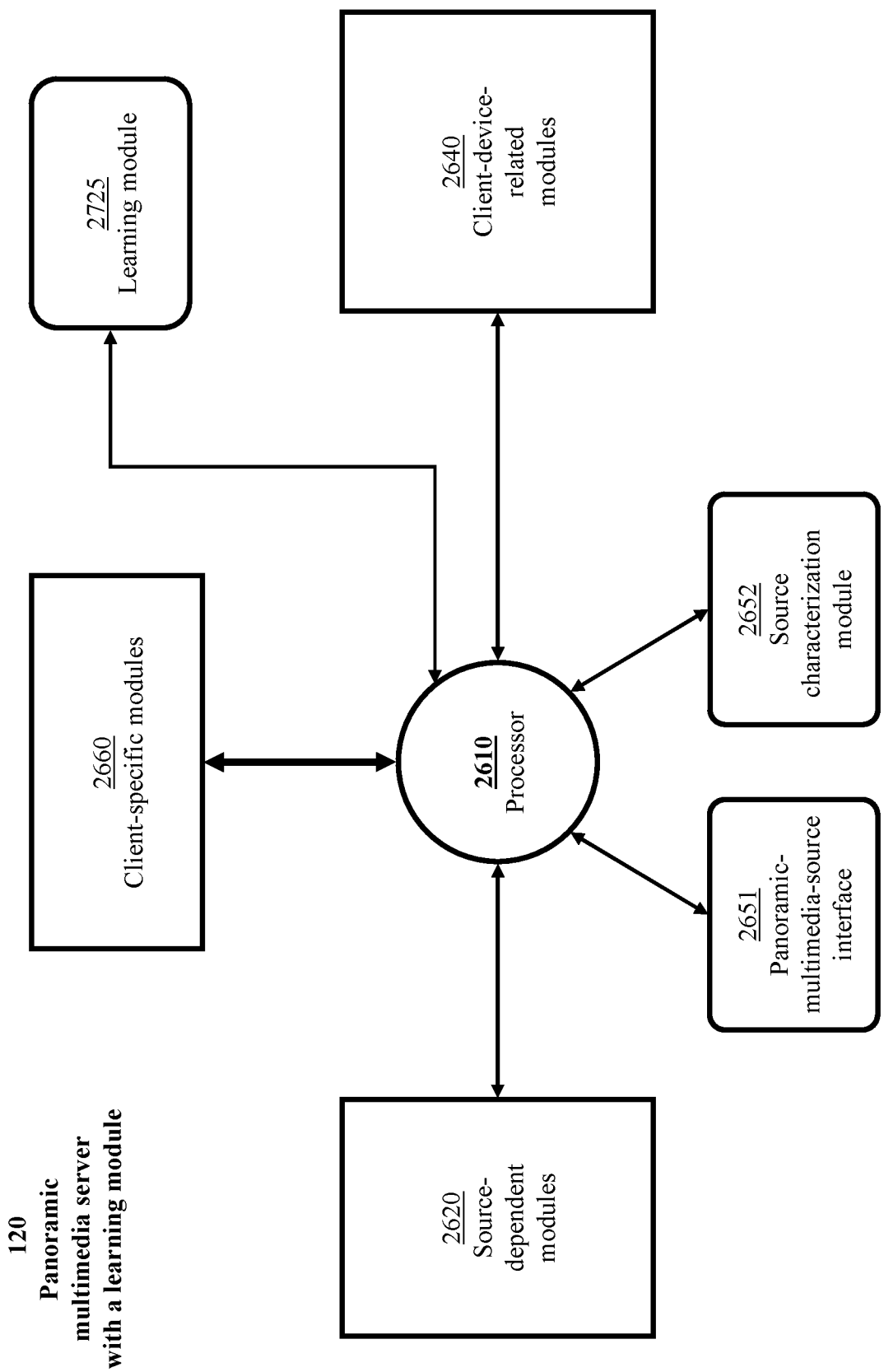
FIG. 27 illustrates a learning module coupled to the universal streaming server of FIG. 26, in accordance with an embodiment of the present invention.

FIG. 27 illustrates a universal streaming server 120 including a learning module 2725 for tracking clients' selections of viewing options. The learning module may be configured to retain viewing-preference data and correlate viewing preference to characteristics of client devices and optionally clients' environment.

Thus, the server comprises a network interface module devised to establish, through at least one network, communication paths to and from at least one panoramic video source; and a plurality of client devices. Various designs may be considered to construct the universal streaming server 120 based on the following modules:

a decompression module devised to decompress a video signal that has been compressed at source;

a de-warping module devised to de-warp a video signal which has not been de-warped at source;

a transcoding module devised to adapt a video signal to characteristics of any client device of the plurality of client devices;

a content filter devised to edit content of a video signal to correspond to an identified view region; and a control module devised to communicate with at least one panoramic video source to acquire source video signals, present video signals to the transcoding module and the content filter to generate client-specific video signals, and send the client-specific video signals to respective client devices.

The server may further use a learning module devised to retain viewing-preference data and correlate viewing preference to characteristics of client devices.

Figure 28:
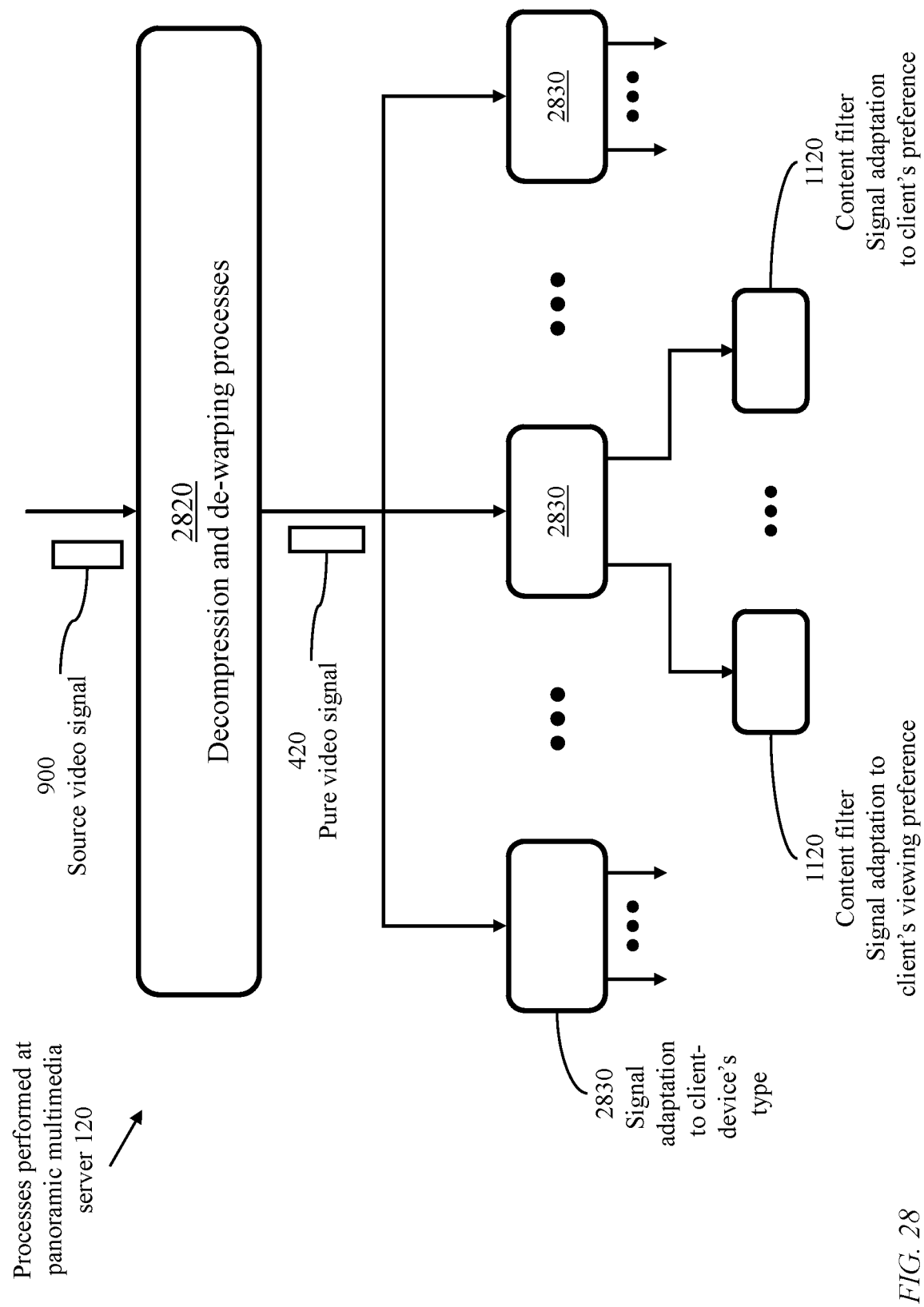
FIG. 28 illustrates processes performed at a universal streaming server where a panoramic video signal is adapted to client-device types then content filtered, in accordance with an embodiment of the present invention.

FIG. 28 illustrates processes performed at universal streaming server 120 where a panoramic video signal is adapted to client-device types then content filtered. In process 2820, a received source video signal 900 is decompressed if the source video signal 900 has been compressed at source. The received source video signal 900 is de-warped if the source video signal has not been de-warped at source. Process 2820 produces a pure video signal 420 (FIG. 4 to FIG. 8), which may be a corrected video signal 322 or a rectified video signal 324 (FIG. 3) as described above. Multiple processes 2830 may be executed in parallel to transcode pure video signal 420 to video signals adapted to different types of client devices.

Each of processes 2830 is specific to client-device type. A process 2830 transcodes the pure video signal 420 resulting from process 2820 to produce a modified signal suitable for a respective client-device type. Several clients may be using devices of a same type. However, the clients may have different viewing preferences. A video signal produced by a process 2830 is adapted in content filter 1120 to a view-region selection of a respective (human) client. However, if two or more clients using devices of a same type also have similar viewing preferences, a single content-filtering process may be executed and the resulting adapted signal is transmitted to the two or more clients.

Figure 29:
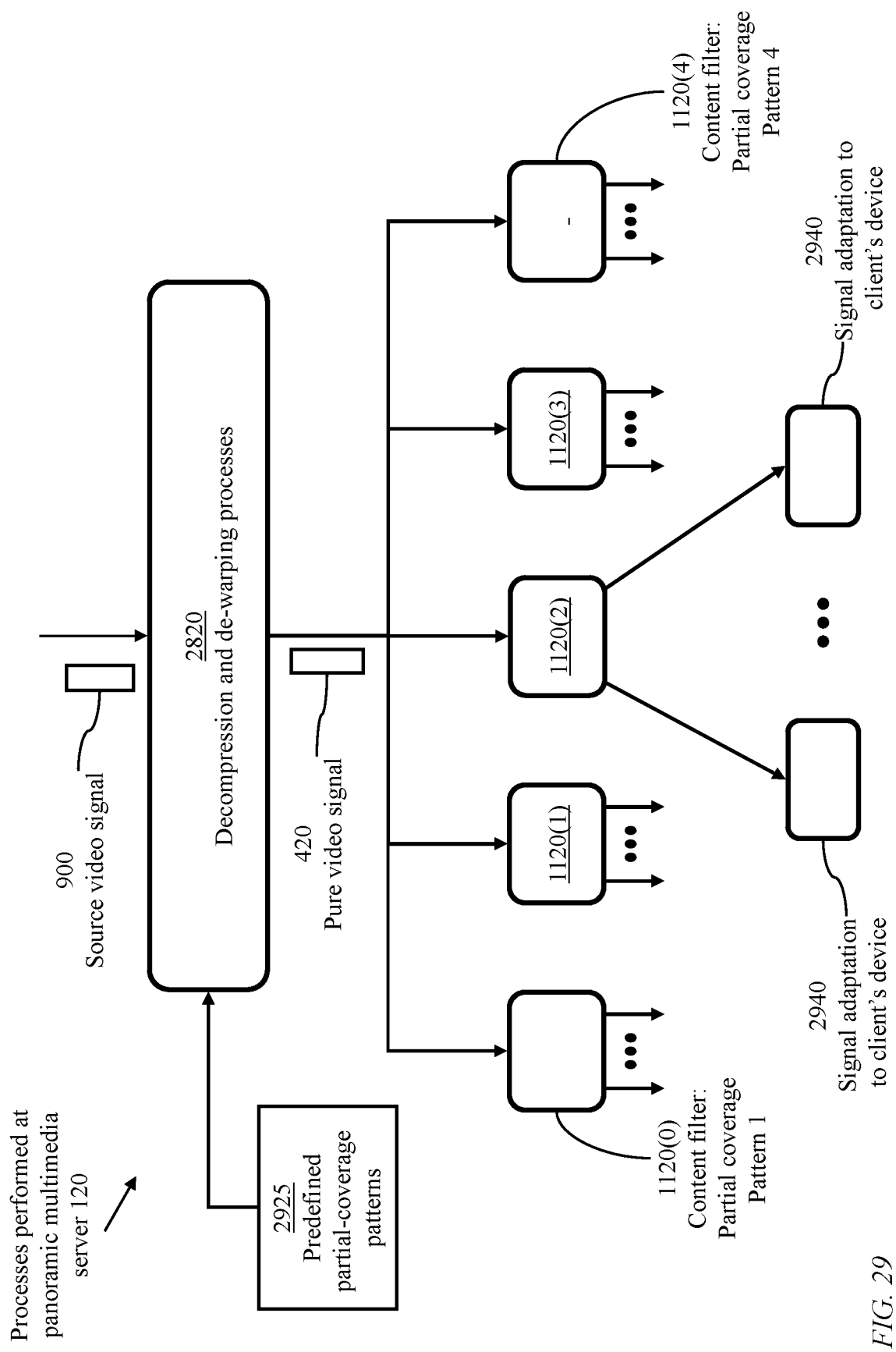
FIG. 29 illustrates processes performed at universal streaming server where a panoramic video signal is content filtered then adapted to client-device types, in accordance with another embodiment of the present invention.

FIG. 29 illustrates processes performed at universal streaming server 120 where a panoramic video signal is content filtered then adapted to client-device types. As in process 2820 of FIG. 28, a received source video signal 900 is decompressed if the source video signal 900 has been compressed at source. The received source video signal 900 is de-warped if the source video signal 900 has not been de-warped at source. Process 2820 produces a pure video signal 420, which may be a corrected video signal 322 or a rectified video signal 324 (FIG. 3) as described above. A memory device stores a set 2925 of predefined descriptors of partial-coverage view regions.

Multiple processes of content filtering of pure video signal 420 may be executed in parallel to produce content-filtered video signals corresponding to the predefined descriptors of partial-coverage view regions. Multiple processes 2940 may be executed in parallel to adapt a content-filtered video signal to different types of client devices. If two or more clients select a same view region and use client devices of a same type, a single process 2940 is executed and the resulting adapted video signal is transmitted to the two or more clients.

Figure 30:
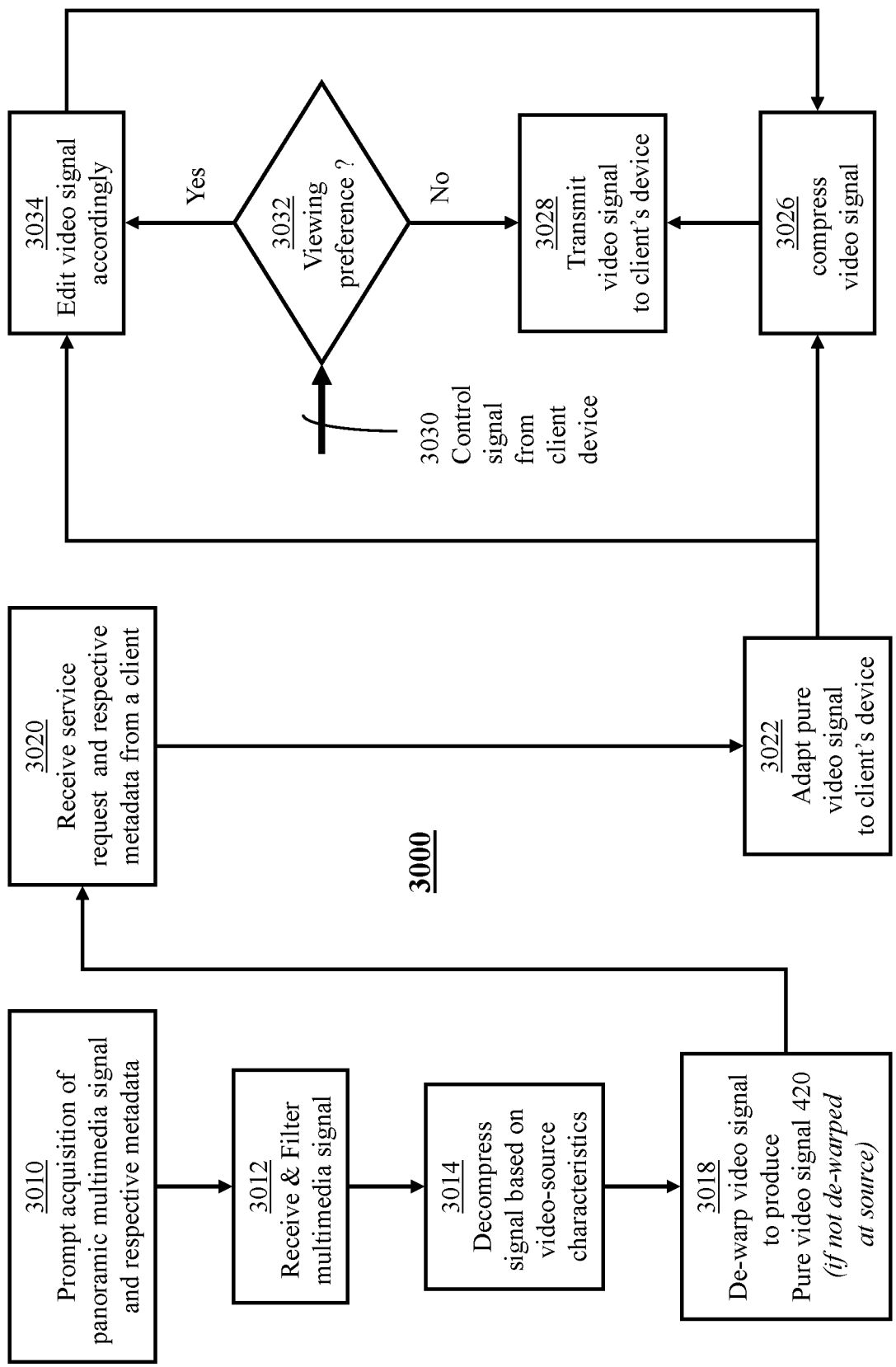
FIG. 30 is a flow chart depicting processes of acquisition of a panoramic multimedia signal and adapting the acquired multimedia signal to individual clients, in accordance with an embodiment of the present invention.

FIG. 30 illustrates a method 3000 of acquisition of a panoramic multimedia signal and adapting the acquired multimedia signal to individual clients. The universal streaming server 120 acquires a panoramic multimedia signal and, preferably, respective metadata from a selected panoramic multimedia source 110 (process 3010). The acquired panoramic multimedia signal includes a source video signal which may be a raw video signal 312, corrected video signal 322, compressed video signal 342, or a compact video signal 343 as illustrated in FIG. 3. The source video signal is filtered to offset degradation caused by noise and delay jitter (process 3012) and decompressed if the signal has been compressed at source (process 3014). The so-far-processed signal is de-warped if not originally de-warped at source (process 3018). Processes 3010 to 3018 yield a pure video signal 420.

When a service request is received from a client (process 3020), the pure video signal 420 is adapted to the characteristics of the client's device (process 3022). The adapted signal is compressed (process 3026) and transmitted to the client device (process 3028). Process 3026 takes into consideration flow-rate constraints which may be dictated by condition of the network path from the server to the client device The client may prefer a specific view region and communicate with the universal streaming server 120 to define the preferred view region. Upon receiving a control signal 3030 from the client specifying a preferred view region (process 3032), the adapted signal produced in process 3022 is content filtered (process 3034), compressed (process 3026), and transmitted to the client device (process 3028). The pure view signal 420 may be content-filtered several times during a streaming session.

Figure 31:
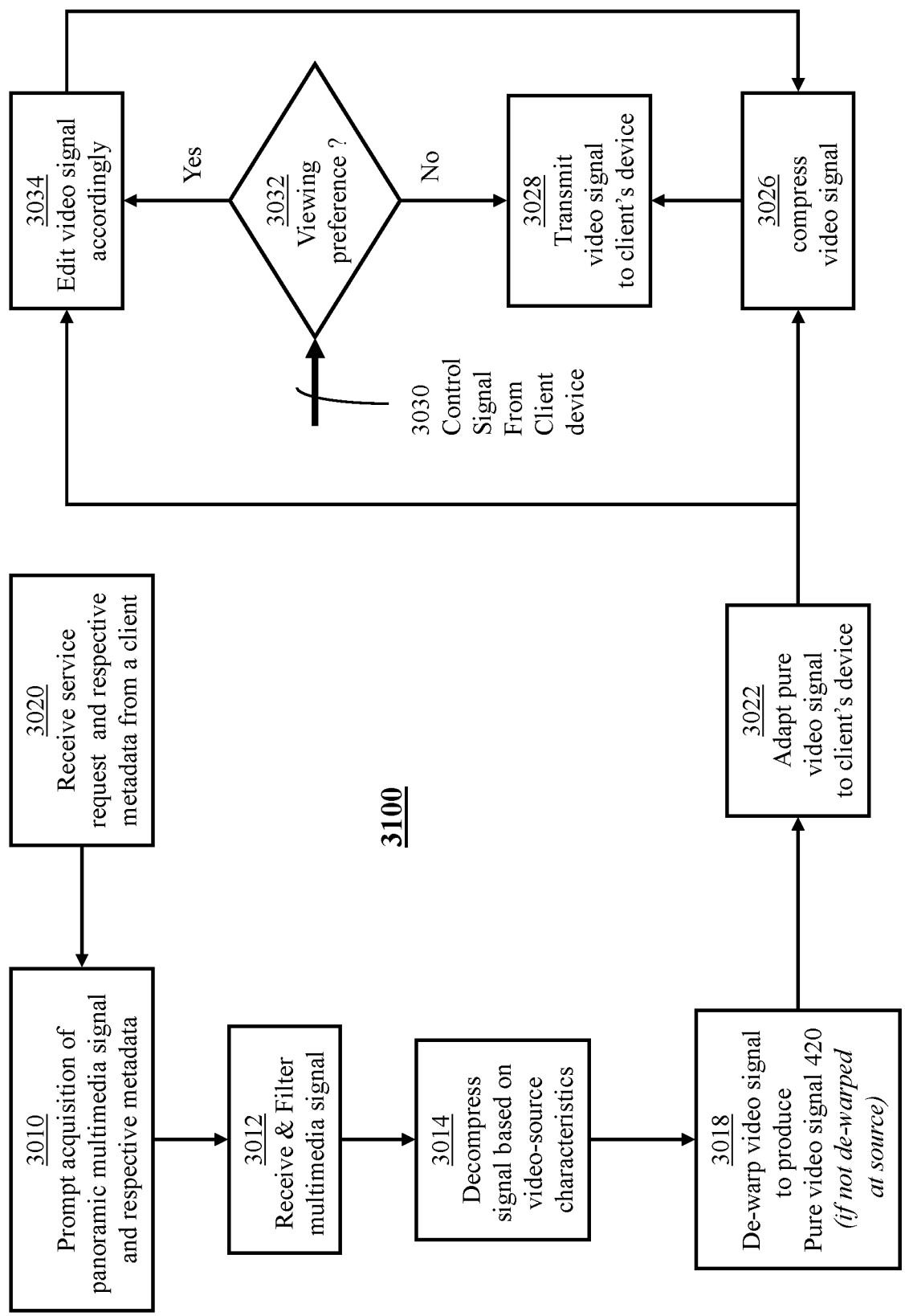
FIG. 31 is a flow chart depicting executing the processes of FIG. 30 in a different order, in accordance with another embodiment of the present invention.

FIG. 31 illustrates a method 3100, similar to the method of FIG. 30, of acquisition of a panoramic multimedia signal and adapting the acquired multimedia signal to individual clients. The only difference is the order of executing processes 3010, 3020, and 3022.

FIG. 32 illustrates an exemplary streaming-control table 3200, maintained at the universal streaming server 120, corresponding to a specific panoramic multimedia source 110. An edited multimedia signal 940 (FIG. 9, FIG. 24) delivered to a specific client device 180 depends on the characteristics of the client device and on the viewing preference of a viewer using the client device. With a large number of client devices 180 connecting concurrently to a universal streaming server 120 (watching an activity in real time), it is plausible that:

(i) numerous clients use client devices 180 of the same characteristics but the clients have differing viewing preferences;

(ii) numerous clients have similar viewing preferences but use client devices of differing characteristics; and/or (iii) two or more clients use client devices of the same characteristics and have the same viewing preference.

Thus, to reduce the processing effort of the universal streaming server 120:

module 2643 of signal adaptation to client device may be exercised only once for all client devices of the same characteristics then module 2663 of signal adaptation to client viewing preference is exercised only once for all clients having similar client devices and similar viewing preferences; or module 2663 of signal adaptation to client viewing preference may be exercised only once for all clients having similar viewing preferences then module 2643 of signal adaptation to client device is exercised only once for all clients having similar viewing preferences and similar client devices.

As described earlier, module 2643 is devised for signal adaptation to client-device characteristics and module 2663 is devised for signal adaptation to a client's viewing preference.

The clients' requests for service may arrive in a random order and a simple way to track prior signal adaptation processes is to use a streaming-control table 3200 (FIG. 32).

Streaming-control table 3200 is null initialized. In the example of FIG. 32, there are eight types of client devices 180, denoted D0, D1, . . . , D7, and there are six view options denoted V0, V1, . . . , V5, quantified, for example, according to viewing solid angles. A first client accessed the universal streaming server 120 using a client device of type D1 and requested viewing option V3. A stream denoted stream-0 is then created and indicated in streaming-control table 3200. Another stream, denoted stream 1, is created for another client using a client device 180 of type D5 and specifying viewing option V2, and so on. Only six streams are identified in streaming-control table 3200, but it is understood that with a large number of simultaneously connected client devices 180 there may be numerous streams. When a new request from a client is received, streaming-control table 3200 is accessed to determine whether a new stream need be created or an existing stream be directed to the client. All of the streams corresponding to a device type are herein said to form a "stream category".

Figure 33:
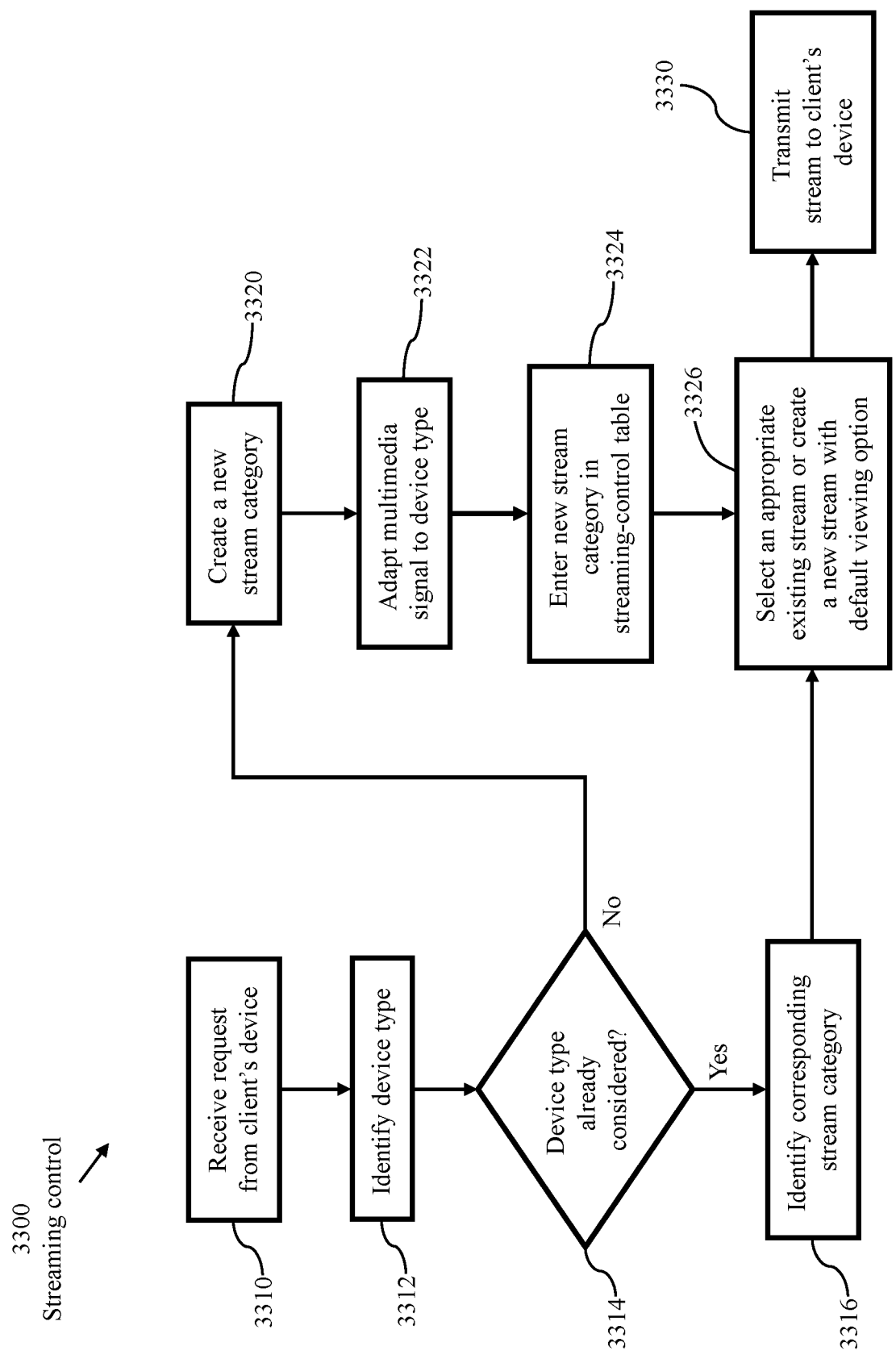
FIG. 33 illustrates a process of initial adaptation of a multimedia signal for a specific client, in accordance with an embodiment of the present invention.

FIG. 33 illustrates a streaming control process 3300 of initial adaptation of a video-signal for a specific client device 180. A request for service is received at server-client interface module 2661 from a client device 180 (process 3310) and the type of client device 180 is identified (process 3312). Process 3314 determines whether the device type has been considered.

If the client device type has not been considered (process 3314), a new stream category is created (process 3320) and the corresponding pure video signal 420 is adapted to the device type (process 3322). The new stream category is recorded (process 3324), a new stream is created (process 3326) and transmitted to the specific client device (process 3330).

If the device type has already been considered (process 3314), a stream category is identified (process 3316). At this point, the client may not have indicated a viewing preference and a default viewing option may be assigned. If a stream corresponding to an identified view region has already been created (process 3326), the stream is transmitted to the specific client device (process 3330). Otherwise, a new stream is created (process 3326) and transmitted to the specific client device (process 3330).

FIG. 34 illustrates an exemplary table 3400 produced by the learning module 2725 indicating a count of viewing options for each type of client devices 180. Eight client-device types denoted D0, D1, . . . , D7 and six viewing options denoted V0, V1, . . . , V5 are considered. The table may accumulate a count of selections of each stream defined by a device type and a viewing option over a predefined time window which may be a moving time window.

In the exemplary table of FIG. 34, the most popular viewing option for clients using the client-device denoted D1 is viewing option V3 (selected 64 times over the time window). Thus, a new request for service received at the universal streaming server 120 from a client device of type D1 may be initially assigned viewing option V3.

Thus, the invention provides a method of signal streaming implemented at a server which may be implemented using hardware processing units and memory devices allocated within a shared cloud-computing network. The method comprises processes of multicasting a signal to a plurality of clients, receiving from a specific client a request to modify content of the signal, producing a modified signal, and transmitting the modified signal to the specific client. The signal may be derived from a panoramic multimedia signal containing a panoramic video signal produced by a single camera or produced by combining video signals from multiple cameras. The modified signal may be a partial-coverage multimedia signal.

In order to produce the modified signal, the method comprises processes of de-warping a video-signal component of the signal to produce a de-warped video signal and adapting the de-warped video signal to the client device to produce a device-specific video signal. The device-specific signal may be adapted to a viewing-preference of a client. The viewing preference may be stated in a request received from a client or be based on a default value specific to a client-device type.

The method comprises a process of acquiring characteristics of client devices which communicate with the server to request streaming service. A record of the characteristics of the client device and viewing preference may be added to a viewing-preference database maintained at the server.

The invention further provides a method of signal streaming performed at a server which may be fully or partially implemented using resources of a cloud computing network. The server may acquire a panoramic multimedia signal then decompress and de-warp a video-signal component of the panoramic multimedia signal to produce a pure video signal. For a given client device of a plurality of client devices:
 (i) the pure video signal is content filtered to produce a respective content-filtered signal which corresponds to a selected view region; and
 (ii) the content-filtered signal bound to a client device is adapted to characteristics of the client device as well as to characteristics of a network path from the server to a target client device;

Each client device comprises a processor, a memory device, and a display screen. A client device may send an indication of viewing preference to the server. The server produces a respective content-filtered signal, corresponding to the viewing preference, to be sent to the client device.

The server may further perform processes of:
 (a) retaining data relating viewing preference to characteristics of clients' devices; and
 (b) using the retained data for determining a default viewing preference for each client device of the plurality of client devices.

The server may acquire a panoramic video signal that is already de-warped and compressed at source then decompress the panoramic video signal to produce a pure video signal. A set of modified signals is then produced where each modified signal corresponds to a respective partial-coverage pattern of a predefined set of partial-coverage patterns. Upon receiving connection requests from a plurality of client devices, where each connection request specifies a preferred partial-coverage pattern, the server determines for each client device a respective modified signal according a respective preferred partial-coverage pattern. The respective modified signal bound to a particular client device may further be adapted to suit characteristics of the particular client device and characteristics of a network path to the particular client device.

Figure 35:
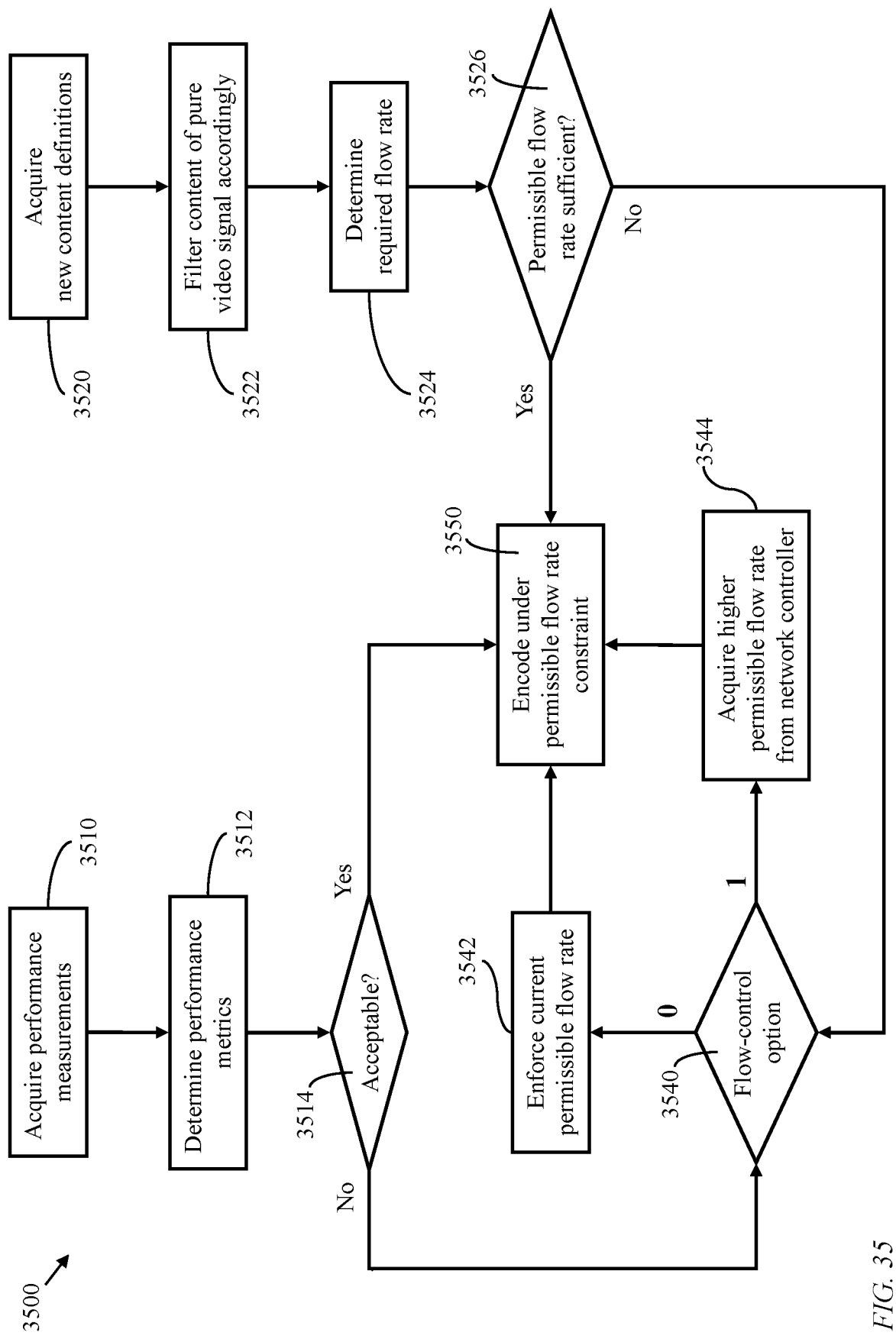
FIG. 35 illustrates processes of flow-rate control based on signal-content changes and performance metrics, in accordance with an embodiment of the present invention.

FIG. 35 illustrates processes 3500 of downstream signal flow-rate control based on signal-content changes and performance metrics. A flow controller of the server implements one of two flow-control options. In a first option (option 0), an encoder of a content-filtered video signal enforces (Process 3542) a current permissible flow rate. In a second option (option 1), the flow controller communicates (process 3544) with a controller of a network which provides a path from the server to a client device to reserve a higher path capacity or to release excess path capacity.

A network interface (1010, FIG. 10) of server 120 receives upstream control data from a client device 120 which may contain definition of a preferred video-signal content as well as performance measurements. As well known in the art, the traffic performance of a communication path connecting a first device to a second device may be evaluated by exchanging control data between the first device and the second device. The first device may send indications of transmitting time and data-packet indices, the second device may detect delay jitter and/or data-packet loss and communicate relevant information to the first device. Additionally, the second device may track processing delay or packet-buffer occupancy at a decoder of the second device; such information would be indicative of a current processing load at the second device which may require reducing the flow rate from the first device to the second device.

The network interface receives the upstream control data and extracts performance-measurement data (process 3510). The flow controller determines performance metrics using methods well known in the art. The performance measurement may include data loss, delay jitter, and occupancy of a buffer at a client device holding data detected from carrier signals received at the client device from the server 120. The performance measurements correspond to a current permissible flow rate. The flow controller determines (process 3512) performance metrics based on the performance measurement and compares (process 3514) the performance metrics with respective acceptance levels which may be based on default values or defined in the upstream control data. If the performance is acceptable, the content-filtered video signal is encoded (process 3550) under the current permissible flow rate. If the performance is not acceptable, the flow controller either instructs an encoder to encode the content-filtered video signal at a lower flow rate (option 0, processes 3540, 3542) or communicate with a network controller to acquire a path of a higher capacity (option 1, processes 3540, 3544). The second option may not be selected if the traffic measurements indicate an unacceptable processing load at the client device.

The network interface also extracts (process 3520) data defining a preferred partial content (partial coverage) of the full-content pure video signal and communicates the information to a content filter. The content filter extracts a new content-filtered signal (process 3522) from the pure video signal to generate a content-filtered video signal according to received definition of the new content. The flow controller determines (process 3524) a tentative flow-rate requirement corresponding to the new content. If the tentative flow rate does not exceed the current permissible flow rate (process 3526), the new content-filtered video signal is encoded (process 3550) under the permissible flow rate. Otherwise, the flow controller either instructs the encoder to encode the new content-filtered video signal encoded under constraint of the current permissible flow rate (option 0, processes 3540, 3542) or communicate with the network controller to acquire a path of a higher capacity (option 1, processes 3540, 3544).

Figure 36:
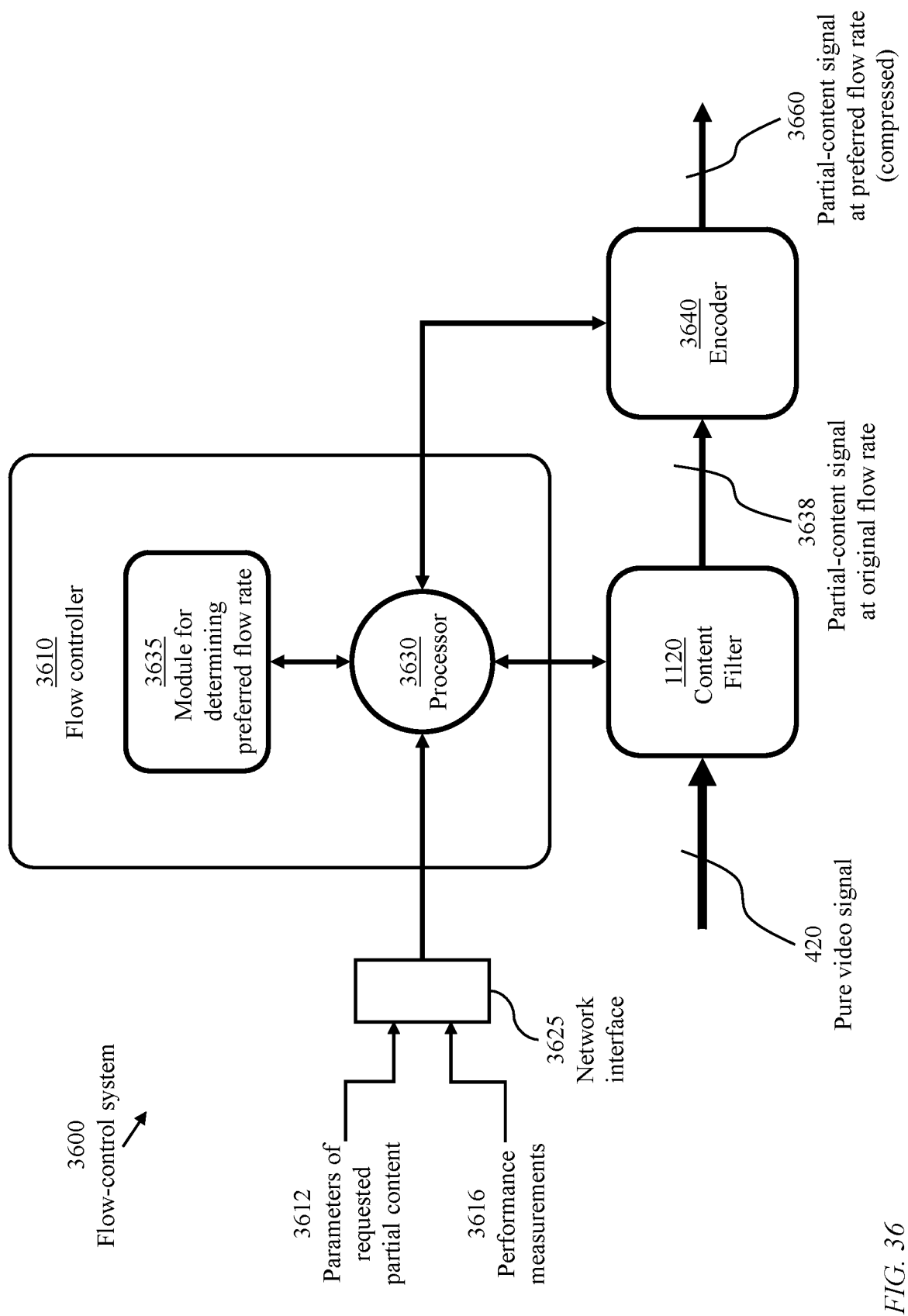
FIG. 36 illustrates a control system of a universal streaming server, in accordance with an embodiment of the present invention.

FIG. 36 illustrates a flow-control system of a universal streaming server 120 comprising a flow controller 3610. The flow controller comprises a processor 3630 and a memory device storing instructions forming a module 3635 for determining a preferred flow rate. Module 3635 may implement processes 3500 of FIG. 35. A server-network interface 3625 receives content-definition parameters 3612 and performance measurements 3616. A content filter 1120 receives a pure video signal 420 (FIG. 4) and extracts partial-content signal 3638 according to content-definition parameters 3612 of requested partial content received from an automaton 2545 (FIG. 25) associated with a client device. Module 3635 uses performance measurements 3616 received from the client device to determine a preferred flow rate. Encoder 3640 encodes the partial-content signal at the preferred flow rate and produces a compressed signal 3660 to be transmitted to the client device. Encoder 3640 comprises a transcoder and a server compression module (not illustrated).

At the universal streaming server 120, a received signal from a source may be decompressed to reproduce an original full-content signal; preferably a source sends signals compressed using lossless compression techniques. The full-content signal is processed in a content filter to produce a partial-content signal according to specified content-definition parameters. A preferred flow rate of the partial-content signal is determined based on either receiver performance measurements or network-performance measurements as will be described in further detail in FIG. 41. Thus, the partial-content signal is encoded to produce a compressed partial-content (partial-coverage) signal to be transmitted to a respective client device.

Figure 37:
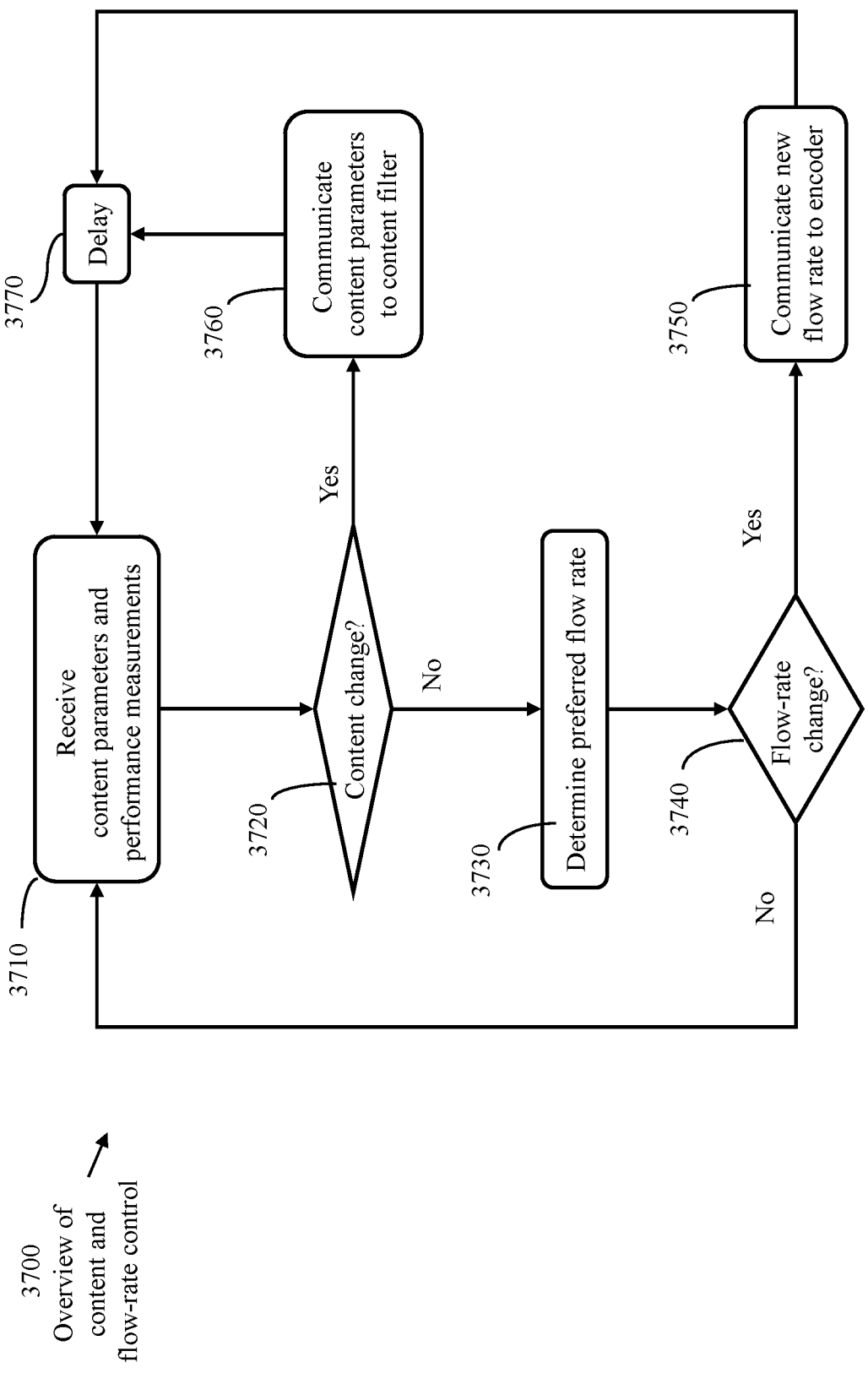
FIG. 37 illustrates a combined process of content filtering and flow-rate adaptation of a signal in the streaming system of FIG. 23 and FIG. 24, in accordance with an embodiment of the present invention.

FIG. 37 illustrates a combined process 3700 of content filtering and flow-rate adaptation of a signal in the streaming system of FIG. 24. The universal streaming server 120 continuously receives (process 3710) from client devices and associated automata control data from clients in the form of content-definition parameters and performance measurements. If the content-definition parameters from a client indicate a request to change content, the content-definition parameters are directed to a content filter 1120 (processes 3720 and 3760) and process 3710 is activated after imposing an artificial delay 3770 in order to ensure that received client's control data correspond to the changed signal content. Otherwise, if the content-definition parameters indicate maintaining a current content, the universal streaming server determines a preferred flow rate (process 3730). If the preferred flow rate is the same as a current flow rate, or has an insignificant deviation from the current flow rate, no action is taken and process 3710 is revisited (process 3740). If the preferred flow rate differs significantly from the current flow rate, the new flow rate is communicated to encoder 3640 (processes 3740 and 3750) and process 3710 is activated after an artificial delay 3770 to ensure that received client's control data correspond to the new flow rate. The artificial delay should exceed a round-trip delay between the universal streaming server and the client's device.

Figure 38:
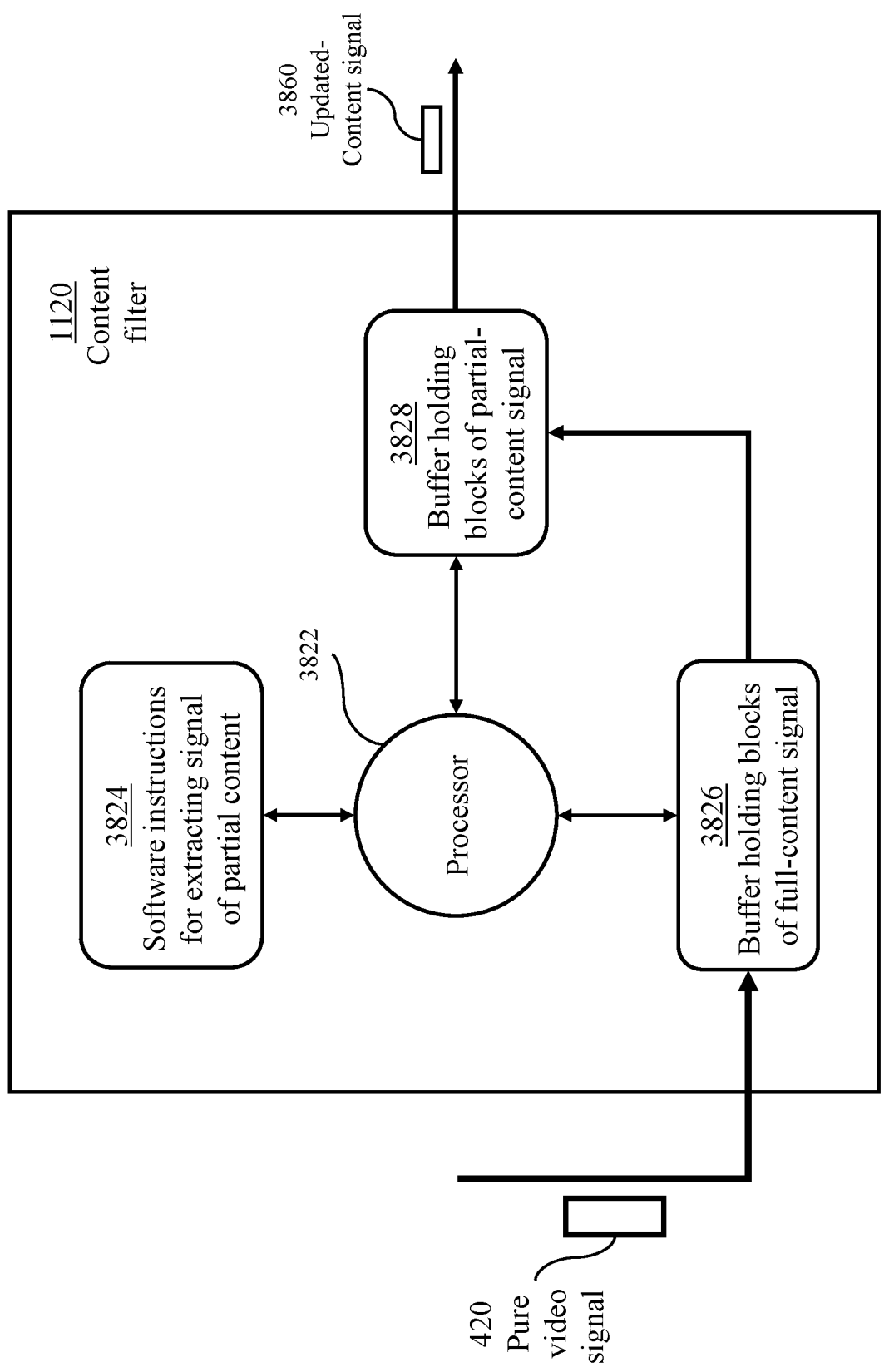
FIG. 38 illustrates a content filter of a universal streaming server, in accordance with an embodiment of the present invention.

FIG. 38 illustrates a content filter 1120 of a universal streaming server. The content filter 1120 comprises a processor 3822, a buffer 3826 for holding data blocks of a pure video signal 420, and a memory device 3824 storing software instructions causing the processor to extract an updated content signal 3860 of partial content from buffered data blocks of the pure video signal. Blocks of the partial-content signal are stored in a buffer 3828. Processor 3822 executes software instructions which cause transfer of data in buffer 3828 to a subsequent processing stage which may include a transcoding module and/or a compression module.

Thus, the present invention provides a universal streaming server 120 comprising a network interface 1010, a content filter 1120, a flow controller 3610, and an encoder 3640.

The network interface is devised to receive a source video signal 900 from a panoramic signal source 110, content-definition parameters 3612, and performance measurements 3616 from a client device 180. A source signal-processing module 1024, which comprises a decompression module and a de-warping module, generates a pure video signal 420 from the source video signal 900. The pure video signal 420 is a full-coverage signal which corresponds to a respective scene captured at source The content filter 1120 is devised to extract an updated content signal 3860 from the pure video signal 420 according to the content-definition parameters 3612. A processor of the content filter is devised to determine a ratio of size of the updated content signal to size of a current content signal.

The flow controller 3610 comprises a memory device storing flow-control instructions 3635 which cause a hardware processor 3630 to determine a current permissible flow rate of the partial-coverage signal based on the performance measurements and the ratio of size of the updated content signal to size of a current content signal.

The encoder 3640 comprises a transcoder module and a compression module and is devised to encode the partial-coverage signal under the current permissible flow rate.

The flow controller 3610 is devised to communicate with a network controller (not illustrated) to acquire a path compatible with a requisite flow rate between the universal streaming server 120 and the client device.

The flow-control instructions 3635 cause the hardware processor to retain an indication of a difference between the current permissible flow rate and a preceding permissible flow rate. If the difference exceeds a predefined threshold, the instructions cause the processor to delay the process of determining a succeeding permissible flow rate for a predefined delay period to ensure that the received performance measurements correspond to the current permissible flow rate.

The content filter 1120 comprises a respective processor 3822 and a respective memory device storing content-selection instructions 3824 which cause the respective processor to extract the updated content signal from the pure video signal 420. A first buffer 3826 holds Data blocks of the full-coverage video signal. A second buffer 3828 holds data blocks of the updated content signal 3860.

The content-selection instructions 3824 further cause the respective processor to determine the ratio of size of the updated content signal to size of a current content signal based on sizes of data blocks of the full-content signal and sizes of corresponding data blocks of the updated signal to be used in determining the current permissible flow rate.

The universal streaming server further comprises a frame-sampling module 1320 comprising a memory device storing frame-sampling instructions which cause a respective hardware processor to sample the pure video signal 420 during distant frame intervals to derive a frame-sampled video signal 1322 (FIG. 13 and FIG. 15). The frame intervals are selected so that the frame-sampled video signal has a constant flow rate not exceeding a nominal flow rate, and wherein the network interface is further devised to transmit the frame-sampled video signal to the client.

The content filter 1120 may be devised to derive a set of preselected content-filtered signals corresponding to different view regions from the full-content video signal. A compression module comprising a memory device storing signal-compression instructions may be devised to compress the preselected content-filtered signals to generate a succession of compressed content filtered signals occupying successive time windows. The network interface is further devised to transmit the succession of compressed content filtered signals to the client device, receive an indication of a preferred content-filtered signal of the set of preselected content-filtered signals, and communicate the indication to the content filter.

Figure 39:
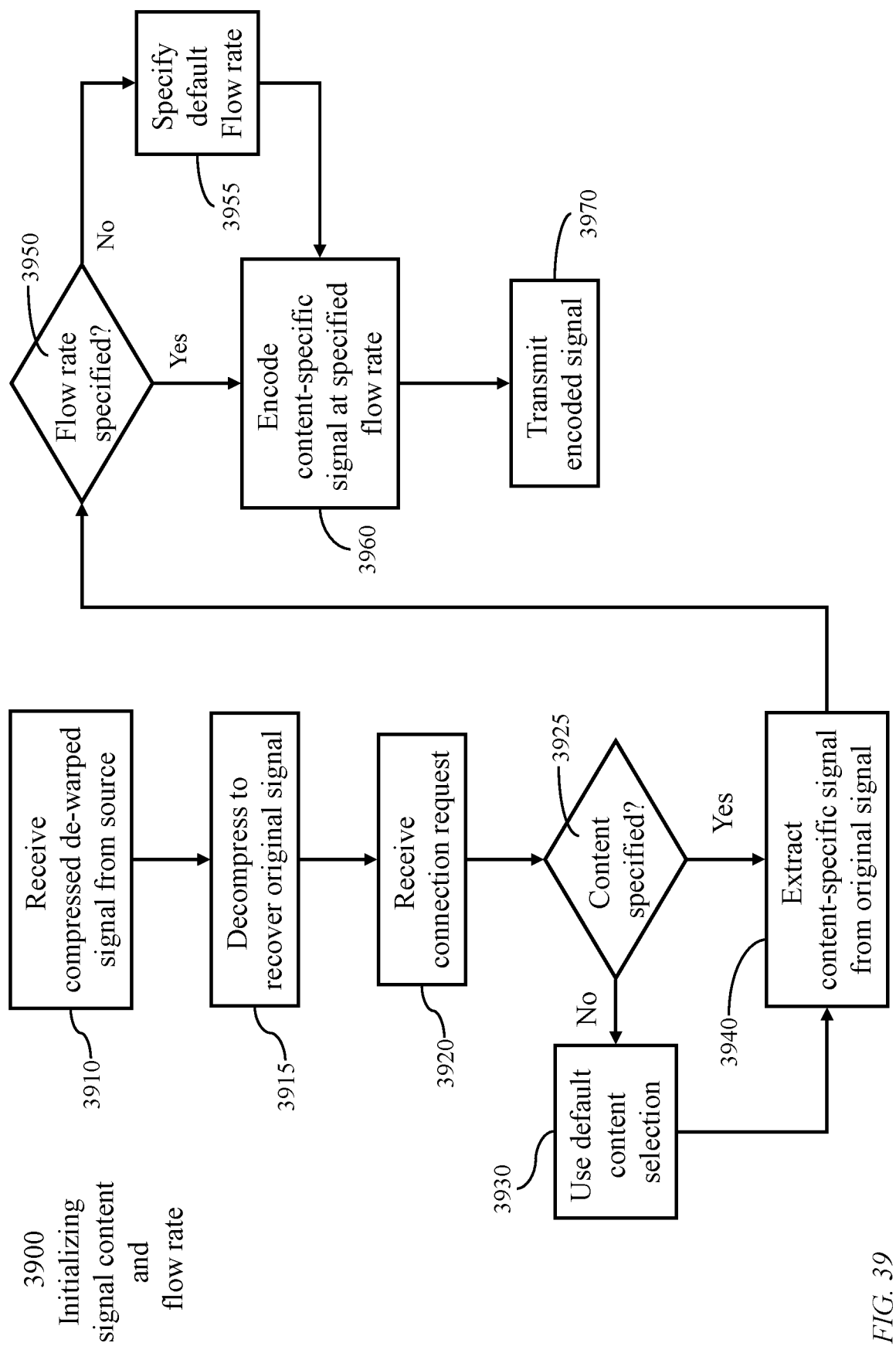
FIG. 39 illustrates initial processes performed at the universal streaming server to start a streaming session, in accordance with an embodiment of the present invention.

FIG. 39 illustrates initial processes 3900 performed at the universal streaming server 120 to start a streaming session. The universal streaming server receives a de-warped compressed full-content signal from a signal source (process 3910) and decompresses (process 3915) the full-content signal to produce a pure video signal corresponding to a respective scene captured at source. The server receives a connection request from a client device (process 3920); the request may include parameters of a partial-content of the signal. If the content-definition parameters are not provided, a default content selection is used (processes 3925, 3930). A content filter of the universal streaming server extracts (process 3940) a partial-content signal based on the default content selection or the specified partial-content selection. The initial content selection may be set to be the full content. A flow rate for the extracted signal may be specified in the connection request in which case an encoder of the universal streaming server may encode the signal under the constraint of the specified flow rate (processes 3950 and 3960). Otherwise, a default flow rate may be provided to the encoder (process 3955). A compressed encoded partial-content (or full-content) signal is transmitted to the target client device (process 3970).

Figure 40:
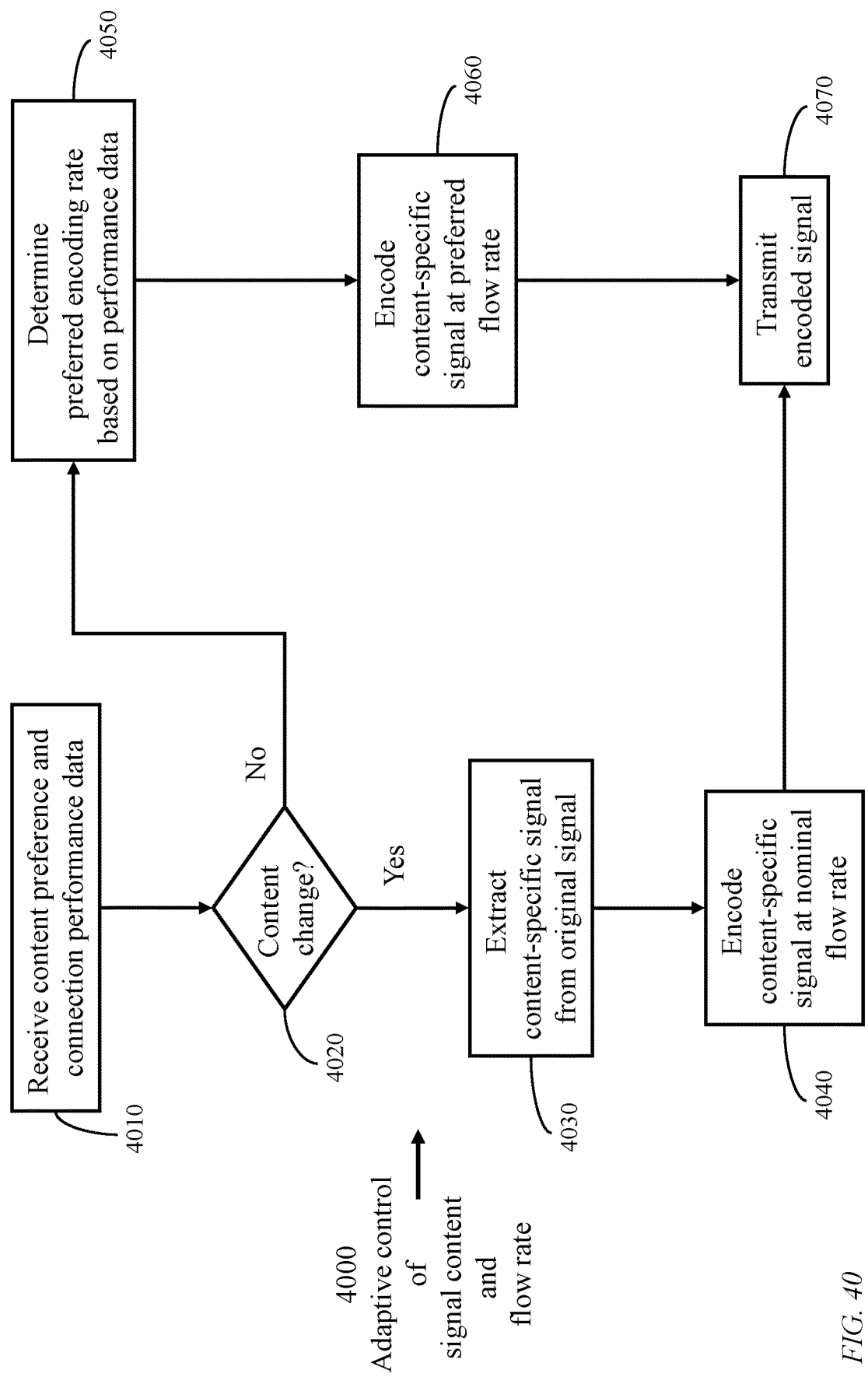
FIG. 40 illustrates a method of adaptive modification of content and flow rate of a signal, in accordance with an embodiment of the present invention.

FIG. 40 illustrates a method 4000 of adaptive modification of video-signal content and flow rate of the transmitted encoded signal. The universal streaming server receives (process 4010) a new content preference from an automaton (a person) associated with a client device. If the new content is the same as a current content (processes 4020 and 4050), a content filter of the universal streaming server maintains its previous setting and a preferred encoding rate based on received performance data is determined (process 4050, module 3635 of determining a preferred flow rate, FIG. 36). The signal is encoded at the preferred encoding rate (process 4060) and transmitted to the target client device (process 4070). If process 4020 determines that the new content differs from the current content, a content filter of the universal streaming server extracts a partial-content signal from the pure video signal (processes 4020 and 4030) and encodes the signal at a nominal flow rate (process 4040). A compressed encoded partial-content signal is transmitted to the target client device (process 4070).

Figure 41:
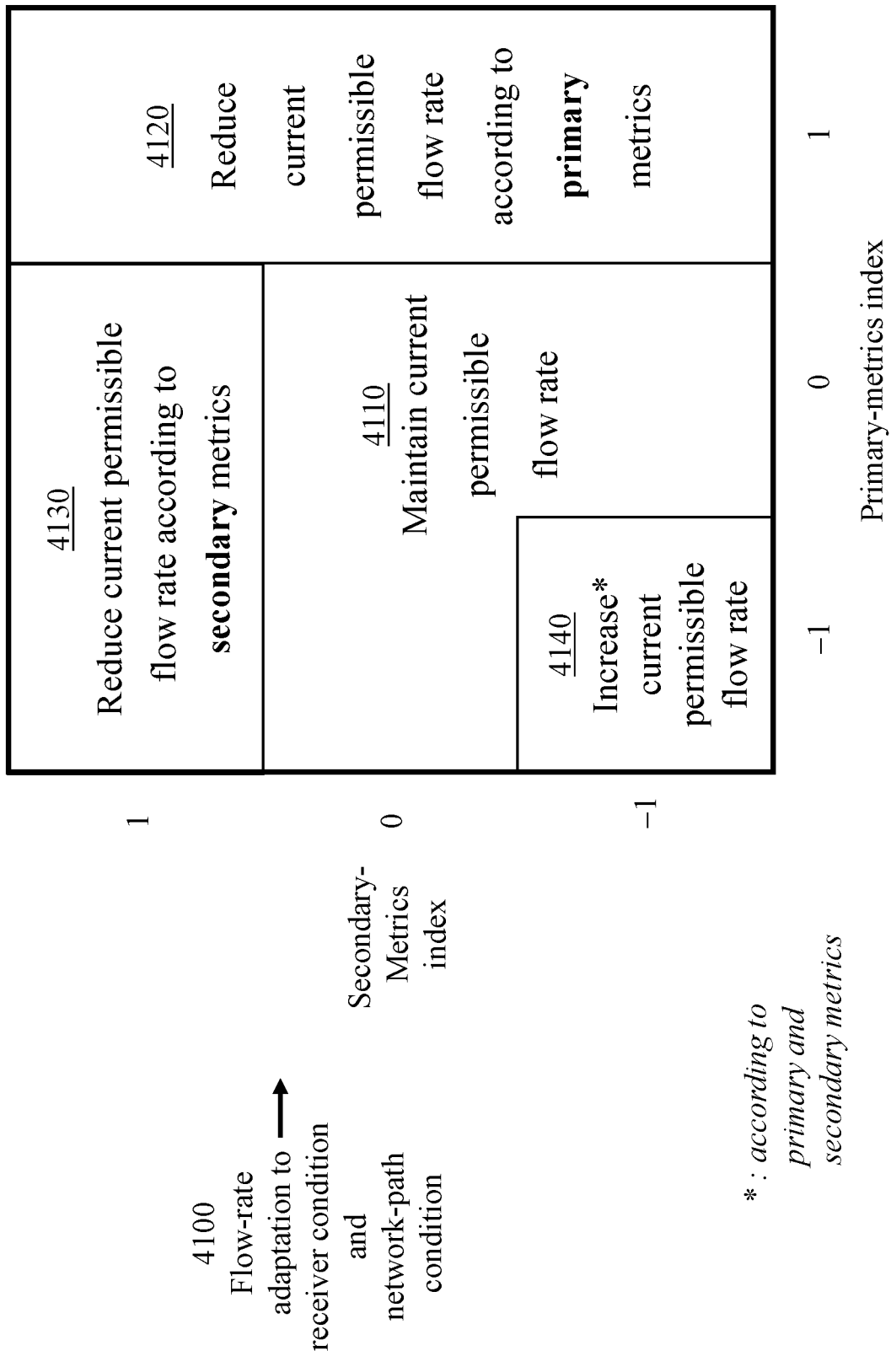
FIG. 41 illustrates criteria of determining a preferred encoding rate of a signal based on performance measurements pertinent to receiver condition and network-path condition, in accordance with an embodiment of the present invention.

FIG. 41 illustrates criteria 4100 of determining a preferred encoding rate of a signal based on performance measurements pertinent to receiver condition and network-path condition. A universal streaming server serving a number of client devices receives from a client device performance data relevant to the client's receiver condition and performance data relevant to a network path from the universal streaming server to the client's receiver. A module coupled to the universal streaming server determines primary metrics relevant to the receiver's condition and secondary metrics relevant to the network-path conditions. An acceptance interval, defined by a lower bound and an upper bound, is prescribed for each metric. The metrics are defined so that a value above a respective upper bound indicates unacceptable performance while a value below a respective lower bound indicates better performance than expected. A metric may be considered to be in one of three states: a state of "−1" if the value is below the lower bound of a respective acceptance interval, a state of "1" if the value is above a higher bound of the acceptance interval, and a state "0" otherwise, i.e., if the value is within the acceptance interval including the lower and higher bounds. The terms "metric state" and "metric index" are herein used synonymously.

The receiver's condition and the network-path condition are not mutually independent. The network path may affect data flow to the receiver due to delay jitter and/or data loss. The preferred encoding rate (hence flow rate) may be determined according to rules (i) to (iv) below.

(i) If any primary metric deviates from a respective predefined acceptance interval indicating unacceptable receiver performance, i.e., if a primary metric is above the predefined acceptance interval, a new judicially reduced permissible flow-rate (process 4120) is determined based on the primary metrics regardless of the values of the secondary metrics.

(ii) If none of the primary metrics is above the predefined acceptance interval and any secondary metric is above a respective acceptance interval, a new judicially reduced permissible encoding rate (process 4130) is determined based on the secondary metrics.

(iii) If each primary metric is below a respective acceptance interval and each secondary metric is below a respective acceptance interval, a new higher permissible flow-rate (process 4140) may be judicially determined based on the primary and secondary metrics.

(iv) If none of the conditions in (i), (ii), or (iii) above applies, the current flow rate (encoding rate) remains unchanged (4110).

Figure 42:
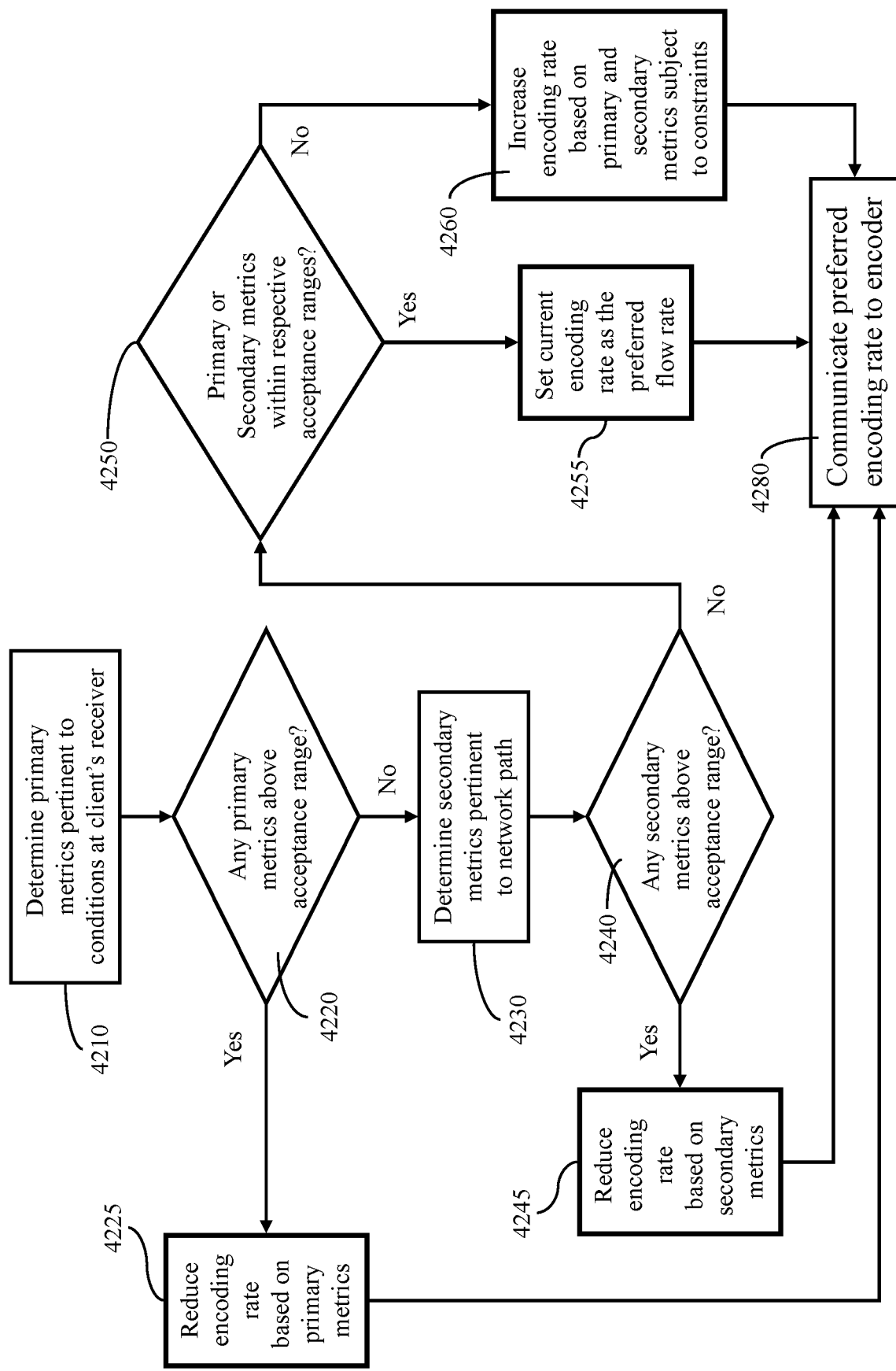
FIG. 42 illustrates processes of determining a preferred encoding rate of a signal based on the criteria illustrated in FIG. 41, in accordance with an embodiment of the present invention.

FIG. 42 illustrates a method of determining a preferred encoding rate of a signal based on the criteria of FIG. 41. The method details process 4050 of FIG. 40. The method applies within a same video-signal content selection (view-region selection), i.e., when the universal streaming server determines that a current video-signal content is to remain unchanged until a request for video-signal content change is received.

A controller of a universal streaming server determines primary metrics based on performance data relevant to a client's receiver (process 4210). If any primary metric is above a respective acceptance interval, a judicially reduced permissible flow rate is determined based on the primary metrics (processes 4220 and 4225) and communicated (process 4280) to a respective encoder. Otherwise, with none of the primary metrics being above its respective acceptance interval, the controller of the universal streaming server determines secondary metrics based on performance data relevant to conditions of a network path from the universal streaming server to a client's device (processes 4220 and 4230).

If any secondary metric is above its predefined acceptance interval, a judicially reduced permissible flow rate is determined based on the secondary metrics (processes 4240 and 4245) and communicated (process 4280) to a respective encoder. Otherwise, if each primary metric is below its predefined acceptance interval and each secondary metric is below its predefined acceptance interval, a new encoding rate based on the primary and secondary metrics is determined (processes 4250 and 4260) and communicated to a respective encoder (process 4280). If any primary metric or any secondary metric is within its respective acceptance interval, the current encoding rate is maintained (process 4255).

Thus, the invention provides a method of signal streaming in a streaming system under flow-rate regulation. The method comprises acquiring at a server 120 comprising at least one hardware processor a source video signal 900 from which a pure video signal 420 is derived, sending a derivative of the pure video signal to a client device 180, and receiving at a controller 3610 of the server 120 content selection parameters 3612 from the client device defining preferred partial coverage of the full-coverage video signal. A content filter 1120 of the server extracts a partial-coverage video signal 3638 from the pure video signal 420 according to the content selection parameters 3612.

The server transmits the partial-coverage video signal to the client device 180. Upon receiving performance measurements 3616 pertinent to the partial-coverage video signal, the controller 3610 determines an updated permissible flow rate of the partial-coverage video signal based on the performance measurements. An encoder 3640 encodes the partial-coverage video signal according to the updated permissible flow rate. The encoder 3640 transcodes the partial-coverage video signal to generate a transcoded signal compatible with characteristics of the client device and compresses the transcoding signal.

The controller 3610 may instruct the encoder 3640 to encode the partial-coverage video signal under the constraint of a current permissible flow rate. Alternatively, the controller may communicate with a network controller (not illustrated) to acquire a downstream network path compatible with the updated permissible flow rate between the server 120 to the client device 180.

The derivative of the pure video signal may be generated as a frame-sampled video signal 1322 (FIG. 13, FIG. 15) of a constant flow rate not exceeding a predefined nominal flow rate. Alternatively, the derivative may be generated as a compressed video signal 1342 (FIG. 13), within the predefined nominal flow rate, derived from the pure video signal 420. The derivative of the pure video signal may also be generated as a succession 1364 (FIG. 13) of compressed content-filtered video signals occupying successive time windows, and derived from the pure video signal.

The performance measurements pertain to conditions at a receiver of the client device and conditions of a downstream network path from the server to the client device. The controller 3610 determines primary metrics based on performance measurements pertinent to the conditions of the receiver. Where at least one primary metric is above a respective acceptance interval, the controller 3610 judicially reduces a current permissible flow rate based on the primary metrics (FIG. 41). Otherwise, where none of the primary metrics is above a respective acceptance interval, the controller 3610 determines secondary metrics based on performance measurements pertinent to the downstream network path. Where at least one secondary metric is above a respective acceptance interval, the controller judicially reduces the current flow rate of the signal based on values of the secondary metrics (FIG. 41).

Where each primary metric is below a respective acceptance interval and each secondary metric is below a respective acceptance interval, the controller judicially increases the current permissible flow rate based on the primary and secondary metrics (FIG. 41).

Figure 43:
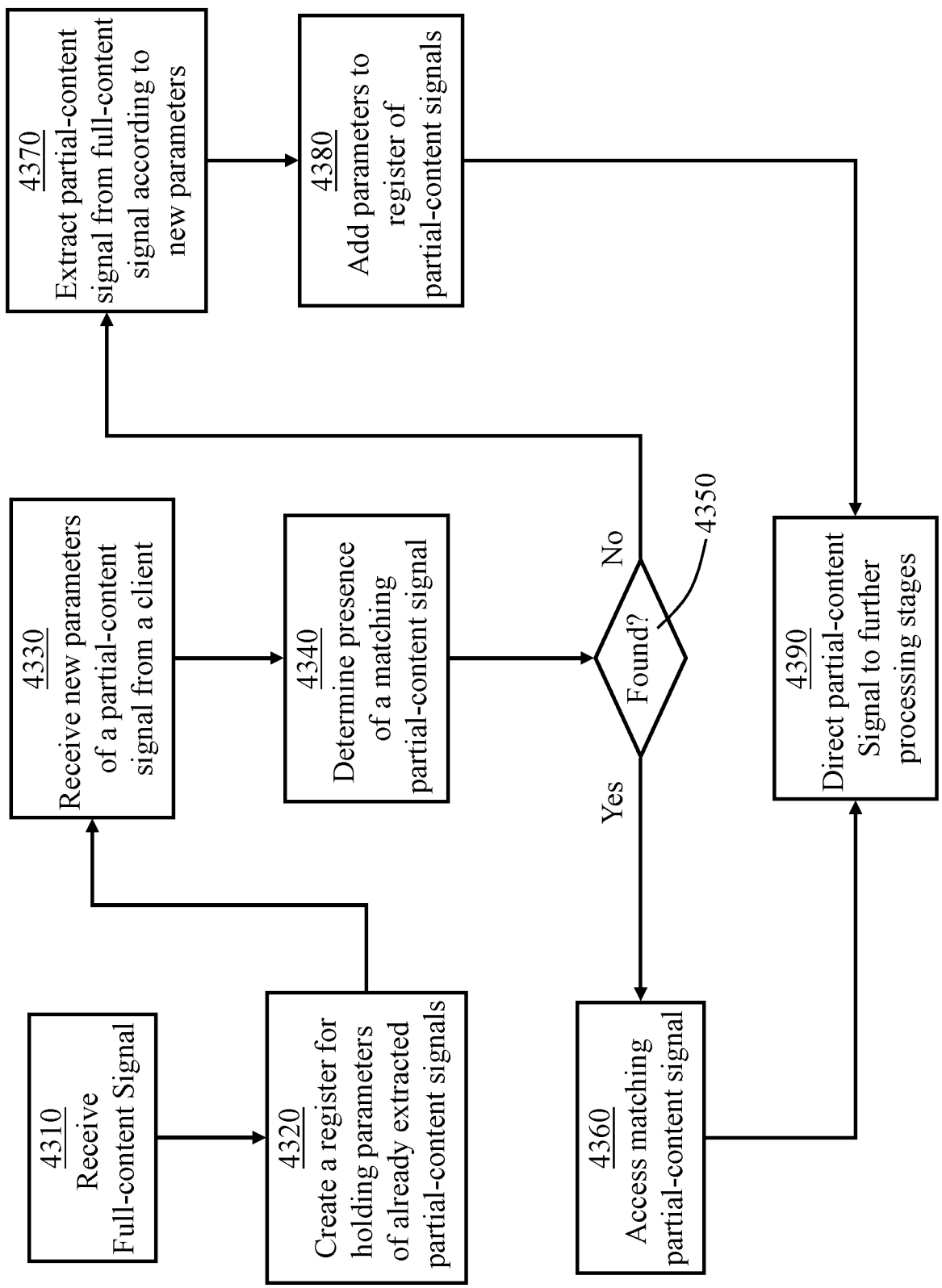
FIG. 43 illustrates a method of eliminating redundant processing of content selection in a universal streaming system serving numerous clients, in accordance with another embodiment of the present invention.

FIG. 43 illustrates a method of eliminating redundant processing of content selection in a universal streaming server 120 serving numerous clients. Upon receiving a full-coverage signal (process 4310) at the universal streaming server 120, a controller of the universal streaming server creates (process 4320) a register for holding parameters of produced partial-coverage signals (content-filtered signals). Initially, the register would be empty. A compressed full-coverage signal is decompressed at the server and de-warped if not de-warped at source. The controller receives (process 4330), from a specific client device, parameters defining a preferred view region. The controller inspects (process 4340) the register to ascertain presence or otherwise of a previously generated partial-coverage signal.

If the register content indicates that a matching partial-coverage signal has already been generated, the controller provides access to the matching partial-coverage signal (processes 4350 and 4360). A partial-coverage signal is directed to an encoder for further processing (process 4390). A partial-coverage signal may be directed to multiple encoders operating under different permissible flow rates to produce encoded signals of different flow rates with all encoded signals corresponding to a same view region. An encoder comprises a transcoding module and a server compression module. Alternatively, the partial-coverage signal may be presented to one encoder to sequentially produce encoded signals of different flow rates with all encoded signals corresponding to a same view region.

If no matching partial-coverage signal is found, the controller directs the full-coverage signal to a content filter 1120 (FIG. 36) to extract (process 4370) a new partial-coverage signal according to the new content-definition parameters defining the preferred view region. The new content-definition parameters are added (process 4380) to the register for future use and the new partial-coverage signal is directed to an encoder for further processing.

Seamless Content Change

A universal streaming server 120 may access multiple panoramic multimedia sources 110 (FIG. 2) and may concurrently acquire multimedia signals to be processed and communicated to various client devices 180. Each multimedia signal may include a source video signal 900 (FIGS. 9, 17, 23, and 28) which may be a raw signal 312, a corrected signal 322, a compressed signal 342, or a compact signal 343 (FIG. 3). A source video signal is a full-coverage video signal which may be content filtered according to different sets of content-definition parameters to generate partial-coverage video signals corresponding to different view regions. The source video signal 900 may be decompressed and/or de-warped at the server to generate a pure video signal 420 which corresponds to a respective scene captured at source. The server 120 may employ multiple content filters 1120 as illustrated in FIGS. 17, 19, 28, and 29.

Server 120 provides a content-filtered video signal specific to each active client device using a signal-editing module 460 comprising a content filter 1120, a transcoding module 1140, and a compression module 1160 (FIG. 11). The server may receive an upstream control signal from a specific client device 180 containing new content-definition parameters corresponding to a new view region. In order to provide seamless transition from one view region to another, the server may provide a number of spare signal-editing modules 460 so that while a particular signal-editing module 460-A is engaged in processing a current video-signal content, a free signal-editing module 460-B may process the video-signal content specified in a new content-definition parameters then replace the particular signal-editing module 460-A which then becomes a free signal-editing module.

Figure 44:
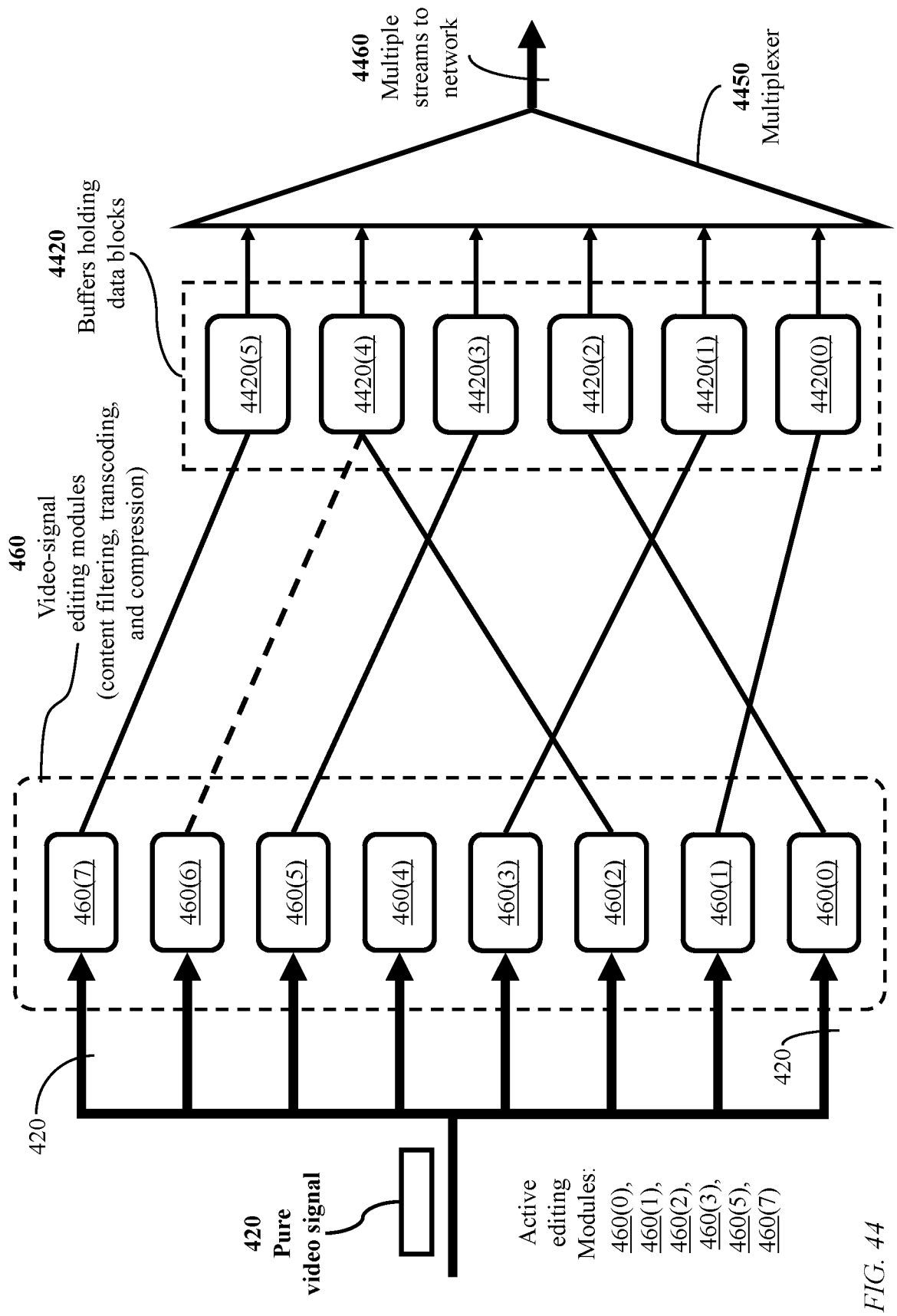
FIG. 44 illustrates transient concurrent content-filtering of a video signal to enable seamless transition from one view region to another, in accordance with another embodiment of the present invention.

FIG. 44 illustrates transient concurrent content-filtering of a video signal to enable seamless transition from one view region to another. A pure video signal 420 is presented to eight signal-editing modules 460, individually identified as 460(0) to 460(7). Six different content-filtered signals are generated from the pure-video signal to be distributed to at least six client devices 180. Signal-editing modules 460 of indices 0, 1, 2, 3, 5, and 7 are concurrently generating respective content-filtered video signals. Data blocks generated at the aforementioned signal-editing modules are respectively directed to buffers 4420 of indices 2, 0, 4, 1, 3, and 5. A multiplexer 4450 combines data blocks read from the buffers and the resulting multiple content-filtered streams 4460 are distributed to respective client devices through a network.

In the example of FIG. 44, a client device 180 receiving a content-filtered video signal processed at signal-editing module 460(2) provides new content-definition parameters. A controller (not illustrated) comprising a hardware processor instructs signal-editing module 460(6), which is currently free, to generate a new content-filtered video signal according to the new content-definition parameters. After a transient period, signal-editing module 460(6) would direct data blocks of the new content-filtered video signal to buffer 4420(4) and signal-editing module 460(2) would disconnect and become a spare signal-editing module.

Figure 45:
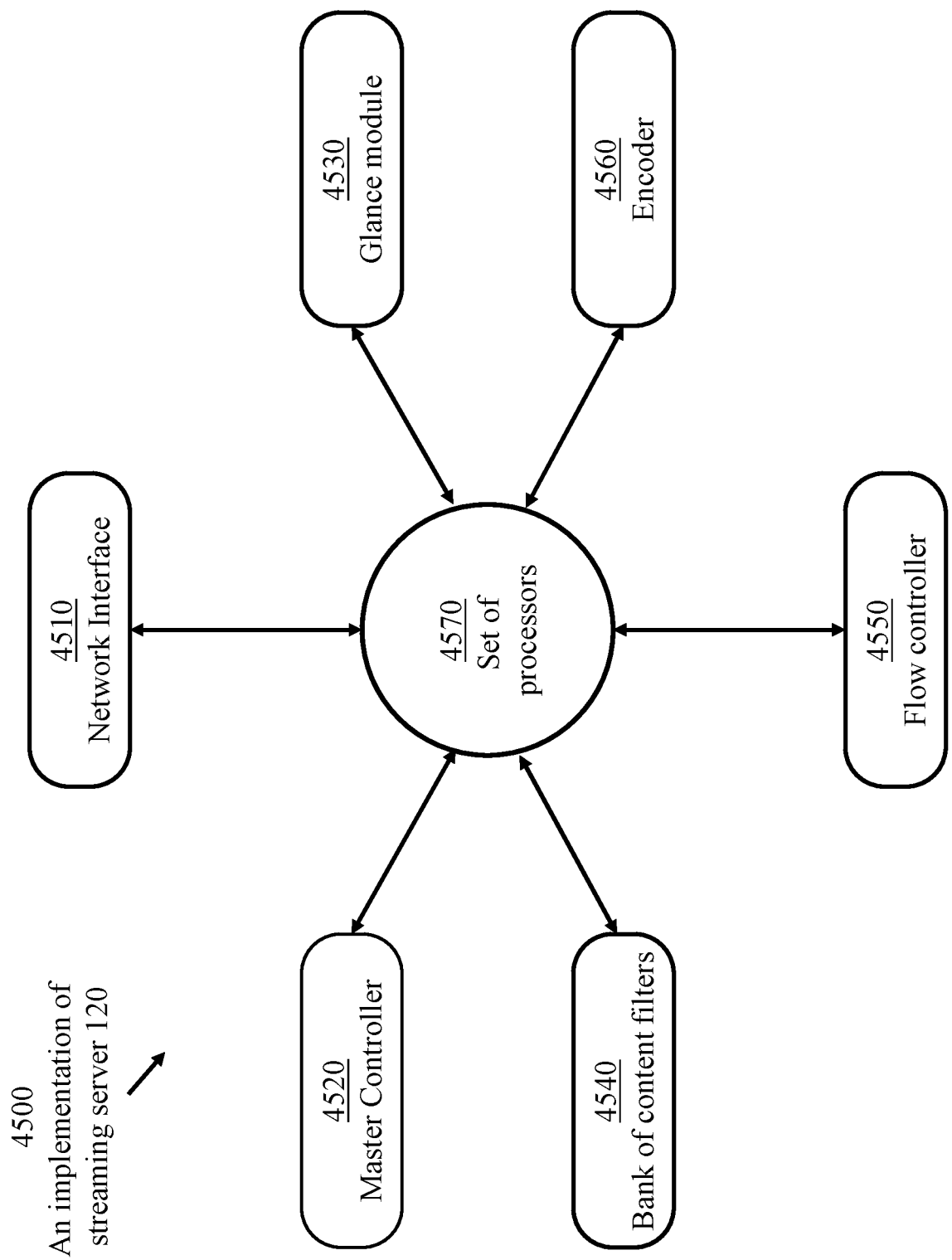
FIG. 45 illustrates a configuration of a streaming server communicating with at least one panoramic multimedia source and a plurality of client devices, in accordance with another embodiment of the present invention.

FIG. 45 illustrates a configuration 4500 of a streaming server 120 communicating with at least one panoramic multimedia source 110 and a plurality of client devices 180 through network 150 (FIG. 2). The streaming server is configured to enable a user of a client device to select partial content (partial coverage) of a panoramic view.

The streaming server comprises a set of hardware processors 4570 executing software instructions organized into modules including a network interface 4510, a master controller 4520, a glance module 4530, a bank of content filters 4540, a flow controller 4550, and an encoding module 4560. A module may employ dedicated hardware processors of the set 4570 of hardware processors. Alternatively, the modules may dynamically share the set of hardware processors.

The interwork interface 4510 is similar to network interface modules 1010 of FIG. 10, 1710 of FIG. 17, and 3625 of FIG. 36.

The master controller 4520 communicates with the panoramic multimedia sources 110 and the client devices 180 through the network interface 4510. In response to a request from an operator of the streaming server, or from a client device, the master controller may acquire a full-coverage signal capturing a panoramic view from one of the panoramic multimedia sources 110 to be adapted (in particular the video-signal component) for transmission to target client devices 180. For a specific client device, a partial-coverage signal corresponding to client-defined viewing region is extracted from the full-coverage signal. The partial-coverage signal may be transcoded to be compatible with characteristics of the client device and compressed to have a flow rate not exceeding the transmission capacity of a network path from the streaming server to the client device.

In order to enable a user of a client device to dynamically select viewing regions, considering that the flow rate of the acquired full-coverage signal may exceed the available capacity of a network path from the streaming server to the client device, a derivative signal of the full-coverage signal having a flow rate not exceeding available transmission capacity is generated and communicated to the user. Upon displaying the derivative signal, a user would be able to define a viewing region of interest and communicate content-selection parameters to the streaming server.

The glance module 4530 is configured to generate a derivative of a full-coverage signal capturing a panoramic view to be communicated to a client device.

The glance module 4530 may be implemented as a frame-sampling module 1320 (FIG. 13) which is configured to sample a pure video signal 420 (FIG. 4), or a transcoded video signal derived from the pure video signal, during distant frame intervals to produce a frame-sampled video signal corresponding to full spatial-coverage sampled images. The frame-sampled video signal comprises a set of distant frames and conforms to a predetermined permissible flow rate. Consecutive frames of the set of distant frames are separated by a time interval significantly exceeding a duration of a single frame.

The glance module 4530 may also be implemented as a spatial-temporal compression module 1360 (FIG. 13) which is configured to produce a succession of compressed content-filtered signals to occupy successive time windows. Each compressed content-filtered signal conforms to a predetermined permissible flow rate.

The bank 4540 of content filters comprises content filters that may operate concurrently to generate different partial-content signals from a full-content signal, such as the bank of content filters 1120 of FIG. 17. Each of content filters of the bank of content filters 4540 is configured to extract a partial-coverage signal from the full-coverage signal according to content selection parameters received from a client device.

The flow controller 4550 (similar to flow controller 3610 of FIG. 36) is configured to determine a permissible flow rate based on performance measurements received from the client device (FIG. 36).

Encoder 4560 is similar to encoder 3640 which is configured to encode a partial-coverage signal and produce a compressed signal, at a permissible or preferred flow rate, to be transmitted to a client device.

The master controller is configured to:
acquire a full-coverage signal through the network interface 4510;
direct the full-coverage network to the glance module 4530;
send the derivative of the full-coverage signal generated at the glance module to a client device through the network interface 4510;
receive content selection parameters from the client device based on the derivative;
direct the full-coverage signal and the content selection parameters to one of the content filters 4540 to generate a respective partial-coverage signal;
communicate the partial-coverage signal to the client device through the network interface 4510;
receive from the client device performance measurements;
direct the performance measurements to the flow controller 4560 for determining a permissible flow rate (FIG. 36);
direct the permissible-flow rate to the encoder 4550 to produce an encoded partial-coverage signal;
communicate the encoded partial-coverage signal to the client device.

Figure 46:
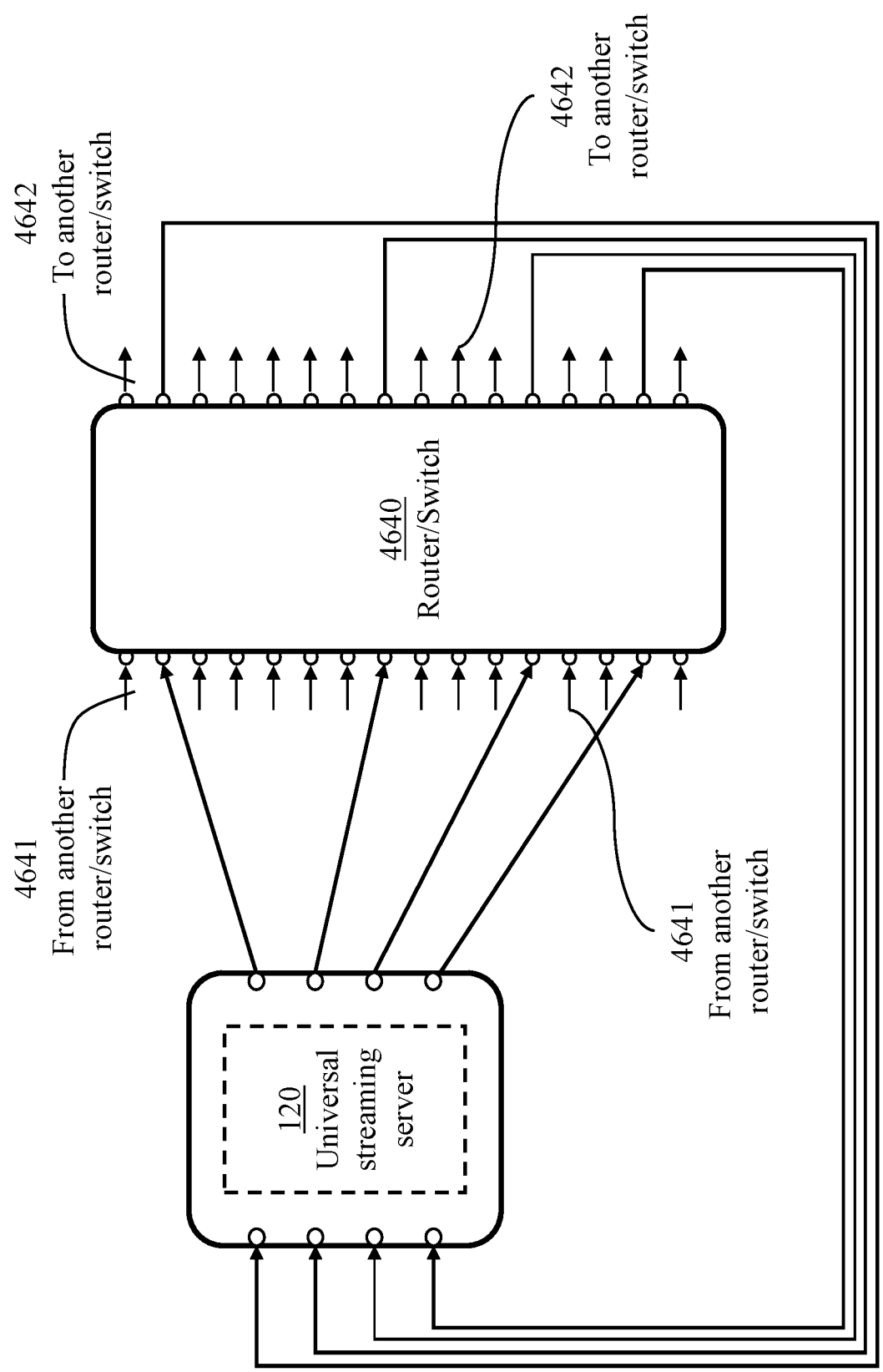
FIG. 46 illustrates coupling the universal streaming server to a router-switch of a network, in accordance with an embodiment of the present invention.

FIG. 46 illustrates coupling the universal streaming server 120 to a network. The universal streaming server 120 may be implemented in its entirety within a cloud computing network and communication with the client devices 180 may also take place within the cloud computing network. Alternatively, the generated client bound streams 940 (FIG. 9) may be routed to the client devices through a router/switch 4640 of another network. Router-switch 4640 may connect to numerous other servers or other router-switches through input ports 4641 and output ports 4642.

Thus, the server comprises network access ports to communicate with a plurality of video sources and a plurality of client devices through a shared network. The server may be partially or entirely installed within a shared cloud-computing network where the physical processors and associated memory devices are dynamically allocated on demand.

Summing up, the disclosed universal streaming server is devised to interact with multiple panoramic multimedia sources of different types and with client devices of different capabilities. The server may exchange control signals with a panoramic multimedia source to enable acquisition of multimedia signals together with descriptors of the multimedia signals and data indicating signal processes performed at source. The server may exchange control signals with a client device to coordinate delivery of a signal sample of a full-coverage (attainable-coverage) panoramic video signal and acquire identifiers of a preferred view region from a viewer at the client device.

The server is devised to implement several methods of capturing a client's viewing preference. According to one method, a signal sample corresponding to attainable spatial coverage is sent to client device and a viewer at a client device may send an identifier of a preferred view region to the server. The server then sends a corresponding content-filtered video signal. The server distributes software module to subtending client devices to enable this process. According to another method, the server may multicast to client devices a number of content-filtered video signals corresponding to different view regions. The content-filtered video signals are derived from a full-coverage (attainable-coverage) panoramic video signal. Viewers at the client devices may individually signal their respective selection. The server may use a streaming-control table (FIG. 32) to eliminate redundant processing.

A panoramic video signal is acquired and transcoded to produce a transcoded signal compatible with a client device. A signal sample of the transcoded signal is then transmitted to the client device. Upon receiving from the client device descriptors of a preferred view region, the content of the transcoded signal is edited to produce a content-filtered signal corresponding to the preferred view region. The content-filtered signal, or a compressed form of the content-filtered signal, is sent to the client device instead of the signal sample.

Acquiring the panoramic video signal comprises processes of establishing a connection from the server to a panoramic multimedia source, requesting and receiving a multimedia signal that includes the panoramic video signal together with indications of any signal processing applied to the panoramic video signal at source. The acquired panoramic video signal may be decompressed and/or de-warped at the server according to the indications of processes performed at source. The signal sample may be a frame-sampled signal comprising distant frames of the transcoded signal. Alternatively, the signal sample may be a compressed form of the transcoded signal.

Arrangements for efficient video-signal content selection in a universal streaming system serving numerous clients have been described and illustrated in FIGS. 19, 28, 29, and 43. The method of signal streaming of FIG. 43 comprises receiving (process 4310) at a server 120 a full-coverage signal and at a controller comprising a hardware processor:
forming (process 4320) a register for holding identifiers of partial-coverage signals derived from the full-coverage signal;
receiving (process 4330) from a client device 180 coupled to the server 120 new content-definition parameters defining a view region; and
examining (process 4340) the register to ascertain presence of a matching partial-coverage signal corresponding to the new content-definition parameters.

If a matching partial-coverage signal is found (processes 4350 and 4360) the controller directs (process 4390) the matching partial-coverage signal to an encoder prior to transmission to the client device. If a matching partial-coverage signal is not found, the controller directs (process 4350) the full-coverage signal to a content filter to extract (process 4370) a new partial-coverage signal according to the new content-definition parameters.

The new partial-coverage video signal may need to be transcoded to generate a transcoded video signal compatible with characteristics of the client device. The transcoded video signal may be further compressed under a predefined nominal flow rate. The controller determines a bit rate of the encoded video signal and inserts (process 4380) the new content-definition parameters in the register.

The method further comprises receiving from the client device performance measurements pertinent to conditions at a receiver of the client device and conditions of a network path from the server to the receiver. The controller determines performance metrics based on the performance measurements. The controller determines a permissible flow rate as a function of deviation of the performance metrics from corresponding predefined thresholds (FIG. 41) and the bit rate of the encoded video signal.

The new partial-coverage signal may be directed to multiple encoders operating under different permissible flow rates to produce encoded signals corresponding to the same view region but of different flow rates and/or different formats to be transmitted to different client devices.

Processor-executable instructions causing respective hardware processors to implement the processes described above may be stored in processor-readable media such as floppy disks, hard disks, optical disks, Flash ROMS, non-volatile ROM, and RAM. A variety of processors, such as microprocessors, digital signal processors, and gate arrays, may be employed.

Methods of the embodiment of the invention are performed using one or more hardware processors, executing processor-executable instructions causing the hardware processors to implement the processes described above. Computer executable instructions may be stored in processor-readable storage media such as floppy disks, hard disks, optical disks, Flash ROMS, non-volatile ROM, and RAM. A variety of processors, such as microprocessors, digital signal processors, and gate arrays, may be employed.

In a modification to the embodiments of the invention, the universal streaming server comprise a software, comprising executable instructions stored in a memory device for performing the methods of the embodiments described above, including acquiring multimedia signals, such as panoramic multimedia signals, and generating client-specific content-filtered multimedia signals under flow control.

Systems of the embodiments of the invention may be implemented as any of a variety of suitable circuitry, such as one or more microprocessors, digital signal processors (DSPs), application-specific integrated circuits (ASICs), field programmable gate arrays (FPGAs), discrete logic, software, hardware, firmware or any combinations thereof. When modules of the systems of the embodiments of the invention are implemented partially or entirely in software, the modules contain a memory device for storing software instructions in a suitable, non-transitory computer-readable storage medium, and software instructions are executed in hardware using one or more processors to perform the techniques of this disclosure.

It should be noted that methods and systems of the embodiments of the invention and data streams described above are not, in any sense, abstract or intangible. Instead, the data is necessarily presented in a digital form and stored in a physical data-storage computer-readable medium, such as an electronic memory, mass-storage device, or other physical, tangible, data-storage device and medium. It should also be noted that the currently described data-processing and data-storage methods cannot be carried out manually by a human analyst, because of the complexity and vast numbers of intermediate results generated for processing and analysis of even quite modest amounts of data. Instead, the methods described herein are necessarily carried out by electronic computing systems having processors on electronically or magnetically stored data, with the results of the data processing and data analysis digitally stored in one or more tangible, physical, data-storage devices and media.

Although specific embodiments of the invention have been described in detail, it should be understood that the described embodiments are intended to be illustrative and not restrictive. Various changes and modifications of the embodiments shown in the drawings and described in the specification may be made within the scope of the following claims without departing from the scope of the invention in its broader aspect.

The invention claimed is:

1. A method of signal streaming, comprising:
at a server employing at least one hardware processor:
acquiring a pure video signal capturing a panorama;
generating, from the pure video signal, a derivative signal representing full spatial coverage of the panorama and compatible with an available capacity of a network path to a client device;
sending the derivative signal to the client device;
receiving at a controller of the server view-region selection parameters, based on the derivative signal, from the client device;
obtaining a partial-coverage signal from the pure video signal according to the view-region selection parameters;
transmitting the partial-coverage signal to the client device;
receiving performance measurements from the client device;
determining at the controller a permissible flow rate of the partial-coverage signal based on the performance measurements;
encoding the partial-coverage signal according to the permissible flow rate to produce an encoded partial-coverage signal; and
transmitting the encoded partial-coverage signal to the client device;
thereby providing client-defined content at an appropriate flow rate.

2. The method of claim 1 wherein the encoding comprises:
transcoding the partial-coverage signal to generate a transcoded signal compatible with characteristics of the client device; and
compressing the transcoded signal to comply with the permissible flow rate.

3. The method of claim 1 further comprising communicating with a network controller to acquire a path compatible with the updated permissible flow rate from the server to the client device.

4. The method of claim 1 wherein the derivative signal of the pure video signal is a frame-sampled video signal comprising selected frames of a stream of frames of the pure video signal.

5. The method of claim 4 wherein the selected frames are spaced so that the flow rate of the derivative signal is time-invariant.

6. The method of claim 4 wherein said generating the derivative signal comprises:
determining flow rate of the pure video;
determining a ratio of the flow rate of the pure video signal to an available capacity of a path from the server to the client device; and
selecting one frame out of each consecutive set of an integer number of successive frames, said integer number being not less than said ratio.

7. The method of claim 4 wherein:
said view-selection parameters define a preferred view region of the panorama based on the frame-sampled video signal; and
said obtaining comprises content-filtering the pure video signal to produce a content-filtered signal corresponding to the preferred view region.

8. The method of claim 1 wherein the derivative of the pure signal is a succession of content-filtered signals, each content-filtered signal derived from the pure video signal to correspond to a respective view region of a preselected set of view regions of the panorama.

9. The method of claim 8 wherein said preselected view regions collectively represent the entire spatial coverage of the panorama.

10. The method of claim 8 wherein:
said view-selection parameters comprise an identifier of a preferred content-filtered signal of the succession of content-filtered signals; and
said obtaining comprises selecting a content-filtered signal of the succession of content-filtered signals corresponding to the identifier.

11. The method of claim 1 wherein said determining comprises:
computing primary metrics based on performance measurements pertinent to the conditions of a receiver of the client device;
computing secondary metrics based on performance measurements pertinent to a network path from the server to the receiver; and
reducing a current permissible flow rate under at least one of two conditions:
at least one primary metric is outside a respective acceptance interval; and
at least one secondary metric is outside a respective acceptance interval.

12. The method of claim 11 further comprising increasing the current permissible flow rate based on the primary and secondary metrics subject to a determination that each primary metric is within a respective acceptance interval and each secondary metric is within a respective acceptance interval.

13. A streaming server comprising:
a memory device storing instructions causing at least one hardware processor to:
acquire a pure signal capturing a panorama;
generate, from the pure video signal, a derivative signal representing full spatial coverage of the panorama and compatible with an available capacity of a network path to a client device;
send the derivative signal to the client device;
receive view-region selection parameters, based on the derivative signal, from the client device;
obtain a partial-coverage signal from the pure video signal according to the view-region selection parameters;
transmit the partial-coverage signal to the client device;
receive performance measurements from the client device;
determine a permissible flow rate of the partial-coverage signal based on the performance measurements;
encode the partial-coverage signal according to the permissible flow rate to produce an encoded partial-coverage signal; and
transmit the encoded partial-coverage signal to the client device;
thereby the streaming server provides client-defined content at an appropriate flow rate.

14. The streaming server of claim 13 wherein the encoded partial-coverage signal is compatible with characteristics of the client device and compressed to comply with the permissible flow rate.

15. The streaming server of claim 13 further configured to communicate with a network controller to acquire a path, compatible with the permissible flow rate, from the server to the client device.

16. The streaming server of claim 13 wherein the derivative signal of the pure video signal is a frame-sampled video signal comprising selected frames of a stream of frames of the pure video signal.

17. The streaming server of claim 16 wherein the selected frames are spaced so that the flow rate of the derivative signal is time-invariant.

18. The streaming server of claim 13 wherein the derivative of the pure video signal is a succession of content-filtered signals, each content-filtered signal derived from the pure video signal to correspond to a respective view region of a preselected set of view regions of the panorama.

19. The streaming server of claim 13 wherein the instructions cause the at least one hardware processor to:
compute primary metrics based on performance measurements pertinent to conditions at a receiver of the client device;
compute secondary metrics based on performance measurements pertinent to a network path from the streaming server to the receiver; and
reduce a current permissible flow rate under at least one of two conditions:
at least one primary metric is outside a respective acceptance interval; and
at least one secondary metric is outside a respective acceptance interval.

20. The streaming server of claim 19 wherein the instructions cause the at least one hardware processor to increase the current permissible flow rate based on the primary and secondary metrics subject to a determination that each primary metric is within a respective acceptance interval and each secondary metric is within a respective acceptance interval.

21. A streaming server comprising:
at least one hardware processor for executing processor-readable instructions organized into:
a glance module for generating, from a pure-video signal capturing a panorama, a derivative signal representing full spatial coverage of the panorama and compatible with an available capacity of a network path to a client device;
a content filter for extracting a partial-coverage signal from the pure video signal according to acquired view-region selection parameters;

a flow controller for determining a permissible flow rate based on acquired performance measurements of a network path from the streaming server to a client device;

an encoding module for encoding a signal according to the permissible flow rate; and a master controller configured to:
  receive and direct the pure video signal to the glance module;
  send the derivative signal generated at the glance module to the client device;
  receive specific view-region selection parameters from the client device based on the derivative signal;
  obtain a partial-coverage signal of the pure video signal according to the specific view-region selection parameters;
  and
  transmit the respective partial-coverage signal to the client device.

22. The streaming server of claim 21 wherein the glance module is configured to generate the derivative signal in one of the forms:

a frame-sampled signal of a constant flow rate not exceeding a specified flow rate;
and
a succession of content-filtered signals occupying successive time windows, each content-filtered signal representing a view region of a preselected set of view regions of the panorama.

23. The streaming server of claim 21 wherein the performance measurements pertain to:
  conditions at client device; and
  conditions of a network path from the streaming server to the receiver.

24. The streaming server of claim 21 wherein the master controller is further configured to:
  receive performance measurements;
  direct the performance measurements to the flow controller for determining the permissible flow rate;
  direct the permissible-flow rate to the encoder to produce an encoded partial-coverage signal; and
  transmit the encoded partial-coverage signal to the client device.

* * * * *